(12) United States Patent
Tang et al.

(10) Patent No.: US 12,210,143 B2
(45) Date of Patent: Jan. 28, 2025

(54) IMAGE SYSTEM LENS ASSEMBLY, IMAGE CAPTURING UNIT AND ELECTRONIC DEVICE

(71) Applicant: LARGAN PRECISION CO., LTD., Taichung (TW)

(72) Inventors: Hsiang-Chi Tang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 311 days.

(21) Appl. No.: 17/986,790

(22) Filed: Nov. 14, 2022

(65) Prior Publication Data
US 2024/0111136 A1    Apr. 4, 2024

(30) Foreign Application Priority Data

Sep. 30, 2022    (TW) .................................. 111137252

(51) Int. Cl.
    *G02B 15/14*    (2006.01)
    *G03B 30/00*    (2021.01)

(52) U.S. Cl.
    CPC .......... *G02B 15/143* (2019.08); *G03B 30/00* (2021.01)

(58) Field of Classification Search
    CPC ................................ G02B 15/143–15/143507
    USPC ................................................. 359/689, 690
    See application file for complete search history.

(56) References Cited

U.S. PATENT DOCUMENTS

| | | | |
|---|---|---|---|
| 4,999,007 A | 3/1991 | Aoki et al. | |
| 5,268,792 A | 12/1993 | Kreitzer et al. | |
| 5,270,863 A | 12/1993 | Uzawa | |
| 5,283,693 A | 2/1994 | Kohno et al. | |
| 5,734,509 A | 3/1998 | Ueno | |
| 5,749,008 A | 5/1998 | Ishihara et al. | |
| 5,872,660 A | 2/1999 | Kohno et al. | |
| 7,307,795 B2 * | 12/2007 | Sekita ............ | G02B 15/143507 359/689 |
| 2005/0141101 A1 | 6/2005 | Itoh | |
| 2011/0205635 A1 * | 8/2011 | Tang ........................ | G02B 3/04 359/689 |
| 2012/0127583 A1 * | 5/2012 | Peng .................. | G02B 13/0035 359/682 |
| 2017/0192203 A1 * | 7/2017 | Chang ................ | G02B 13/0045 |

(Continued)

FOREIGN PATENT DOCUMENTS

| | | |
|---|---|---|
| CN | 216434519 U | 5/2022 |
| JP | H09-113805 A | 5/1997 |
| WO | 2022044675 A1 | 3/2022 |

*Primary Examiner* — Darryl J Collins
(74) *Attorney, Agent, or Firm* — Maschoff Brennan

(57) ABSTRACT

An image system lens assembly includes three lens groups including five lens elements. The three lens groups are, in order from an object side to an image side: first, second and third lens groups. The five lens elements are, in order from the object side to the image side: first, second, third, fourth and fifth lens elements. A zooming process is performed by changing axial distances between the three lens groups. The image system lens assembly has a long focal length end and a short focal length end. At least one surface of at least one lens element has an inflection point in an optically effective area thereof when the image system lens assembly is at the long focal length end and the short focal length end. The second lens group is moved relative to the first lens group along an optical axis in the zooming process.

29 Claims, 24 Drawing Sheets

(56) References Cited

U.S. PATENT DOCUMENTS

| 2017/0199360 A1 | 7/2017 | Chang |
| 2022/0075163 A1 | 3/2022 | Tang et al. |
| 2023/0236395 A1* | 7/2023 | Gong ............ G02B 15/143507 359/676 |

* cited by examiner

IMAGE SYSTEM LENS ASSEMBLY, IMAGE CAPTURING UNIT AND ELECTRONIC DEVICE

RELATED APPLICATIONS

This application claims priority to Taiwan Application 111137252, filed on Sep. 30, 2022, which is incorporated by reference herein in its entirety.

BACKGROUND

Technical Field

The present disclosure relates to an image system lens assembly, an image capturing unit and an electronic device, more particularly to an image system lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image system lens assembly includes three lens groups, and the three lens groups includes five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

Preferably, a zooming process is performed by changing axial distances between any adjacent two of the three lens groups so as to change a focal length of the image system lens assembly, and the image system lens assembly has a long focal length end and a short focal length end. Preferably, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end. Preferably, the second lens group is moved relative to the first lens group along an optical axis in the zooming process, and the third lens group is moved relative to the first lens group along the optical axis in the zooming process.

Preferably, the object-side surface of the first lens element is convex in a paraxial region thereof. Preferably, the third lens element has positive refractive power.

When an Abbe number of one of the five lens elements is $Vi$, a refractive index of the one of the five lens elements is $Ni$, a minimum value of $Vi/Ni$ is $(Vi/Ni)min$, half of a maximum field of view of the image system lens assembly at the short focal length end is HFOVS, a maximum distance between an optically effective area of the object-side surface of the first lens element and the optical axis when the image system lens assembly is at the long focal length end is $Y11L$, a maximum distance between an optically effective area of the object-side surface of the first lens element and the optical axis when the image system lens assembly is at the short focal length end is $Y11S$, a maximum distance between an optically effective area of the image-side surface of the fifth lens element and the optical axis when the image system lens assembly is at the long focal length end is $Y52L$, a maximum distance between an optically effective area of the image-side surface of the fifth lens element and the optical axis when the image system lens assembly is at the short focal length end is $Y52S$, a focal length of the first lens element is $f1$, a focal length of the second lens element is $f2$, and a focal length of the third lens element is $f3$, the following conditions are preferably satisfied:

$6.0 < (Vi/Ni)min < 12.3$;

$5.0$ degrees $<$ HFOVS $< 25.0$ degrees;

$0.50 < Y11L/Y52L < 2.0$;

$0.50 < Y11S/Y52S < 2.0$; and $|f3/f1 + f3/f2| < 0.60$.

According to another aspect of the present disclosure, an image system lens assembly includes three lens groups, and the three lens groups includes five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

Preferably, a zooming process is performed by changing axial distances between any adjacent two of the three lens groups so as to change a focal length of the image system lens assembly, and the image system lens assembly has a long focal length end and a short focal length end. Preferably, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end. Preferably, the second lens group is moved relative to the first lens group along an optical axis in the zooming process.

Preferably, the third lens group has negative refractive power.

Preferably, the object-side surface of the first lens element is convex in a paraxial region thereof. Preferably, the third lens element has positive refractive power.

When an Abbe number of one of the five lens elements is $Vi$, a refractive index of the one of the five lens elements is Ni, a minimum value of Vi/Ni is (Vi/Ni)min, half of a maximum field of view of the image system lens assembly at the short focal length end is HFOVS, a maximum distance between an optically effective area of the object-side surface of the first lens element and the optical axis when the image system lens assembly is at the long focal length end is Y11L, a maximum distance between an optically effective area of the object-side surface of the first lens element and the optical axis when the image system lens assembly is at the short focal length end is Y11S, a maximum distance between an optically effective area of the image-side surface of the fifth lens element and the optical axis when the image system lens assembly is at the long focal length end is Y52L, a maximum distance between an optically effective area of the image-side surface of the fifth lens element and the optical axis when the image system lens assembly is at the short focal length end is Y52S, a focal length of the third lens element is f3, and a composite focal length of the fourth lens element and the fifth lens element is f45, the following conditions are preferably satisfied:

6.0<(Vi/Ni)min<12.3;

3.0 degrees<HFOVS<30.0 degrees;

0.50<Y11L/Y52L<2.0;

0.50<Y11S/Y52S<2.0; and

|f45/f3|<4.0.

According to another aspect of the present disclosure, an image system lens assembly includes three lens groups, and the three lens groups includes five lens elements. The three lens groups are, in order from an object side to an image side along an optical path, a first lens group, a second lens group and a third lens group. The five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side.

Preferably, a zooming process is performed by changing axial distances between any adjacent two of the three lens groups so as to change a focal length of the image system lens assembly, and the image system lens assembly has a long focal length end and a short focal length end. Preferably, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end. Preferably, the second lens group is moved relative to the first lens group along an optical axis in the zooming process.

Preferably, the first lens group includes the first lens element and the second lens element, the second lens group includes the third lens element, and the third lens group includes the fourth lens element and the fifth lens element.

When an Abbe number of one of the five lens elements is Vi, a refractive index of the one of the five lens elements is Ni, a minimum value of Vi/Ni is (Vi/Ni)min, half of a maximum field of view of the image system lens assembly at the short focal length end is HFOVS, a maximum distance between an optically effective area of the object-side surface of the first lens element and the optical axis when the image system lens assembly is at the long focal length end is Y11L, a maximum distance between an optically effective area of the object-side surface of the first lens element and the optical axis when the image system lens assembly is at the short focal length end is Y11S, a maximum distance between an optically effective area of the image-side surface of the fifth lens element and the optical axis when the image system lens assembly is at the long focal length end is Y52L, a maximum distance between an optically effective area of the image-side surface of the fifth lens element and the optical axis when the image system lens assembly is at the short focal length end is Y52S, a composite focal length of the first lens element and the second lens element is f12, and a composite focal length of the fourth lens element and the fifth lens element is f45, the following conditions are preferably satisfied:

6.0<(Vi/Ni)min<12.3;

3.0 degrees<HFOVS<30.0 degrees;

0.50<Y11L/Y52L<2.0;

0.50<Y11S/Y52S<2.0; and

|f45/f12|<1.4.

According to another aspect of the present disclosure, an image capturing unit includes one of the aforementioned image system lens assemblies and an image sensor, wherein the image sensor is disposed on an image surface of the image system lens assembly.

According to another aspect of the present disclosure, an electronic device includes at least two image capturing units located on the same side of the electronic device. The at least two image capturing units include a first image capturing unit and a second image capturing unit. The first image capturing unit includes one of the aforementioned image system lens assemblies and an image sensor disposed on an image surface of the image system lens assembly. The second image capturing unit includes an optical lens assembly and an image sensor disposed on an image surface of the optical lens assembly. Preferably, half of a maximum field of view of the second image capturing unit is between 30 degrees and 60 degrees, inclusive of both values.

BRIEF DESCRIPTION OF THE DRAWINGS

The disclosure can be better understood by reading the following detailed description of the embodiments, with reference made to the accompanying drawings as follows.

DETAILED DESCRIPTION

According to one aspect of the present disclosure, an image system lens assembly includes at least one lens group, and the at least one lens group includes at least one lens element. Moreover, the image system lens assembly includes three lens groups, and the three lens groups includes five lens elements. The three lens groups are in order from an object side to an image side along an optical path, a first lens group, a second lens group and a third lens group. Moreover, the five lens elements are, in order from the object side to the image side along the optical path, a first lens element, a second lens element, a third lens element, a fourth lens element and a fifth lens element. Each of the five lens elements has an object-side surface facing toward the object side and an image-side surface facing toward the image side. For example, in one aspect, the first lens group includes the first lens element and the second lens element, the second lens group includes the third lens element, and the third lens group includes the fourth lens element and the fifth lens element.

Figure 1:
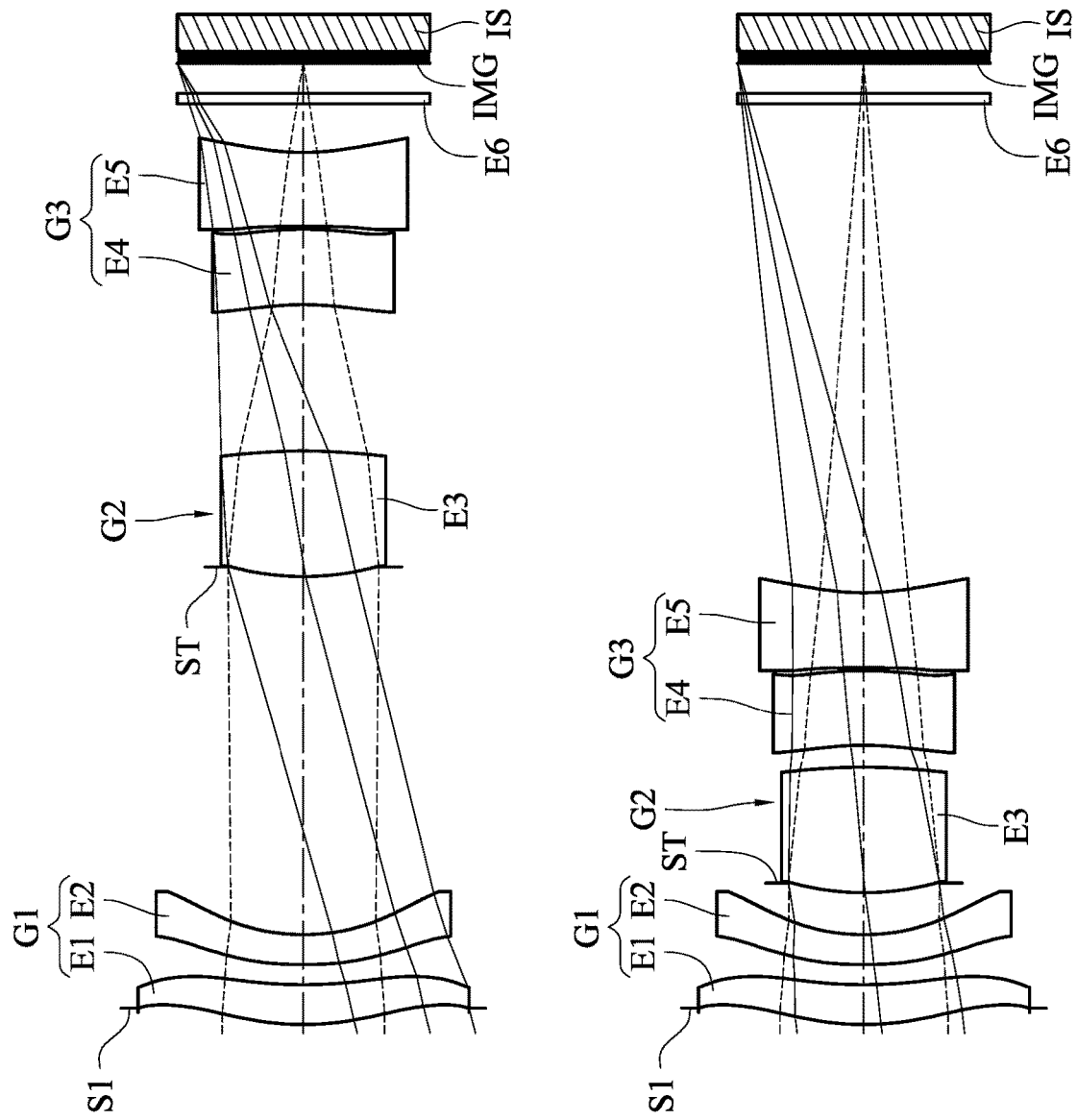
FIG. 1 is a schematic view of an image capturing unit respectively at the short focal length end and the long focal length end according to the 1st embodiment of the present disclosure.

According to the present disclosure, the focal length of the image system lens assembly is varied by changing axial distances between any adjacent two of the three lens groups in a zooming process, and the image system lens assembly has a long focal length end and a short focal length end. Therefore, the configuration of three lens groups and five lens elements is favorable for balancing among the size, zoom ratio, image quality and difficulty of assembling. Please refer to FIG. 1, which is a schematic view of an image capturing unit respectively at the short focal length end and the long focal length end according to the 1st embodiment of the present disclosure. The upper part of FIG. 1 shows the image system lens assembly at the short focal length end, and the lower part of FIG. 1 shows the image system lens assembly at the long focal length end. Moreover, there is no relative motion between lens elements of one lens group in the zooming process. Therefore, it is favorable for simplifying the structure of the image system lens assembly. For example, there is no relative motion between the lens elements of the first lens group.

The first lens group includes at least one lens element. Moreover, the first lens group can include two lens elements. Therefore, it is favorable for reducing the outer diameter at the object side of the image system lens assembly.

The second lens group includes at least one lens element. Moreover, the second lens group can include one lens element. Therefore, it is favorable for balancing among the size, zoom ratio and image quality. Moreover, the second lens group is moved relative to the first lens group along an optical axis in the zooming process. Therefore, it is favorable for simplifying the structure of the image system lens assembly. Moreover, when the image system lens assembly zooms in from the short focal length end to the long focal length end during the zooming process, the second lens group can be moved along the optical axis toward the object side relative to the first lens group; on the other hand, when the image system lens assembly zooms out from the long focal length end to the short focal length end during the zooming process, the second lens group can be moved along the optical axis toward the image side relative to the first lens group. Therefore, it is favorable for increasing the zoom ratio. Moreover, the second lens group can have positive refractive power. Therefore, it is favorable for increasing the zoom ratio and reducing the size of the image system lens assembly.

The third lens group includes at least one lens element. Moreover, the third lens group can include two lens elements. Therefore, it is favorable for providing consistent image quality during the zooming process. Moreover, the third lens group can be moved relative to the first lens group along the optical axis in the zooming process. Therefore, it is favorable for correcting aberrations generated during the zooming process. Moreover, when the image system lens assembly zooms in from the short focal length end to the long focal length end during the zooming process, the third lens group can be moved along the optical axis toward the object side relative to the first lens group; on the other hand, when the image system lens assembly zooms out from the long focal length end to the short focal length end during the zooming process, the third lens group can be moved along the optical axis toward the image side relative to the first lens group. Therefore, it is favorable for reducing the total track length. Moreover, the third lens group can be moved relative to an image surface along the optical axis in the zooming process. Moreover, when the image system lens assembly zooms in from the short focal length end to the long focal length end during the zooming process, the third lens group can be moved along the optical axis toward the object side relative to the image surface; on the other hand, when the image system lens assembly zooms out from the long focal length end to the short focal length end during the zooming process, the third lens group can be moved along the optical axis toward the image side relative to the image surface. Therefore, it is favorable for reducing the total track length. Moreover, the third lens group can have negative refractive power. Therefore, it is favorable for correcting aberrations, such as spherical aberration, generated due to the miniaturization of the image system lens assembly.

The image system lens assembly can perform a focusing process according to an object distance so as to focus on an object, and the third lens group can be moved relative to the first lens group along the optical axis in the focusing process. Therefore, it is favorable for reducing the movement of lens groups in the focusing process. Moreover, when the object distance decreases, the third lens group can be moved along the optical axis toward the image side relative to the first lens group in the focusing process; on the other hand, when the object distance increases, the third lens group can be moved along the optical axis toward the object side relative to the first lens group in the focusing process. Therefore, it is favorable for reducing the position variation of the image surface during the focusing process.

According to the present disclosure, at least one lens group of the image system lens assembly can be moved along the optical axis so as to compensate temperature effect. Therefore, it is favorable for reducing the influence of temperature change on the image quality. Moreover, the third lens group can be moved relative to the first lens group along the optical axis so as to compensate temperature effect. Therefore, it is favorable for minimizing the movement of lens groups.

At least one lens element in the first lens group, the second lens group and the third lens group can be made of plastic material. Therefore, it is favorable for reducing the size and weight and increasing image quality and mass production efficiency. Moreover, there can be at least two lens elements in the first, second and third lens groups being made of plastic material. Moreover, there can be at least three lens elements in the first, second and third lens groups being made of plastic material. Moreover, there can be at least four lens elements in the first, second and third lens groups being made of plastic material.

Figure 20:
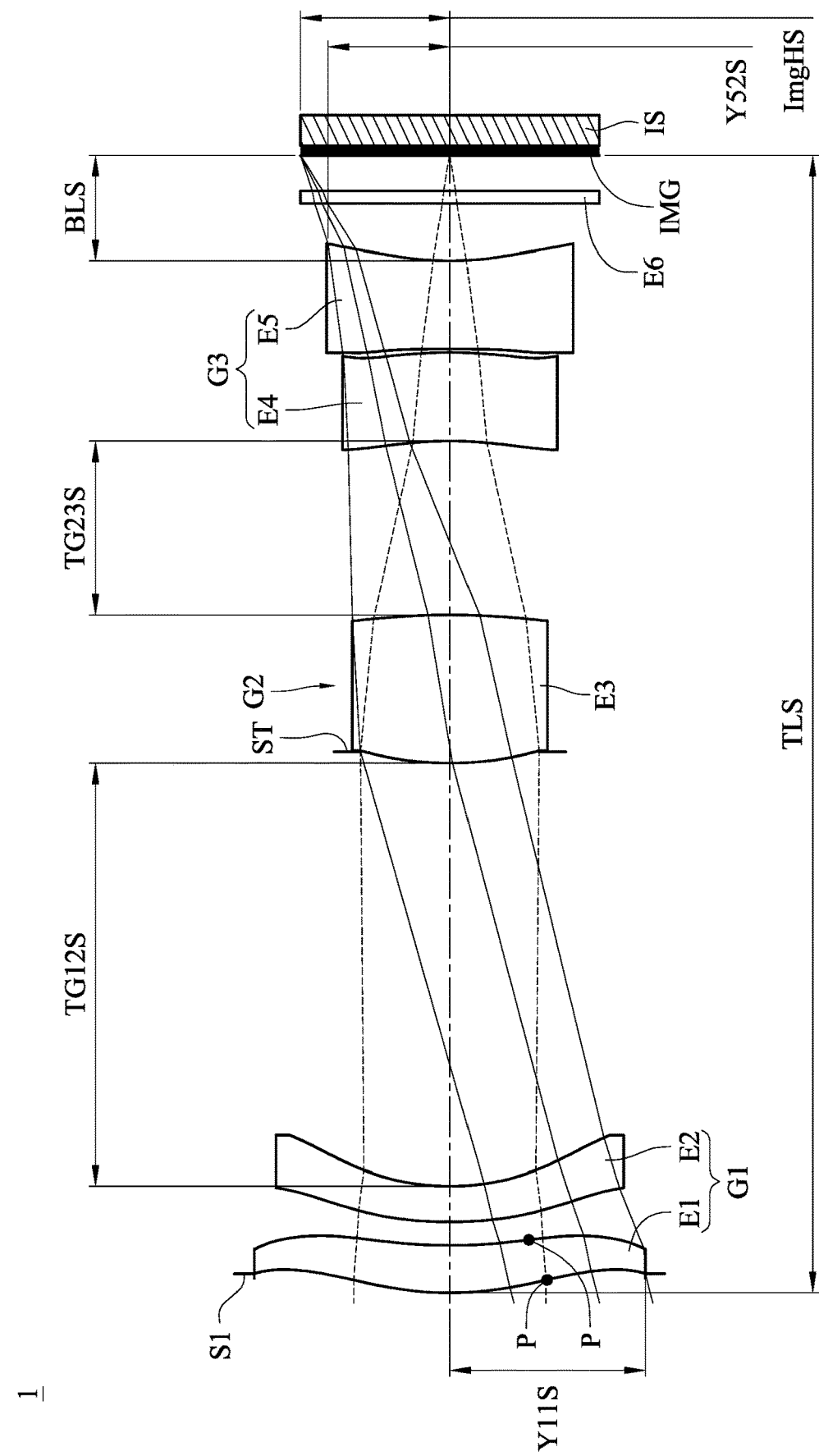
FIG. 20 shows a schematic view of the image capturing unit at the short focal length end, Y11S, TG12S, TG23S, TLS, BLS, Y52S, ImgHS and inflection points of the first lens element according to the 1st embodiment of the present disclosure.
Figure 21:
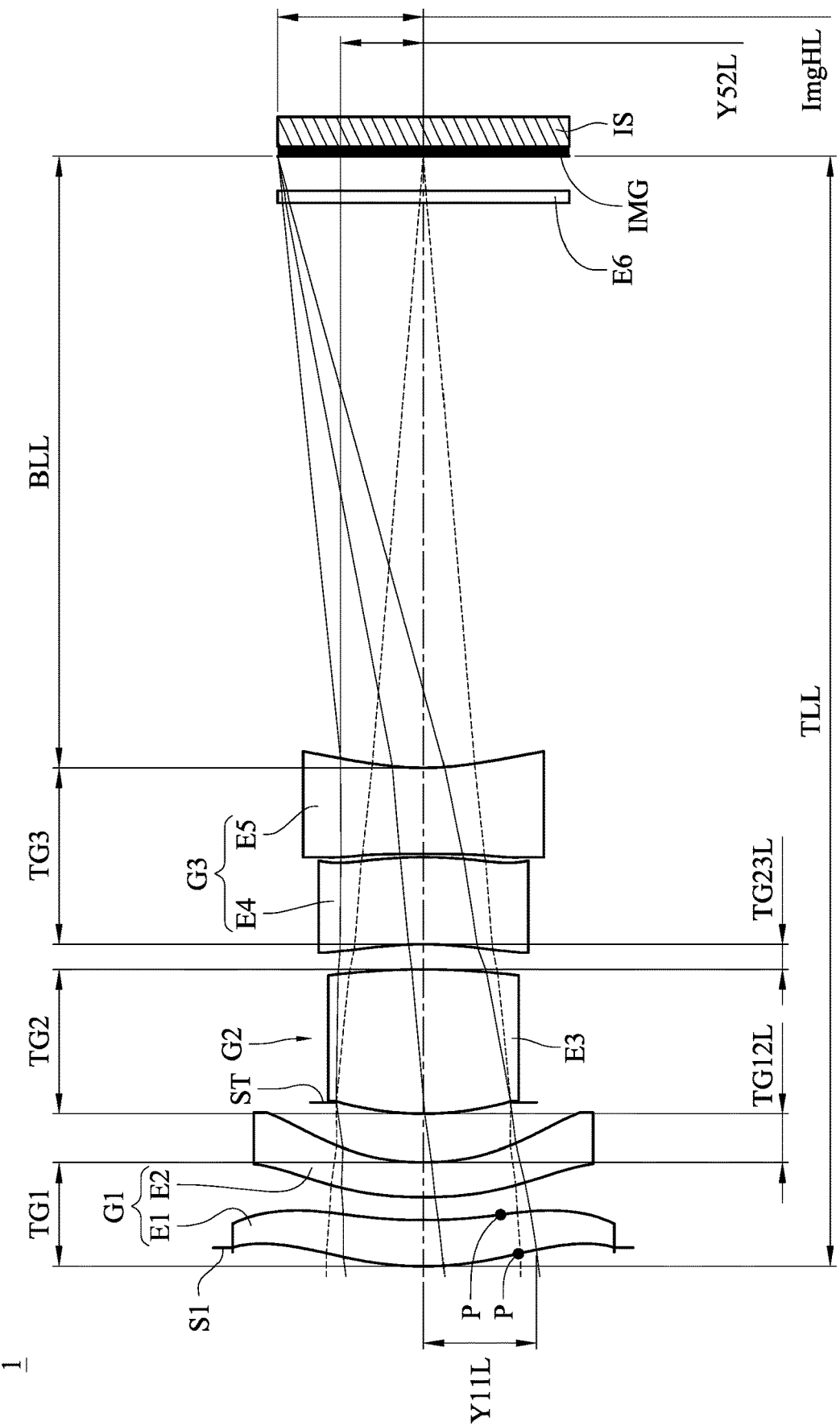
FIG. 21 shows a schematic view of the image capturing unit at the long focal length end, Y11L, TG12L, TG23L, TLL, BLL, Y52L, ImgHL, TG1, TG2, TG3 and the inflection points of the first lens element according to the 1st embodiment of the present disclosure.

At least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end. Therefore, it is favorable for increasing the shape variation of the lens element so as to miniaturize the lens element and improve image quality. Moreover, there can be at least one surface of at least one lens element in the first lens group having at least one inflection point in an optically effective area thereof when the image system lens assembly is at the long focal length end and in an optically effective area thereof when the image system lens assembly is at the short focal length end. Moreover, said at least one surface of at least one lens element refers to at least one of the object-side surface and the image-side surface of the at least one lens element. Please refer to FIG. 20 and FIG. 21, which show schematic views of Y11S and Y11L and inflection points P of the object-side surface and the image-side surface of the first lens element E1 according to the 1st embodiment of the present disclosure. Moreover, an optically effective area of one lens surface when the image system lens assembly is at the long focal length end may be larger or smaller than an optically effective area of the one lens surface when the image system lens assembly is at the short focal length end. For example, as shown in FIG. 20 and FIG. 21, a maximum distance between an optically effective area of the object-side surface of the first lens element E1 and the optical axis when the image system lens assembly is at the long focal length end is Y11L, and a maximum distance between an optically effective area of the object-side surface of the first lens element E1 and the optical axis when the image system lens assembly is at the short focal length end is Y11S, so as can be seen, the optically effective area of the object-side surface of the first lens element E1 when the image system lens assembly is at the long focal length end is different from the optically effective area of the object-side surface of the first lens element E1 when the image system lens assembly is at the short focal length end according to the 1st embodiment of the present disclosure. Furthermore, as shown in FIG. 21, the object-side surface of the first lens element E1 has an inflection point P in the optically effective area thereof when the image system lens assembly is at the long focal length end, and as shown in FIG. 20, the object-side surface of the first lens element E1 also has an inflection point P in the optically effective area thereof when the image system lens assembly is at the short focal length end. The inflection points P of the object-side surface and the image-side surface of the first lens element E1 in FIG. 20 and FIG. 21 are only exemplary. Each of the object-side surfaces and the image-side surfaces of the lens elements in the 1st and other embodiments of the present disclosure can have at least one inflection point in an optically effective area thereof when the image system lens assembly is at the long focal length end and in an optically effective area thereof when the image system lens assembly is at the short focal length end.

The object-side surface of the first lens element can be convex in a paraxial region thereof. Therefore, it is favorable for adjusting incident angle of light from various fields so as to increase the zoom ratio.

The object-side surface of the second lens element can be convex in a paraxial region thereof. Therefore, it is favorable for reducing surface reflection of light from various fields on the second lens element. The image-side surface of the second lens element can be concave in a paraxial region thereof. Therefore, it is favorable for correcting aberrations, such as astigmatism.

The third lens element can have positive refractive power. Therefore, it is favorable for increasing the zoom ratio and reducing the size of the image system lens assembly. The object-side surface of the third lens element can be convex in a paraxial region thereof. Therefore, it is favorable for adjusting the travelling direction of light so as to increase the zoom ratio and reduce the outer diameter of the image system lens assembly.

The image-side surface of the fifth lens element can be concave in a paraxial region thereof. Therefore, it is favorable for adjusting the back focal length.

When an Abbe number of the first lens element is V1, an Abbe number of the second lens element is V2, an Abbe number of the third lens element is V3, an Abbe number of the fourth lens element is V4, an Abbe number of the fifth lens element is V5, a refractive index of the first lens element is N1, a refractive index of the second lens element is N2, a refractive index of the third lens element is N3, a refractive index of the fourth lens element is N4, a refractive index of the fifth lens element is N5, an Abbe number of one of the five lens elements is Vi, a refractive index of the one of the five lens elements is Ni, and a minimum value of Vi/Ni is (Vi/Ni)min, the following condition is satisfied: $6.0<(Vi/Ni)min<12.3$, wherein i=1, 2, 3, 4 or 5. Therefore, it is favorable for providing a proper lens material distribution of the image system lens assembly so as to reduce the size and correct aberrations.

When half of a maximum field of view of the image system lens assembly at the short focal length end is HFOVS, the following condition is satisfied: 3.0 degrees<HFOVS<30.0 degrees. Therefore, it is favorable for adjusting the viewing angle of the image system lens assembly at the short focal length end for various applications. Moreover, the following condition can also be satisfied: 5.0 degrees<HFOVS<25.0 degrees. Moreover, the following condition can also be satisfied: 7.0 degrees<HFOVS<20.0 degrees.

When the maximum distance between the optically effective area of the object-side surface of the first lens element and the optical axis when the image system lens assembly is at the long focal length end is Y11L, and a maximum distance between an optically effective area of the image-side surface of the fifth lens element and the optical axis when the image system lens assembly is at the long focal length end is Y52L, the following condition is satisfied: $0.50<Y11L/Y52L<2.0$. Therefore, it is favorable for adjusting the travelling direction of light when the image system lens assembly is at the long focal length end so as to obtain a balance among the field of view, size distribution and image quality. Moreover, the following condition can also be satisfied: $0.55<Y11L/Y52L<1.8$. Please refer to FIG. 21, which shows a schematic view of Y11L and Y52L according to the 1st embodiment of the present disclosure. In addition, the image system lens assembly in FIG. 21 is at the long focal length end.

When the maximum distance between the optically effective area of the object-side surface of the first lens element and the optical axis when the image system lens assembly is at the short focal length end is Y11S, and a maximum distance between an optically effective area of the image-side surface of the fifth lens element and the optical axis when the image system lens assembly is at the short focal length end is Y52S, the following condition is satisfied: $0.50<Y11S/Y52S<2.0$. Therefore, it is favorable for adjusting the travelling direction of light when the image system lens assembly is at the short focal length end so as to obtain a balance among the field of view, size distribution and image quality. Moreover, the following condition can also be satisfied: $0.55<Y11S/Y52S<1.8$. Please refer to FIG. 20, which shows a schematic view of Y11S and Y52S according to the 1st embodiment of the present disclosure. In addition, the image system lens assembly in FIG. 20 is at the short focal length end.

When a focal length of the first lens element is f1, a focal length of the second lens element is f2, and a focal length of the third lens element is f3, the following condition can be satisfied: $|f3/f1+f3/f2|<0.60$. Therefore, it is favorable for adjusting the refractive power distribution so as to correct aberrations. Moreover, the following condition can also be satisfied: $|f3/f1+f3/f2|<0.40$. Moreover, the following condition can also be satisfied: $|f3/f1+f3/f2|<0.25$.

When the focal length of the third lens element is f3, and a composite focal length of the fourth lens element and the fifth lens element is f45, the following condition can be satisfied: $|f45/f3|<4.0$. Therefore, it is favorable for adjusting the refractive power distribution so as to correct aberrations. Moreover, the following condition can also be satisfied: $0.30<|f45/f3|<3.5$. Moreover, the following condition can also be satisfied: $0.60<|f45/f3|<3.0$. Moreover, the following condition can also be satisfied: $0.90<|f45/f3|<2.5$.

When a composite focal length of the first lens element and the second lens element is f12, and the composite focal length of the fourth lens element and the fifth lens element is f45, the following condition can be satisfied: $|f45/f12|<1.4$. Therefore, it is favorable for adjusting the refractive power distribution so as to correct aberrations. Moreover, the following condition can also be satisfied: $|f45/f12|<1.0$. Moreover, the following condition can also be satisfied: $|f45/f12|<0.70$. Moreover, the following condition can also be satisfied: $|f45/f12|<0.40$.

When half of a maximum field of view of the image system lens assembly at the long focal length end is HFOVL, the following condition can be satisfied: 3.0 degrees<HFOVL<12.0 degrees. Therefore, it is favorable for adjusting the viewing angle of the image system lens assembly at the long focal length end for various applications.

When an axial distance between a most image-side surface of the second lens group and a most object-side surface of the third lens group when the image system lens assembly is at the long focal length end is TG23L, an axial distance between the most image-side surface of the second lens group and the most object-side surface of the third lens group when the image system lens assembly is at the short focal length end is TG23S, and an axial distance between the most object-side surface and a most image-side surface of the third lens group is TG3, the following condition can be satisfied: $0.30<(TG23S-TG23L)/TG3<3.0$. Therefore, it is favorable for the second lens group and the third lens group to work collaboratively with each other so as to provide consistent image quality during the zooming process. Moreover, the following condition can also be satisfied: $0.35<(TG23S-TG23L)/TG3<2.6$. Moreover, the following condition can also be satisfied: $0.40<(TG23S-TG23L)/TG3<2.2$. Please refer to FIG. 20 and FIG. 21, which respectively show schematic views of TG23S, TG23L and TG3 according to the 1st embodiment of the present disclosure. The most image-side surface of the second lens group G2 is the image-side surface of the third lens element E3, which is a lens surface closest to the image side in the second lens group G2. The most object-side surface of the third lens group G3 is the object-side surface of the fourth lens element E4, which is a lens surface closest to the object side in the third lens group G3. The most image-side surface of the third lens group G3 is the image-side surface of the fifth lens element E5, which is a lens surface closest to the image side in the third lens group G3.

When a focal length of the second lens group is fG2, and a focal length of the third lens group is fG3, the following condition can be satisfied: −2.7<fG3/fG2<−0.75. Therefore, it is favorable for the second lens group and the third lens group to work collaboratively with other each so as to obtain a balance between the size and image quality. Moreover, the following condition can also be satisfied: −2.3<fG3/fG2<−0.90. Said focal length of one lens group is a composite focal length of all lens elements in the one lens group.

When a focal length of the image system lens assembly at the short focal length end is fS, and a focal length of the first lens group is fG1, the following condition can be satisfied: |fS/fG1|<0.40. Therefore, it is favorable for adjusting the refractive power distribution of the image system lens assembly at the short focal length end so as to improve image quality at the short focal length end. Moreover, the following condition can also be satisfied: |fS/fG1|<0.30. Moreover, the following condition can also be satisfied: |fS/fG1|<0.20.

When the focal length of the image system lens assembly at the short focal length end is fS, and the focal length of the second lens group is fG2, the following condition can be satisfied: 1.1<fS/fG2<2.0. Therefore, it is favorable for reducing the total track length of the image system lens assembly at the short focal length end.

When the focal length of the image system lens assembly at the short focal length end is fS, and the focal length of the third lens group is fG3, the following condition can be satisfied: −2.0<fS/fG3<−0.50. Therefore, it is favorable for balancing the refractive power distribution of the image system lens assembly at the short focal length end so as to improve image quality. Moreover, the following condition can also be satisfied: −1.7<fS/fG3<−0.60.

When a maximum value among refractive indices of the five lens elements is Nmax, the following condition can be satisfied: 1.65<Nmax<2.00. Therefore, it is favorable for arranging the material distribution of lens elements so as to reduce the size and correct aberrations.

When the Abbe number of the second lens element is V2, and the Abbe number of the third lens element is V3, the following condition can be satisfied: 1.2<V3/V2<2.4. Therefore, it is favorable for the second lens element and the third lens element to work collaboratively with each other so as to correct chromatic aberration. Moreover, the following condition can also be satisfied: 1.4<V3/V2<2.2.

When an axial distance between a most object-side surface and a most image-side surface of the first lens group is TG1, and an axial distance between a most object-side surface and the most image-side surface of the second lens group is TG2, the following condition can be satisfied: 0.60<TG1/TG2<2.4. Therefore, it is favorable for adjusting the arrangement of the lens groups so as to reduce the size of the image system lens assembly. Please refer to FIG. 21, which shows a schematic view of TG1 and TG2 according to the 1st embodiment of the present disclosure. The most object-side surface of the first lens group G1 is the object-side surface of the first lens element E1, which is a lens surface closest to the object side in the first lens group G1. The most image-side surface of the first lens group G1 is the image-side surface of the second lens element E2, which is a lens surface closest to the image side in the first lens group G1. The most object-side surface of the second lens group G2 is the object-side surface of the third lens element E3, which is a lens surface closest to the object side in the second lens group G2. The most image-side surface of the second lens group G2 is the image-side surface of the third lens element E3, which is a lens surface closest to the image side in the second lens group G2.

When the axial distance between the most object-side surface and the most image-side surface of the second lens group is TG2, and the axial distance between the most object-side surface and the most image-side surface of the third lens group is TG3, the following condition can be satisfied: 0.10<TG2/TG3<3.4. Therefore, it is favorable for adjusting the arrangement of the lens groups so as to reduce the size of the image system lens assembly. Moreover, the following condition can also be satisfied: 0.20<TG2/TG3<2.7. Moreover, the following condition can also be satisfied: 0.30<TG2/TG3<2.0.

When an axial distance between the object-side surface of the first lens element and the image surface when the image system lens assembly is at the long focal length end is TLL, and a maximum image height of the image system lens assembly at the long focal length end (which can be half of a diagonal length of an effective photosensitive area of an image sensor) is ImgHL, the following condition can be satisfied: 5.0<TLL/ImgHL<9.0. Therefore, it is favorable for obtaining a balance between the total track length and the area of the image surface when the image system lens assembly is at the long focal length end. Please refer to FIG. 21, which shows a schematic view of TLL and ImgHL according to the 1st embodiment of the present disclosure.

When an axial distance between the object-side surface of the first lens element and the image surface when the image system lens assembly is at the short focal length end is TLS, and a maximum image height of the image system lens assembly at the short focal length end (which can be half of the diagonal length of the effective photosensitive area of the image sensor) is ImgHS, the following condition can be satisfied: 5.0<TLS/ImgHS<9.0. Therefore, it is favorable for obtaining a balance between the total track length and the area of the image surface when the image system lens assembly is at the short focal length end. Please refer to FIG. 20, which shows a schematic view of TLS and ImgHS according to the 1st embodiment of the present disclosure.

When the focal length of the first lens group is fG1, and the focal length of the second lens group is fG2, the following condition can be satisfied: |fG2/fG1|<0.22. Therefore, it is favorable for the first lens group and the second lens group to work collaboratively with each other so as to increase the zoom ratio and image quality. Moreover, the following condition can also be satisfied: |fG2/fG1|<0.17.

When a focal length of the image system lens assembly at the long focal length end is fL, and the focal length of the image system lens assembly at the short focal length end is fS, the following condition can be satisfied: 1.2<fL/fS<4.1. Therefore, it is favorable for increasing the zoom ratio while ensuring a compact size and good image quality. Moreover, the following condition can also be satisfied: 1.4<fL/fS<3.1.

When the focal length of the first lens element is f1, the focal length of the second lens element is f2, the focal length of the third lens element is f3, a focal length of the fourth lens element is f4, and a focal length of the fifth lens element is f5, the following condition can be satisfied: |f3/f1|+|f3/f2|+|f3/f4|+|f3/f5|<1.8. Therefore, it is favorable for adjusting the refractive power distribution of the lens elements so as to reduce the size and correct aberrations.

When the focal length of the third lens group is fG3, an axial distance between the image-side surface of the fifth lens element and the image surface when the image system lens assembly is at the long focal length end is BLL, and an axial distance between the image-side surface of the fifth lens element and the image surface when the image system lens assembly is at the short focal length end is BLS, the following condition can be satisfied: 0<fG3/(BLS−BLL)<3.2. Therefore, it is favorable for adjusting the refractive power and the movement of the third lens group so as to balance the image quality during the zooming process and reduce the position variation of the image surface. Moreover, the following condition can also be satisfied: 0.40<fG3/(BLS−BLL)<2.7. Please refer to FIG. 20 and FIG. 21, which respectively show schematic views of BLS and BLL according to the 1st embodiment of the present disclosure.

When the focal length of the third lens element is f3, and the composite focal length of the first lens element and the second lens element is f12, the following condition can be satisfied: |f3/f12|<0.25. Therefore, it is favorable for adjusting the refractive power distribution of the lens elements so as to reduce the size. Moreover, the following condition can also be satisfied: |f3/f12|<0.20. Moreover, the following condition can also be satisfied: |f3/f12|<0.15.

When a curvature radius of the object-side surface of the second lens element is R3, and a curvature radius of the image-side surface of the second lens element is R4, the following condition can be satisfied: 0.75<R3/R4<2.5. Therefore, it is favorable for adjusting the surface shape of the second lens element so as to correct aberrations, such as astigmatism.

When the focal length of the first lens group is fG1, and the focal length of the third lens group is fG3, the following condition can be satisfied: |fG3/fG1|<1.4. Therefore, it is favorable for adjusting the refractive power distribution of the lens groups so as to balance the image quality during the zooming process. Moreover, the following condition can also be satisfied: |fG3/fG1|<1.1. Moreover, the following condition can also be satisfied: |fG3/fG1|<0.80. Moreover, the following condition can also be satisfied: |fG3/fG1|<0.50.

When the axial distance between the object-side surface of the first lens element and the image surface when the image system lens assembly is at the short focal length end is TLS, and the focal length of the image system lens assembly at the short focal length end is fS, the following condition can be satisfied: 1.5<TLS/fS<2.1. Therefore, it is favorable for obtaining a balance between the total track length and the field of view of the image system lens assembly at the short focal length end. Please refer to FIG. 20, which shows a schematic view of TLS according to the 1st embodiment of the present disclosure.

When an f-number of the image system lens assembly at the short focal length end is FnoS, the following condition can be satisfied: 2.2<FnoS<3.8. Therefore, it is favorable for obtaining a balance between the depth of field and illuminance when the image system lens assembly is at the short focal length end. Moreover, the following condition can also be satisfied: 2.5<FnoS<3.5.

When the axial distance between the object-side surface of the first lens element and the image surface when the image system lens assembly is at the long focal length end is TLL, and the axial distance between the object-side surface of the first lens element and the image surface when the image system lens assembly is at the short focal length end is TLS, the following condition can be satisfied: |TLL/TLS−1|<1.0E−2. Therefore, it is favorable for adjusting the lens elements and the image surface distribution during the zooming process so as to simplify the structure of the image system lens assembly. Moreover, the following condition can also be satisfied: |TLL/TLS−1|<5.0E−3. Moreover, the following condition can also be satisfied: |TLL/TLS−1|<2.5E−3. Moreover, the following condition can also be satisfied: |TLL/TLS−1|<1.2E−3. Please refer to FIG. 20 and FIG. 21, which respectively show schematic views of TLS and TLL according to the 1st embodiment of the present disclosure.

When the maximum distance between the optically effective area of the object-side surface of the first lens element and the optical axis when the image system lens assembly is at the long focal length end is Y11L, and the maximum image height of the image system lens assembly at the long focal length end is ImgHL, the following condition can be satisfied: 0.50<Y11L/ImgHL<2.0. Therefore, it is favorable for adjusting the travelling direction of light when the image system lens assembly is at the long focal length end so as to reduce the outer diameter and increase the image surface. Moreover, the following condition can also be satisfied: 0.65<Y11L/ImgHL<1.6. Please refer to FIG. 21, which shows a schematic view of Y11L and ImgHL according to the 1st embodiment of the present disclosure.

When the maximum distance between the optically effective area of the object-side surface of the first lens element and the optical axis when the image system lens assembly is at the short focal length end is Y11S, and the maximum image height of the image system lens assembly at the short focal length end is ImgHS, the following condition can be satisfied: 0.50<Y11S/ImgHS<2.0. Therefore, it is favorable for adjusting the travelling direction of light when the image system lens assembly is at the short focal length end so as to reduce the outer diameter and increase the image surface. Moreover, the following condition can also be satisfied: 0.65<Y11S/ImgHS<1.6. Please refer to FIG. 20, which shows a schematic view of Y11S and ImgHS according to the 1st embodiment of the present disclosure.

When an axial distance between the most image-side surface of the first lens group and the most object-side surface of the second lens group when the image system lens assembly is at the long focal length end is TG12L, an axial distance between the most image-side surface of the first lens group and the most object-side surface of the second lens group when the image system lens assembly is at the short focal length end is TG12S, and the focal length of the second lens group is fG2, the following condition can be satisfied: 0.22<(TG12S−TG12L)/fG2<1.1. Therefore, it is favorable for the first lens group and the second lens group to work collaboratively with each other so as to increase the zoom ratio. Please refer to FIG. 20 and FIG. 21, which respectively show schematic views of TG12S and TG12L according to the 1st embodiment of the present disclosure.

When a central thickness of the first lens element is CT1, a central thickness of the second lens element is CT2, and an axial distance between the first lens element and the second lens element is T12, the following condition can be satisfied: 1.6<(CT1+CT2)/T12<15. Therefore, it is favorable for the first lens element and the second lens element to work collaboratively with each other so as to reduce the size of the object side of the image system lens assembly. Moreover, the following condition can also be satisfied: 2.1<(CT1+CT2)/T12<12. Moreover, the following condition can also be satisfied: 2.6<(CT1+CT2)/T12<9.5.

According to the present disclosure, the aforementioned features and conditions can be utilized in numerous combinations so as to achieve corresponding effects.

According to the present disclosure, the lens elements of the image system lens assembly can be made of either glass or plastic material. When the lens elements are made of glass material, the refractive power distribution of the image system lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image system lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the image system lens assembly, based on the corresponding image sensor, can be flat or curved, especially a curved surface being concave facing towards the object side of the image system lens assembly.

According to the present disclosure, an image correction unit, such as a field flattener, can be optionally disposed between the lens element closest to the image side of the image system lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 22:
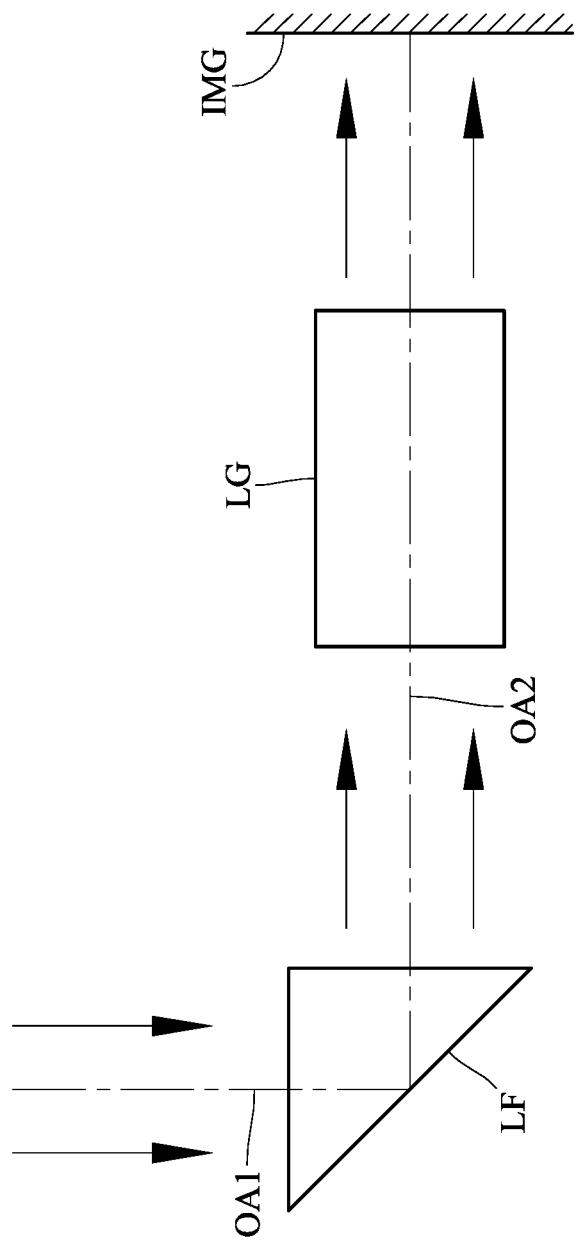
FIG. 22 shows a schematic view of a configuration of one light-folding element in an image system lens assembly according to one embodiment of the present disclosure.
Figure 23:
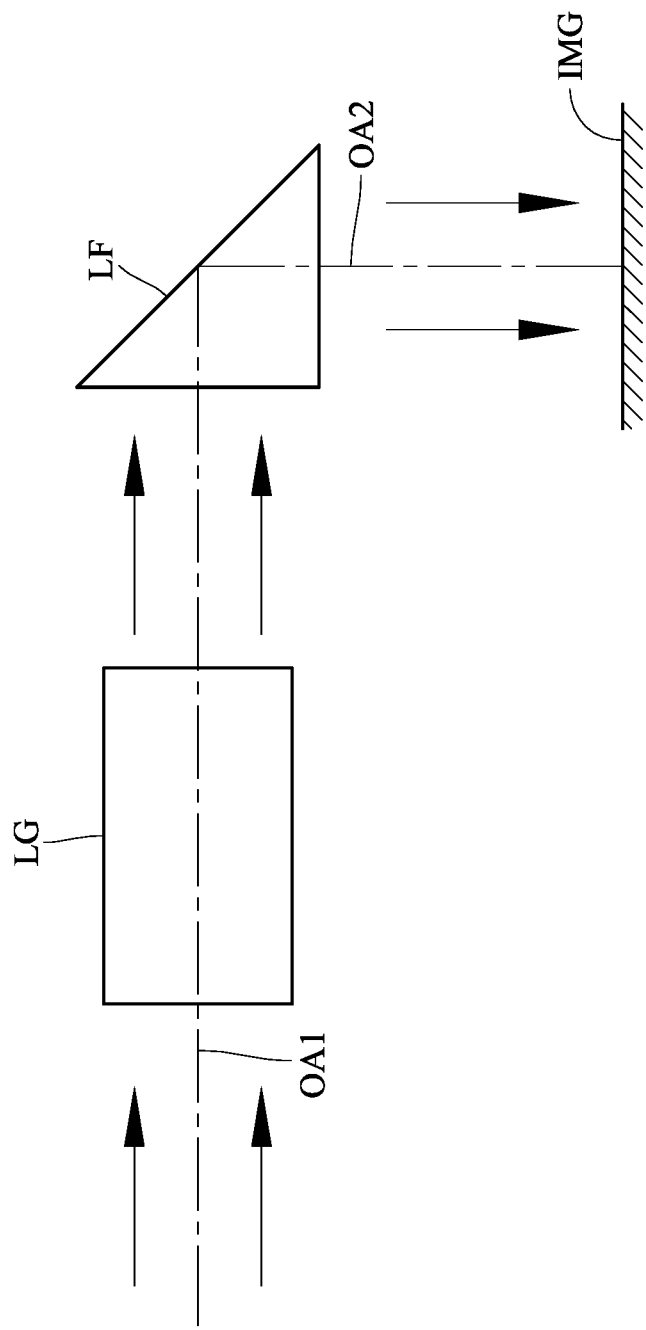
FIG. 23 shows a schematic view of another configuration of one light-folding element in an image system lens assembly according to one embodiment of the present disclosure.
Figure 24:
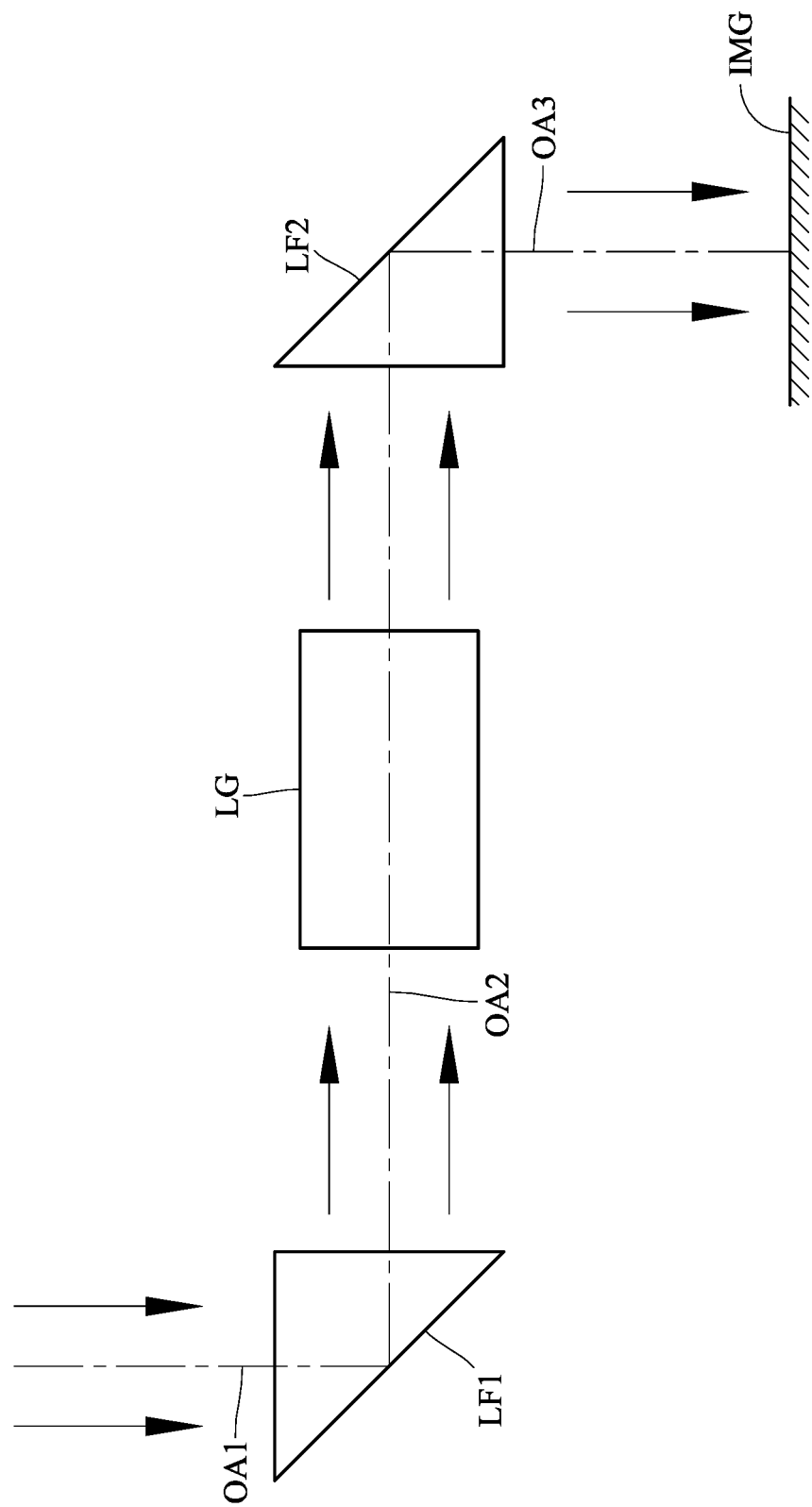
FIG. 24 shows a schematic view of a configuration of two light-folding elements in an image system lens assembly according to one embodiment of the present disclosure.

According to the present disclosure, at least one light-folding element, such as a prism or a mirror, can be optionally disposed between an imaged object and the image surface on the imaging optical path, such that the image system lens assembly can be more flexible in space arrangement, and therefore the dimensions of an electronic device is not restricted by the total track length of the image system lens assembly. Moreover, the at least one light-folding element can be disposed on the object side of the first lens element. Moreover, the at least one light-folding element can include at least one prism. Moreover, the prism can have refractive power, and the surface of the prism can include a non-planar surface, such as spherical surface, aspheric surface, concave surface or convex surface. Therefore, it is favorable for improving image quality. Specifically, please refer to FIG. 22 and FIG. 23. FIG. 22 shows a schematic view of a configuration of one light-folding element in an image system lens assembly according to one embodiment of the present disclosure, and FIG. 23 shows a schematic view of another configuration of one light-folding element in an image system lens assembly according to one embodiment of the present disclosure. In FIG. 22 and FIG. 23, the image system lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the image system lens assembly as shown in FIG. 22 or disposed between a lens group LG of the image system lens assembly and the image surface IMG as shown in FIG. 23. Furthermore, please refer to FIG. 24, which shows a schematic view of a configuration of two light-folding elements in an image system lens assembly according to one embodiment of the present disclosure. In FIG. 24, the image system lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image system lens assembly, the second light-folding element LF2 is disposed between the lens group LG of the image system lens assembly and the image surface IMG, and the travelling direction of light on the first optical axis OA1 can be the same direction as the travelling direction of light on the third optical axis OA3 as shown in FIG. 24. The image system lens assembly can be optionally provided with three or more light-folding elements, and the present disclosure is not limited to the type, amount and position of the light-folding elements of the embodiments disclosed in the aforementioned figures.

According to the present disclosure, the image system lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the image system lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the image system lens assembly and thereby provides a wider field of view for the same.

According to the present disclosure, the image system lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the image system lens assembly can include one or more optical elements for limiting the form of light passing through the image system lens assembly. Each optical element can be, but not limited to, a filter, a polarizer, etc., and each optical element can be, but not limited to, a single-piece element, a composite component, a thin film, etc. The optical element can be located at the object side or the image side of the image system lens assembly or between any two adjacent lens elements so as to allow light in a specific form to pass through, thereby meeting application requirements.

According to the present disclosure, the image system lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
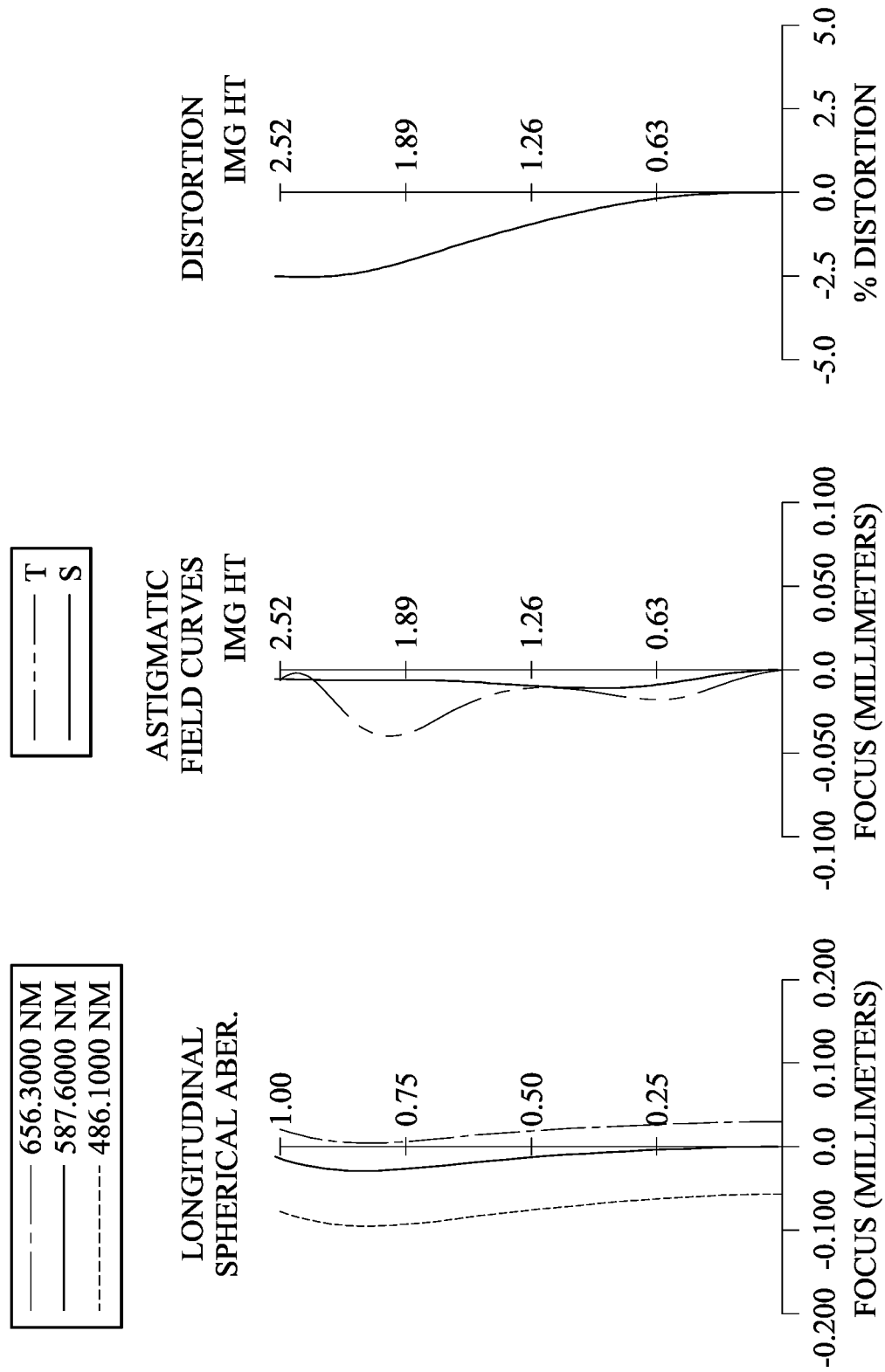
FIG. 2 shows spherical aberration curves, astigmatic field curves and a distortion curve of the image capturing unit at the short focal length end according to the 1st embodiment.
Figure 3:
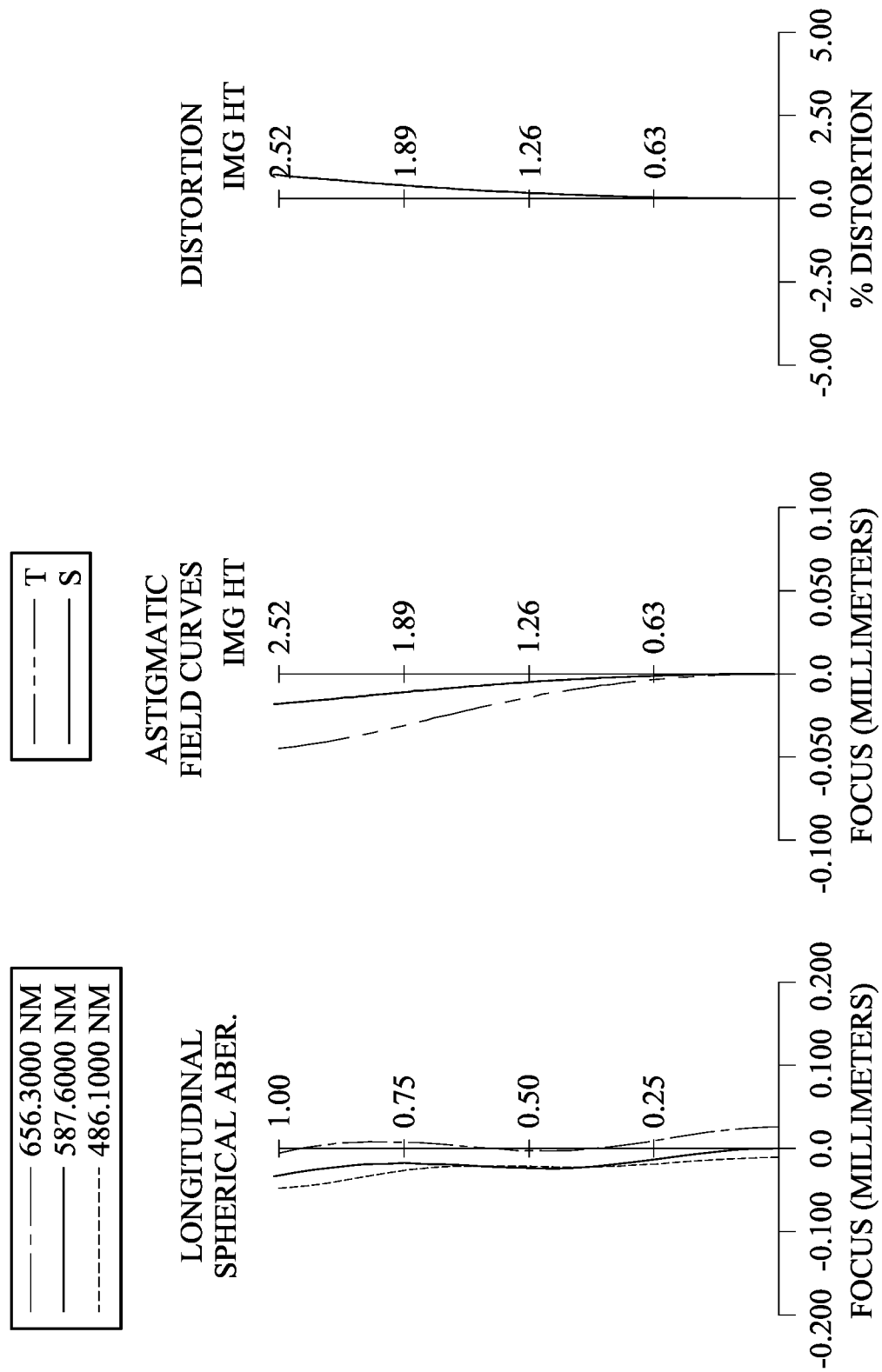
FIG. 3 shows spherical aberration curves, astigmatic field curves and a distortion curve of the image capturing unit at the long focal length end according to the 1st embodiment.

FIG. 1 is a schematic view of an image capturing unit respectively at the short focal length end and the long focal length end according to the 1st embodiment of the present disclosure. FIG. 2 shows, in order from left to right, spherical aberration curves, astigmatic field curves and a distortion curve of the image capturing unit at the short focal length end according to the 1st embodiment. FIG. 3 shows, in order from left to right, spherical aberration curves, astigmatic field curves and a distortion curve of the image capturing unit at the long focal length end according to the 1st embodiment. The upper part of FIG. 1 shows the image system lens assembly at the short focal length end, and the lower part of FIG. 1 shows the image system lens assembly at the long focal length end. In FIG. 1, the image capturing unit 1 includes the image system lens assembly (its reference numeral is omitted) of the present disclosure and an image sensor IS. The image system lens assembly includes, in order from an object side to an image side along an optical path, a stop S1, a first lens element E1, a second lens element E2, an aperture stop ST, a third lens element E3, a fourth lens element E4, a fifth lens element E5, a filter E6 and an image surface IMG. Further, the image system lens assembly includes, in order from the object side to the image side along the optical path, a first lens group G1, a second lens group G2 and a third lens group G3. The first lens group G1 includes the first lens element E1 and the second lens element E2, the second lens group G2 includes the third lens element E3, and the third lens group G3 includes the fourth lens element E4 and the fifth lens element E5. Moreover, the first lens group G1 has negative refractive power, the second lens group G2 has positive refractive power, and the third lens group G3 has negative refractive power. The image system lens assembly includes five lens elements (E1, E2, E3, E4, and E5) with no additional lens element disposed between each of the adjacent five lens elements.

The focal length of the image system lens assembly is variable by changing axial distances between any adjacent two of the three lens groups (G1, G2, and G3) in a zooming process. As shown in FIG. 1, the second lens group G2 is moved relative to the first lens group G1 along an optical axis in the zooming process, and the third lens group G3 is moved relative to the first lens group G1 along the optical axis in the zooming process. Furthermore, through the zooming process, the image system lens assembly has a short focal length end as shown in the upper part of FIG. 1 and a long focal length end as shown in the lower part of FIG. 1. In addition, when the image system lens assembly zooms in from the short focal length end to the long focal length end during the zooming process, the second lens group G2 is moved along the optical axis toward the object side relative to the first lens group G1, and the third lens group G3 is moved along the optical axis toward the object side relative to the first lens group G1. On the other hand, the third lens group G3 is moved relative to the image surface IMG along the optical axis in the zooming process. In addition, when the image system lens assembly zooms in from the short focal length end to the long focal length end during the zooming process, the third lens group G3 is moved along the optical axis toward the object side relative to the image surface IMG. It is noted that there is no relative motion between lens elements of any of the three lens groups in the zooming process.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point in an optically effective area thereof when the image system lens assembly is at the long focal length end and in an optically effective area thereof when the image system lens assembly is at the short focal length end. The image-side surface of the first lens element E1 has at least one inflection point in an optically effective area thereof when the image system lens assembly is at the long focal length end and in an optically effective area thereof when the image system lens assembly is at the short focal length end.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point in an optically effective area thereof when the image system lens assembly is at the long focal length end and in an optically effective area thereof when the image system lens assembly is at the short focal length end. The image-side surface of the fourth lens element E4 has at least one inflection point in an optically effective area thereof when the image system lens assembly is at the long focal length end and in an optically effective area thereof when the image system lens assembly is at the short focal length end.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point in an optically effective area thereof when the image system lens assembly is at the long focal length end and in an optically effective area thereof when the image system lens assembly is at the short focal length end.

The filter E6 is made of glass material and located between the fifth lens element E5 and the image surface IMG, and will not affect the focal length of the image system lens assembly. The image sensor IS is disposed on or near the image surface IMG.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma(Ai)\times(Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, and 18.

In the image system lens assembly of the image capturing unit 1 according to the 1st embodiment, a focal length of the image system lens assembly is f, an f-number of the image system lens assembly is Fno, half of a maximum field of view of the image system lens assembly is HFOV, an axial distance between an imaged object and the stop S1 is D0, an axial distance between the second lens element E2 and the aperture stop ST is D1, an axial distance between the third lens element E3 and the fourth lens element E4 is D2, and an axial distance between the fifth lens element E5 and the filter E6 is D3.

Through the zooming process, some of the aforementioned parameters have different values when the image system lens assembly is at the short focal length end or at the long focal length end. Specifically, a focal length of the image system lens assembly at the short focal length end is fS, a focal length of the image system lens assembly at the long focal length end is fL, an f-number of the image system lens assembly at the short focal length end is FnoS, an f-number of the image system lens assembly at the long focal length end is FnoL, half of a maximum field of view of the image system lens assembly at the short focal length end is HFOVS, and half of a maximum field of view of the image system lens assembly at the long focal length end is HFOVL.

Furthermore, the image system lens assembly performs a focusing process according to an object distance, and with different focusing conditions, the aforementioned parameters may have different values. In this embodiment, two of various focusing states of the image system lens assembly according to different focusing conditions are provided (i.e., different object distances). A first focusing state of the image system lens assembly is a state where the image system lens assembly focuses on an imaged object located at infinity, and a second focusing state of the image system lens assembly is a state where the image system lens assembly focuses on an imaged object located at a finite distance. Note that FIG. 1 shows the image system lens assembly in the first focusing state, and the following provides data of the image system lens assembly in the first focusing state.

When the image system lens assembly is at the short focal length end, the aforementioned parameters have the following values: fS=10.08 mm, FnoS=3.11, HFOVS=14.5 degrees, D0=∞ (infinity), D1=7.331 mm, D2=2.930 mm, and D3=0.962 mm.

When the image system lens assembly is at the long focal length end, the aforementioned parameters have the following values: fL=19.98 mm FnoL=5.97, HFOVL=7.2 degrees, D0=Do, D1=1.029 mm, D2=0.434 mm, and D3=9.760 mm.

When a focal length of the first lens group G1 is fG1, a focal length of the second lens group G2 is fG2, and a focal length of the third lens group G3 is fG3, the following conditions are satisfied: fG1=−210.67 mm; fG2=6.64 mm; and fG3=−7.09 mm.

When an Abbe number of the first lens element E1 is V1, an Abbe number of the second lens element E2 is V2, an Abbe number of the third lens element E3 is V3, an Abbe number of the fourth lens element E4 is V4, an Abbe number of the fifth lens element E5 is V5, an Abbe number of the i-th lens element is Vi, a refractive index of the first lens element E1 is N1, a refractive index of the second lens element E2 is N2, a refractive index of the third lens element E3 is N3, a refractive index of the fourth lens element E4 is N4, a refractive index of the fifth lens element E5 is N5, a refractive index of the i-th lens element is Ni, and a minimum value of Vi/Ni is (Vi/Ni)min, the following condition is satisfied: (Vi/Ni)min=10.90, wherein i=1, 2, 3, 4 or 5. In this embodiment, among the first through fifth lens elements (E1-E5), a ratio of the Abbe number and the refractive index of the fourth lens element E4 is smaller than that of the other lens elements, and (Vi/Ni)min is equal to the ratio of the Abbe number and the refractive index of the fourth lens element E4.

When a maximum value among refractive indices of the five lens elements is Nmax, the following condition is satisfied: Nmax=1.686. In this embodiment, the refractive index of the fourth lens element E4 is larger than that of the other lens elements, and Nmax is equal to the refractive index of the fourth lens element E4.

When the Abbe number of the second lens element E2 is V2, and the Abbe number of the third lens element E3 is V3, the following condition is satisfied: V3/V2=1.64.

When an axial distance between a most image-side surface of the first lens group G1 and a most object-side surface of the second lens group G2 when the image system lens assembly is at the long focal length end is TG12L, an axial distance between the most image-side surface of the first lens group G1 and the most object-side surface of the second lens group G2 when the image system lens assembly is at the short focal length end is TG12S, and the focal length of the second lens group G2 is fG2, the following condition is satisfied: (TG12S−TG12L)/fG2=0.95.

When an axial distance between a most image-side surface of the second lens group G2 and a most object-side surface of the third lens group G3 when the image system lens assembly is at the long focal length end is TG23L, an axial distance between the most image-side surface of the second lens group G2 and the most object-side surface of the third lens group G3 when the image system lens assembly is at the short focal length end is TG23S, and an axial distance between the most object-side surface and a most image-side surface of the third lens group G3 is TG3, the following condition is satisfied: (TG23S−TG23L)/TG3=0.82.

When the focal length of the third lens group G3 is fG3, an axial distance between the image-side surface of the fifth lens element E5 and the image surface IMG when the image system lens assembly is at the long focal length end is BLL, and an axial distance between the image-side surface of the fifth lens element E5 and the image surface IMG when the image system lens assembly is at the short focal length end is BLS, the following condition is satisfied: fG3/(BLS−BLL)=0.81.

When a central thickness of the first lens element E1 is CT1, a central thickness of the second lens element E2 is CT2, and an axial distance between the first lens element E1 and the second lens element E2 is T12, the following condition is satisfied: (CT1+CT2)/T12=3.53. In this embodiment, an axial distance between two adjacent lens elements is a distance in a paraxial region between two adjacent lens surfaces of the two adjacent lens elements.

When an axial distance between the object-side surface of the first lens element E1 and the image surface IMG when the image system lens assembly is at the long focal length end is TLL, and an axial distance between the object-side surface of the first lens element E1 and the image surface IMG when the image system lens assembly is at the short focal length end is TLS, he following condition is satisfied: |TLL/TLS−1|=0.00.

When an axial distance between a most object-side surface and the most image-side surface of the first lens group G1 is TG1, and an axial distance between the most object-side surface and the most image-side surface of the second lens group G2 is TG2, the following condition is satisfied: TG1/TG2=0.72.

When the axial distance between the most object-side surface and the most image-side surface of the second lens group G2 is TG2, and the axial distance between the most object-side surface and the most image-side surface of the third lens group G3 is TG3, the following condition is satisfied: TG2/TG3=0.82.

When the axial distance between the object-side surface of the first lens element E1 and the image surface IMG when the image system lens assembly is at the short focal length end is TLS, and the focal length of the image system lens assembly at the short focal length end is fS, the following condition is satisfied: TLS/fS=1.90.

When the axial distance between the object-side surface of the first lens element E1 and the image surface IMG when the image system lens assembly is at the long focal length end is TLL, and a maximum image height of the image system lens assembly at the long focal length end is ImgHL, the following condition is satisfied: TLL/ImgHL=7.61.

When the axial distance between the object-side surface of the first lens element E1 and the image surface IMG when the image system lens assembly is at the short focal length end is TLS, and a maximum image height of the image system lens assembly at the short focal length end is ImgHS, the following condition is satisfied: TLS/ImgHS=7.61.

When a curvature radius of the object-side surface of the second lens element E2 is R3, and a curvature radius of the image-side surface of the second lens element E2 is R4, the following condition is satisfied: R3/R4=1.90.

When the focal length of the first lens group G1 is fG1, and the focal length of the second lens group G2 is fG2, the following condition is satisfied: |fG2/fG1|=0.03.

When the focal length of the first lens group G1 is fG1, and the focal length of the third lens group G3 is fG3, the following condition is satisfied: |fG3/fG1|=0.03.

When the focal length of the second lens group G2 is fG2, and the focal length of the third lens group G3 is fG3, the following condition is satisfied: fG3/fG2=−1.07.

When the focal length of the image system lens assembly at the long focal length end is fL, and the focal length of the image system lens assembly at the short focal length end is fS, the following condition is satisfied: fL/fS=1.98.

When the focal length of the image system lens assembly at the short focal length end is fS, the focal length of the first lens group G1 is fG1, the focal length of the second lens group G2 is fG2, and the focal length of the third lens group G3 is fG3, the following condition is satisfied: |fS/fG1|=0.05; fS/fG2=1.52; and fS/fG3=−1.42.

When a focal length of the first lens element E1 is f1, a focal length of the second lens element E2 is f2, a focal length of the third lens element E3 is f3, a focal length of the fourth lens element E4 is f4, and a focal length of the fifth lens element E5 is f5, the following condition is satisfied: |f3/f1|+|f3/f2|+|f3/f4|+|f3/f5|=1.60.

When the focal length of the first lens element E1 is f1, the focal length of the second lens element E2 is f2, and the focal length of the third lens element E3 is f3, the following condition is satisfied: |f3/f1+f3/f2|=0.07.

When the focal length of the third lens element E3 is f3, and a composite focal length of the first lens element E1 and the second lens element E2 is f12, the following condition is satisfied: |f3/f12|=0.03.

When the focal length of the third lens element E3 is f3, and a composite focal length of the fourth lens element E4 and the fifth lens element E5 is f45, the following condition is satisfied: |f45/f3|=1.07.

When the composite focal length of the first lens element E1 and the second lens element E2 is f12, and the composite focal length of the fourth lens element E4 and the fifth lens element E5 is f45, the following condition is satisfied: |f45/f12|=0.03.

When a maximum distance between the optically effective area of the object-side surface of the first lens element E1 and the optical axis when the image system lens assembly is at the long focal length end is Y11L, and the maximum image height of the image system lens assembly at the long focal length end is ImgHL, the following condition is satisfied: Y11L/ImgHL=0.77

When a maximum distance between the optically effective area of the object-side surface of the first lens element E1 and the optical axis when the image system lens assembly is at the short focal length end is Y11S, and the maximum image height of the image system lens assembly at the short focal length end is ImgHS, the following condition is satisfied: Y11S/ImgHS=1.31.

When the maximum distance between the optically effective area of the object-side surface of the first lens element E1 and the optical axis when the image system lens assembly is at the long focal length end is Y11L, and a maximum distance between an optically effective area of the image-side surface of the fifth lens element E5 and the optical axis when the image system lens assembly is at the long focal length end is Y52L, the following condition is satisfied: Y11L/Y52L=1.36.

When the maximum distance between the optically effective area of the object-side surface of the first lens element and the optical axis when the image system lens assembly is at the short focal length end is Y11S, and a maximum distance between the optically effective area of the image-side surface of the fifth lens element E5 and the optical axis when the image system lens assembly is at the short focal length end is Y52S, the following condition is satisfied: Y11S/Y52S=1.61.

The detailed optical data of the 1st embodiment are shown in Table 1 and Table 2, and the aspheric surface data are shown in Table 3 below.

TABLE 1A

1st Embodiment

| Surface # | | Curvature Radius | | Thickness | Material | Index | Abbe # | Focal Length |
|---|---|---|---|---|---|---|---|---|
| 0 | Object | Plano | | D0 | | | | |
| 1 | Stop | Plano | | −0.325 | | | | |
| 2 | Lens 1 | 5.6062 | (ASP) | 0.803 | Plastic | 1.545 | 56.1 | 20.98 |
| 3 | | 10.4454 | (ASP) | 0.397 | | | | |
| 4 | Lens 2 | 8.1886 | (ASP) | 0.600 | Plastic | 1.566 | 37.4 | −16.98 |
| 5 | | 4.3040 | (ASP) | D1 | | | | |
| 6 | Ape. Stop | Plano | | −0.192 | | | | |
| 7 | Lens 3 | 5.3914 | (ASP) | 2.500 | Glass | 1.589 | 61.2 | 6.64 |
| 8 | | −11.8246 | (ASP) | D2 | | | | |
| 9 | Lens 4 | −6.2650 | (ASP) | 1.500 | Plastic | 1.686 | 18.4 | 348.67 |
| 10 | | −6.6999 | (ASP) | 0.057 | | | | |
| 11 | Lens 5 | −39.0733 | (ASP) | 1.490 | Plastic | 1.544 | 56.0 | −7.61 |
| 12 | | 4.6915 | (ASP) | D3 | | | | |
| 13 | Filter | Plano | | 0.210 | Glass | 1.517 | 64.2 | — |
| 14 | | Plano | | 0.600 | | | | |
| 15 | Image | Plano | | — | | | | |

Note:
Reference wavelength is 587.6 nm (d-line).
An effective radius of the stop S1 (Surface 1) is 3.300 mm.

In Table 1A, the curvature radius, the thickness and the focal length are shown in millimeters (mm). Surface numbers 0-15 represent the surfaces sequentially arranged from the object side to the image side along the optical axis.

TABLE 1B

|  | Short Focal Length End | Intermediate Focal Length State | Long Focal Length End |
| --- | --- | --- | --- |
| First Focusing State | | | |
| f [mm] | 10.08 | 15.00 | 19.98 |
| Fno | 3.11 | 4.56 | 5.97 |
| HFOV [deg.] | 14.5 | 9.6 | 7.2 |
| D0 [mm] | ∞ | ∞ | ∞ |
| D1 [mm] | 7.331 | 4.524 | 1.029 |
| D2 [mm] | 2.930 | 1.269 | 0.434 |
| D3 [mm] | 0.962 | 5.430 | 9.760 |
| Second Focusing State | | | |
| Fno | 3.09 | 4.57 | 5.99 |
| HFOV [deg.] | 14.6 | 9.5 | 7.1 |
| D0 [mm] | 1000.000 | 1000.000 | 1000.000 |
| D1 [mm] | 7.331 | 4.524 | 1.029 |
| D2 [mm] | 3.053 | 1.346 | 0.504 |
| D3 [mm] | 0.839 | 5.353 | 9.690 |

Table 1B shows optical data of three of various zooming states of the image system lens assembly in each focusing state. Specifically, the focal length of the image system lens assembly adjusted through the zooming process to an intermediate focal length state between the shortest focal length (corresponding to the short focal length end) and the longest focal length (corresponding to the long focal length end) of the image system lens assembly and some corresponding optical data are also disclosed in this embodiment. It should be understood that only three of various zooming states (i.e., the short focal length end, the long focal length end and the intermediate focal length state between them) are disclosed in this embodiment, but the present disclosure is not limited to the disclosed states, and the image system lens assembly of this embodiment can further have other focal lengths in other zooming states besides the short focal length end, the long focal length end and said intermediate focal length state. Table 1B also shows optical data of two of various focusing states of the image system lens assembly, and the definitions of the parameters in the second focusing state are consistent with those stated in the first focusing state. It should be understood that only two of various focusing states are disclosed in this embodiment, but the present disclosure is not limited to the disclosed states, and the image system lens assembly of this embodiment can further have other focusing states for different object distances.

It can be known from Table 1B, the image system lens assembly performs the focusing process according to the object distance so as to focus on the object, and the third lens group G3 is moved relative to the first lens group G1 along the optical axis in the focusing process. In specific, when the image system lens assembly is at the short focal length end and the object distance decreases (e.g., in the focusing process from the first focusing state to the second focusing state), the axial distance between the first lens group G1 and the third lens group G3 increases from, for example, 12.569 mm of the first focusing state to 12.692 mm of the second focusing state. Moreover, when the image system lens assembly is at the long focal length end and the object distance decreases (e.g., in the focusing process from the first focusing state to the second focusing state), the axial distance between the first lens group G1 and the third lens group G3 increases from, for example, 3.771 mm of the first focusing state to 3.841 mm of the second focusing state. That is, when the object distance decreases, the third lens group G3 is moved along the optical axis toward the image side relative to the first lens group G1 in the focusing process.

TABLE 1C

| Aspheric Coefficients | | | | | |
| --- | --- | --- | --- | --- | --- |
| Surface # | 2 | 3 | 4 | 5 | 7 |
| k= | −5.23252E+00 | −8.30766E−01 | 3.53504E+00 | −5.89220E−01 | −4.52867E−01 |
| A4= | 3.07078E−03 | 9.68803E−03 | 1.64692E−02 | 8.18397E−03 | −7.41015E−05 |
| A6= | −1.71610E−03 | −5.24744E−03 | −5.16848E−03 | −1.33631E−03 | 1.22526E−04 |
| A8= | 2.59661E−04 | 7.13188E−04 | 6.19484E−04 | −3.07754E−04 | −2.73497E−05 |
| A10= | −4.47327E−05 | −2.69808E−05 | −2.37088E−05 | 1.81532E−04 | −9.62492E−07 |
| A12= | 6.33579E−06 | −3.46717E−06 | 2.42187E−06 | −3.98512E−05 | 3.06583E−07 |
| A14= | −4.74735E−07 | 4.66110E−07 | −1.27349E−06 | 3.97622E−06 | — |
| A16= | 1.35387E−08 | −2.30524E−08 | 1.55905E−07 | −1.48319E−07 | — |
| A18= | — | 4.72431E−10 | −5.76091E−09 | — | — |
| Surface # | 8 | 9 | 10 | 11 | 12 |
| k= | 0.00000E+00 | −1.69656E+00 | −1.80583E+00 | 0.00000E+00 | −1.09213E+01 |
| A4= | 1.45636E−03 | 1.22231E−02 | 2.70114E−02 | 7.79151E−03 | −4.10824E−03 |
| A6= | −1.71816E−04 | −1.80384E−03 | −1.97300E−02 | −2.23064E−02 | −8.89551E−05 |
| A8= | 3.18098E−05 | −1.14005E−04 | 4.84403E−03 | 3.93037E−03 | −2.75264E−04 |
| A10= | 3.93051E−05 | 5.77953E−04 | 2.24306E−03 | 4.75058E−03 | 2.31002E−04 |
| A12= | −1.29833E−05 | −1.98114E−04 | −9.27330E−04 | −2.11079E−03 | −3.28638E−05 |
| A14= | — | 1.82500E−05 | 7.98435E−05 | 3.22273E−04 | −2.75729E−06 |
| A16= | — | — | — | −1.95413E−05 | 5.81412E−07 |

In Table 1C, k represents the conic coefficient of the equation of the aspheric surface profiles. A4-A18 represent the aspheric coefficients ranging from the 4th order to the 18th order. The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 4:
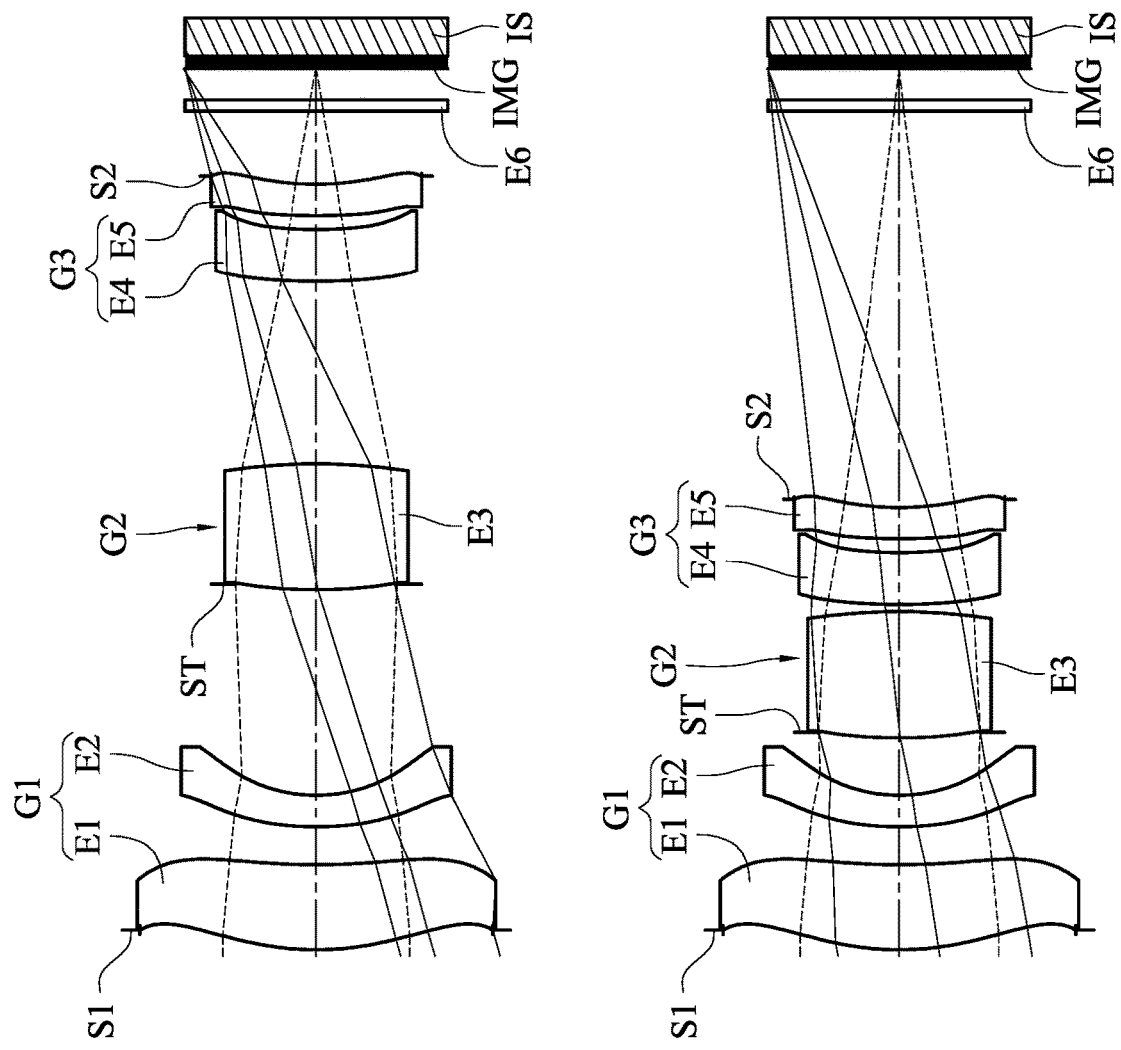
FIG. 4 is a schematic view of an image capturing unit respectively at the short focal length end and the long focal length end according to the 2nd embodiment of the present disclosure.
Figure 5:
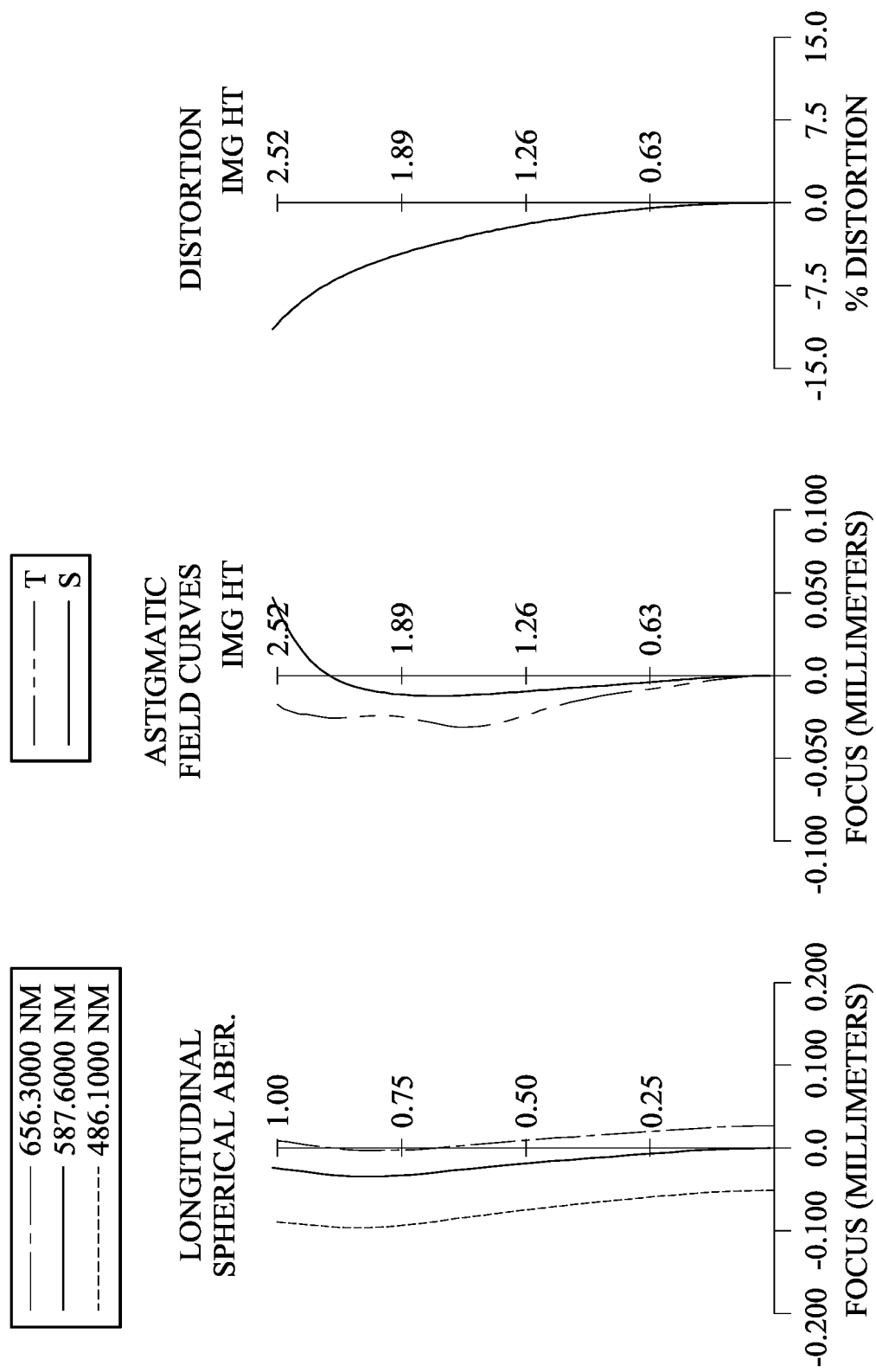
FIG. 5 shows spherical aberration curves, astigmatic field curves and a distortion curve of the image capturing unit at the short focal length end according to the 2nd embodiment.
Figure 6:
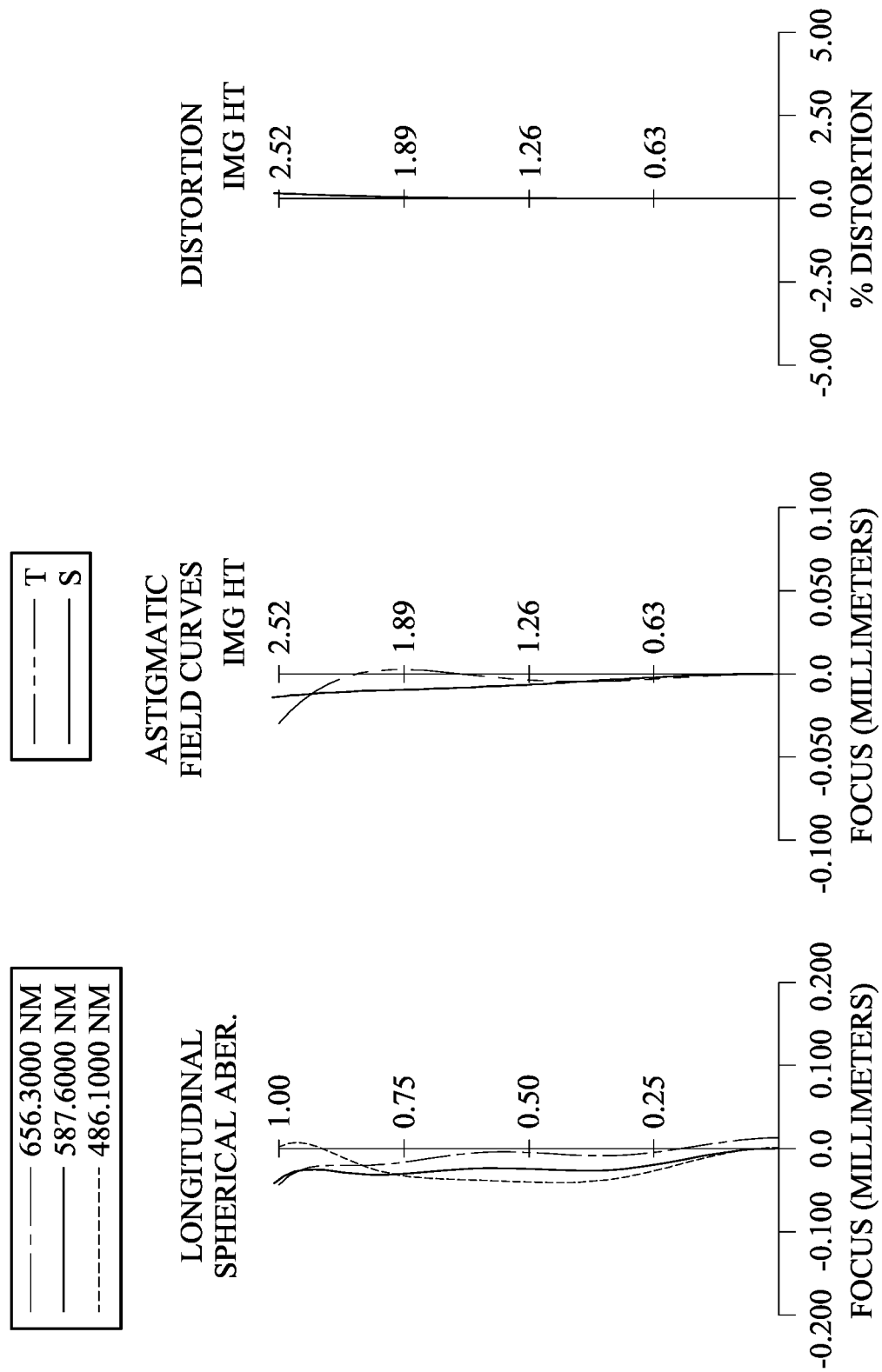
FIG. 6 shows spherical aberration curves, astigmatic field curves and a distortion curve of the image capturing unit at the long focal length end according to the 2nd embodiment.

FIG. 4 is a schematic view of an image capturing unit respectively at the short focal length end and the long focal length end according to the 2nd embodiment of the present disclosure. FIG. 5 shows, in order from left to right, spherical aberration curves, astigmatic field curves and a distortion curve of the image capturing unit at the short focal length end according to the 2nd embodiment. FIG. 6 shows, in order from left to right, spherical aberration curves, astigmatic field curves and a distortion curve of the image capturing unit at the long focal length end according to the 2nd embodiment. The upper part of FIG. 4 shows the image system lens assembly at the short focal length end, and the lower part of FIG. 4 shows the image system lens assembly at the long focal length end. In FIG. 4, the image capturing unit 2 includes the image system lens assembly (its reference numeral is omitted) of the present disclosure and an image sensor IS. The image system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a filter E6 and an image surface IMG. Further, the image system lens assembly includes, in order from the object side to the image side along the optical path, a first lens group G1, a second lens group G2 and a third lens group G3. The first lens group G1 includes the first lens element E1 and the second lens element E2, the second lens group G2 includes the third lens element E3, and the third lens group G3 includes the fourth lens element E4 and the fifth lens element E5. Moreover, the first lens group G1 has negative refractive power, the second lens group G2 has positive refractive power, and the third lens group G3 has negative refractive power. The image system lens assembly includes five lens elements (E1, E2, E3, E4, and E5) with no additional lens element disposed between each of the adjacent five lens elements.

The focal length of the image system lens assembly is variable by changing axial distances between any adjacent two of the three lens groups (G1, G2, and G3) in a zooming process. As shown in FIG. 4, the second lens group G2 is moved relative to the first lens group G1 along an optical axis in the zooming process, and the third lens group G3 is moved relative to the first lens group G1 along the optical axis in the zooming process. Furthermore, through the zooming process, the image system lens assembly has a short focal length end as shown in the upper part of FIG. 4 and a long focal length end as shown in the lower part of FIG. 4. In addition, when the image system lens assembly zooms in from the short focal length end to the long focal length end during the zooming process, the second lens group G2 is moved along the optical axis toward the object side relative to the first lens group G1, and the third lens group G3 is moved along the optical axis toward the object side relative to the first lens group G1. On the other hand, the third lens group G3 is moved relative to the image surface IMG along the optical axis in the zooming process. In addition, when the image system lens assembly zooms in from the short focal length end to the long focal length end during the zooming process, the third lens group G3 is moved along the optical axis toward the object side relative to the image surface IMG. It is noted that there is no relative motion between lens elements of any of the three lens groups in the zooming process.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point in an optically effective area thereof when the image system lens assembly is at the long focal length end and in an optically effective area thereof when the image system lens assembly is at the short focal length end. The image-side surface of the first lens element E1 has at least one inflection point in an optically effective area thereof when the image system lens assembly is at the long focal length end and in an optically effective area thereof when the image system lens assembly is at the short focal length end.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point in an optically effective area thereof when the image system lens assembly is at the long focal length end and in an optically effective area thereof when the image system lens assembly is at the short focal length end. The image-side surface of the fifth lens element E5 has at least one inflection point in an optically effective area thereof when the image system lens assembly is at the long focal length end and in an optically effective area thereof when the image system lens assembly is at the short focal length end.

The filter E6 is made of glass material and located between the stop S2 and the image surface IMG, and will not affect the focal length of the image system lens assembly. The image sensor IS is disposed on or near the image surface IMG.

In this embodiment, one of various focusing states of the image system lens assembly is provided, and the focusing state of the image system lens assembly is a state where the image system lens assembly focuses on an imaged object located at infinity. The detailed optical data of the 2nd embodiment are shown in Table 2A and Table 2B, and the aspheric surface data are shown in Table 2C below. It should be understood that only two of various zooming states (i.e., the short focal length end and the long focal length end) are disclosed in this embodiment, but the present disclosure is not limited to the disclosed states. The focal length of the image system lens assembly in this embodiment can be adjusted through the zooming process to other focal length states between the shortest focal length (corresponding to the short focal length end) and the longest focal length (corresponding to the long focal length end). It should be understood that only one of various focusing states is disclosed in this embodiment, but the present disclosure is not limited to the disclosed state, and the image system lens assembly of this embodiment can further have other focusing states corresponding to different object distances. In this embodiment, an axial distance between the second lens element E2 and the aperture stop ST is D1, an axial distance between the third lens element E3 and the fourth lens element E4 is D2, and an axial distance between the stop S2 and the filter E6 is D3.

TABLE 2A

| | | 2nd Embodiment | | | | |
|---|---|---|---|---|---|---|
| Surface # | | Curvature Radius | Thickness | Material | Index | Abbe # | Focal Length |
| 0 | Object | Plano | Infinity | | | |
| 1 | Stop | Plano | −0.376 | | | |
| 2 | Lens 1 | 5.3844 (ASP) | 1.625 | Plastic | 1.545 | 56.1 | 16.50 |
| 3 | | 11.9925 (ASP) | 0.743 | | | |
| 4 | Lens 2 | 6.5623 (ASP) | 0.600 | Plastic | 1.614 | 26.0 | −10.92 |
| 5 | | 3.2009 (ASP) | D1 | | | |
| 6 | Ape. Stop | Plano | −0.105 | | | |
| 7 | Lens 3 | 9.4625 (SPH) | 2.424 | Glass | 1.803 | 46.8 | 6.82 |
| 8 | | −11.5128 (SPH) | D2 | | | |
| 9 | Lens 4 | 11.0930 (ASP) | 1.000 | Plastic | 1.669 | 19.5 | −37.28 |
| 10 | | 7.4006 (ASP) | 0.265 | | | |
| 11 | Lens 5 | 10.3336 (ASP) | 0.600 | Plastic | 1.544 | 56.0 | −19.55 |
| 12 | | 5.1335 (ASP) | 0.157 | | | |
| 13 | Stop | Plano | D3 | | | |
| 14 | Filter | Plano | 0.210 | Glass | 1.517 | 64.2 | — |
| 15 | | Plano | 0.600 | | | |
| 16 | Image | Plano | — | | | |

Note:
Reference wavelength is 587.6 nm (d-line).
An effective radius of the stop S1 (Surface 1) is 3.380 mm.
An effective radius of the stop S2 (Surface 13) is 2.020 mm.

The definitions of these parameters shown in Table 2B are the same as those stated in the 1st embodiment with corresponding values for the 2nd embodiment, so an explanation in this regard will not be provided again.

Moreover, these parameters can be calculated from Table 2A and Table 2C as the following values and satisfy the following conditions:

TABLE 2B

| | Short Focal Length End | Long Focal Length End | Values of Conditional Expressions | | | |
|---|---|---|---|---|---|---|
| f [mm] | 10.04 | 15.01 | fG1 [mm] | −78.40 | |fG2/fG1| | 0.09 |
| Fno | 2.80 | 4.00 | fG2 [mm] | 6.82 | |fG3/fG1| | 0.16 |
| HFOV [deg.] | 15.9 | 9.5 | fG3 [mm] | −12.89 | fG3/fG2 | −1.89 |
| D1 [mm] | 4.042 | 1.203 | (Vi/Ni)min | 11.65 | fL/fS | 1.50 |
| D2 [mm] | 3.492 | 0.132 | Nmax | 1.803 | |fS/fG1| | 0.13 |
| D3 [mm] | 1.247 | 7.446 | V3/V2 | 1.80 | fS/fG2 | 1.47 |
| — | — | — | (TG12S − TG12L)/fG2 | 0.42 | fS/fG3 | −0.78 |
| — | — | — | (TG23S − TG23L)/TG3 | 1.80 | |f3/f1| + |f3/f2| + |f3/f4| + |f3/f5| | 1.57 |
| — | — | — | fG3/(BLS − BLL) | 2.08 | |f3/f1 + f3/f2| | 0.21 |
| — | — | — | (CT1 + CT2)/T12 | 2.99 | |f3/f12| | 0.09 |
| — | — | — | |TLL/TLS − 1| | 0.00 | |f45/f3| | 1.89 |
| — | — | — | TG1/TG2 | 1.22 | |f45/f12| | 0.16 |
| — | — | — | TG2/TG3 | 1.30 | Y11L/ImgHL | 0.96 |
| — | — | — | TLS/fS | 1.68 | Y11S/ImgHS | 1.34 |
| — | — | — | TLL/ImgHL | 6.71 | Y11L/Y52L | 1.51 |
| — | — | — | TLS/ImgHS | 6.71 | Y11S/Y52S | 1.67 |
| — | — | — | R3/R4 | 2.05 | — | — |

In the 2nd embodiment, the equation of the aspheric surface profiles of the aforementioned lens elements is the same as the equation of the 1st embodiment, so an explanation in this regard will not be provided again.

TABLE 2C

| | Aspheric Coefficients | | | |
|---|---|---|---|---|
| Surface # | 2 | 3 | 4 | 5 |
| k= | −4.09707E+00 | −4.03044E+00 | 2.74235E+00 | −1.76335E−01 |
| A4= | −1.23067E−04 | −3.03914E−03 | 1.02144E−02 | 1.22336E−02 |
| A6= | −2.44136E−04 | −1.04433E−04 | −2.62362E−03 | −2.35384E−03 |
| A8= | 1.53850E−05 | 1.47558E−05 | 3.73409E−04 | −3.60038E−04 |

TABLE 2C-continued

| | Aspheric Coefficients | | | |
|---|---|---|---|---|
| A10= | −3.31181E−06 | −8.52587E−06 | 2.16759E−06 | 4.49769E−04 |
| A12= | 1.82042E−07 | 9.32647E−07 | −1.52807E−05 | −1.21916E−04 |
| A14= | −1.35754E−09 | −3.97576E−08 | 2.95345E−06 | 9.36372E−06 |
| A16= | −2.83426E−10 | 8.51756E−10 | −3.53315E−07 | 6.68184E−08 |
| A18= | — | −1.77976E−11 | 2.05189E−08 | — |

| Surface # | 9 | 10 | 11 | 12 |
|---|---|---|---|---|
| k= | −2.29830E+01 | 5.02212E+00 | −7.78055E+00 | −6.76335E+00 |
| A4= | −2.40593E−05 | −1.86465E−02 | −3.02787E−02 | −1.18266E−02 |
| A6= | −2.12248E−04 | 1.79724E−02 | 3.75468E−02 | 2.11311E−02 |
| A8= | 2.74701E−03 | 1.32010E−03 | −1.19738E−02 | −1.69410E−02 |
| A10= | −1.60921E−03 | −3.28753E−03 | 6.65059E−04 | 8.01155E−03 |
| A12= | 3.82310E−04 | 7.56879E−04 | 4.84591E−04 | −2.39402E−03 |
| A14= | −3.23594E−05 | −4.17469E−05 | −1.69267E−04 | 3.80491E−04 |
| A16= | — | — | 1.79412E−05 | −2.47224E−05 |

3rd Embodiment

Figure 7:
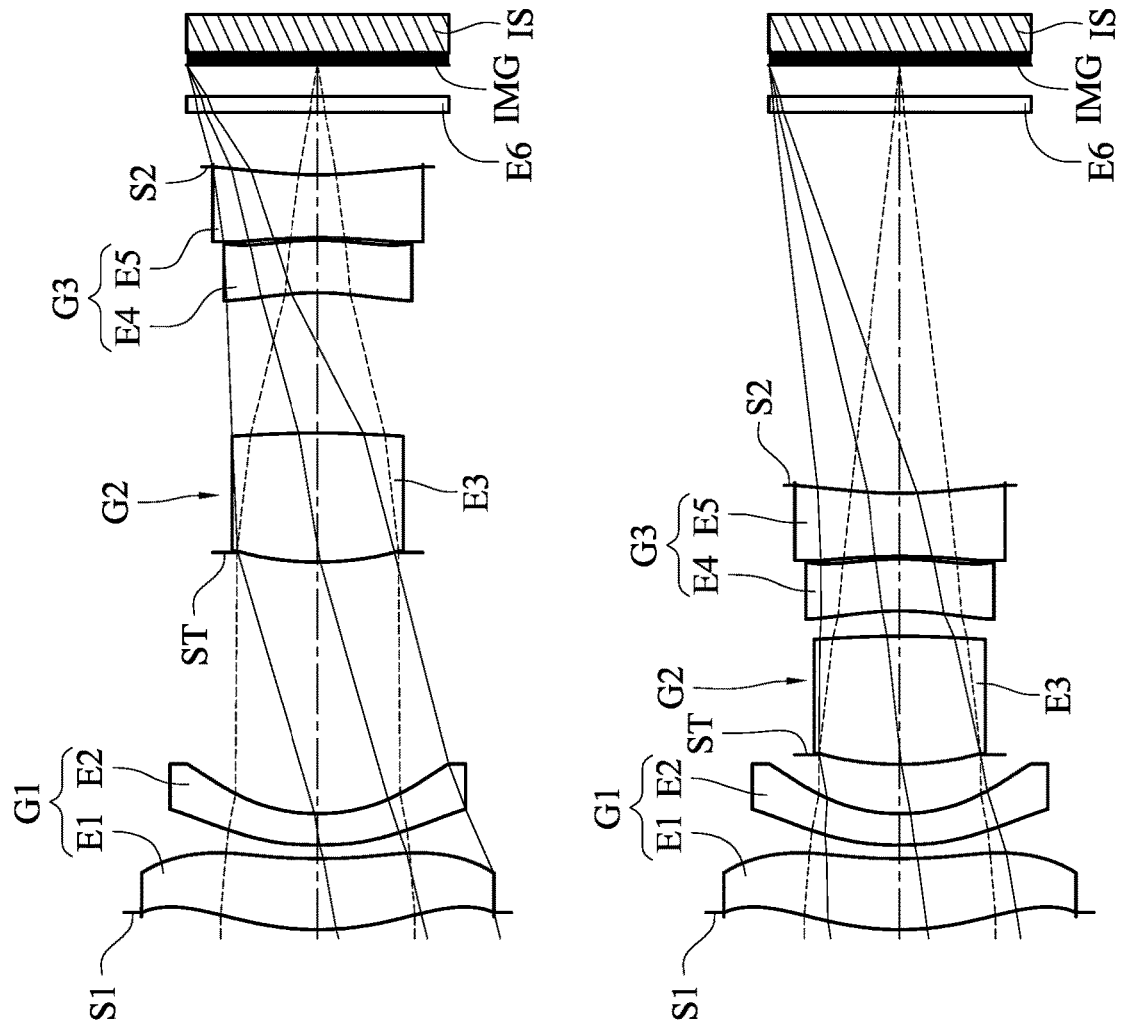
FIG. 7 is a schematic view of an image capturing unit respectively at the short focal length end and the long focal length end according to the 3rd embodiment of the present disclosure.
Figure 8:
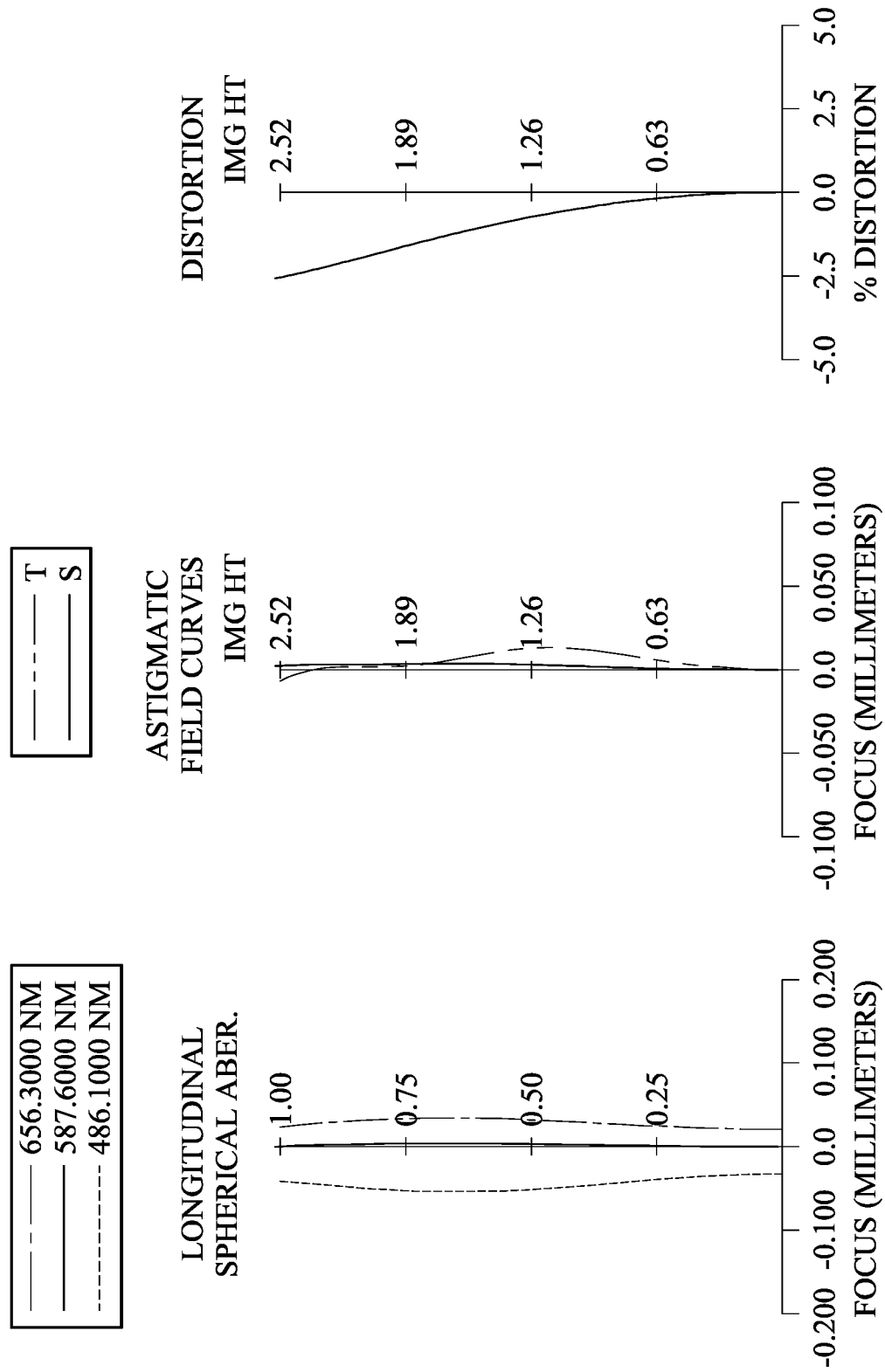
FIG. 8 shows spherical aberration curves, astigmatic field curves and a distortion curve of the image capturing unit at the short focal length end according to the 3rd embodiment.
Figure 9:
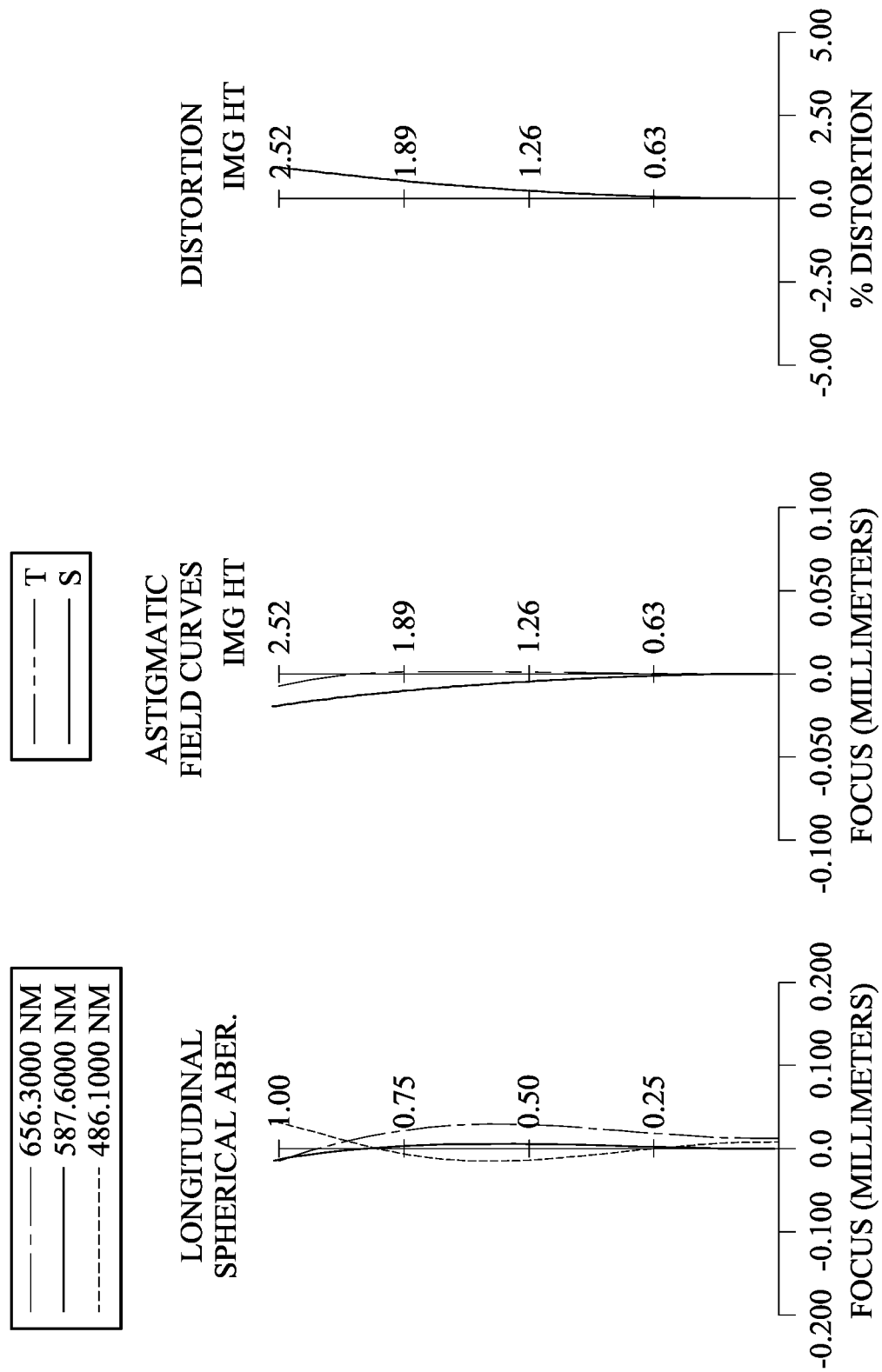
FIG. 9 shows spherical aberration curves, astigmatic field curves and a distortion curve of the image capturing unit at the long focal length end according to the 3rd embodiment.

FIG. 7 is a schematic view of an image capturing unit respectively at the short focal length end and the long focal length end according to the 3rd embodiment of the present disclosure. FIG. 8 shows, in order from left to right, spherical aberration curves, astigmatic field curves and a distortion curve of the image capturing unit at the short focal length end according to the 3rd embodiment. FIG. 9 shows, in order from left to right, spherical aberration curves, astigmatic field curves and a distortion curve of the image capturing unit at the long focal length end according to the 3rd embodiment. The upper part of FIG. 7 shows the image system lens assembly at the short focal length end, and the lower part of FIG. 7 shows the image system lens assembly at the long focal length end. In FIG. 7, the image capturing unit 3 includes the image system lens assembly (its reference numeral is omitted) of the present disclosure and an image sensor IS. The image system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a filter E6 and an image surface IMG. Further, the image system lens assembly includes, in order from the object side to the image side along the optical path, a first lens group G1, a second lens group G2 and a third lens group G3. The first lens group G1 includes the first lens element E1 and the second lens element E2, the second lens group G2 includes the third lens element E3, and the third lens group G3 includes the fourth lens element E4 and the fifth lens element E5. Moreover, the first lens group G1 has positive refractive power, the second lens group G2 has positive refractive power, and the third lens group G3 has negative refractive power. The image system lens assembly includes five lens elements (E1, E2, E3, E4, and E5) with no additional lens element disposed between each of the adjacent five lens elements.

The focal length of the image system lens assembly is variable by changing axial distances between any adjacent two of the three lens groups (G1, G2, and G3) in a zooming process. As shown in FIG. 7, the second lens group G2 is moved relative to the first lens group G1 along an optical axis in the zooming process, and the third lens group G3 is moved relative to the first lens group G1 along the optical axis in the zooming process. Furthermore, through the zooming process, the image system lens assembly has a short focal length end as shown in the upper part of FIG. 7 and a long focal length end as shown in the lower part of FIG. 7. In addition, when the image system lens assembly zooms in from the short focal length end to the long focal length end during the zooming process, the second lens group G2 is moved along the optical axis toward the object side relative to the first lens group G1, and the third lens group G3 is moved along the optical axis toward the object side relative to the first lens group G1. On the other hand, the third lens group G3 is moved relative to the image surface IMG along the optical axis in the zooming process. In addition, when the image system lens assembly zooms in from the short focal length end to the long focal length end during the zooming process, the third lens group G3 is moved along the optical axis toward the object side relative to the image surface IMG. It is noted that there is no relative motion between lens elements of any of the three lens groups in the zooming process.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point in an optically effective area thereof when the image system lens assembly is at the long focal length end and in an optically effective area thereof when the image system lens assembly is at the short focal length end. The image-side surface of the first lens element E1 has at least one inflection point in an optically effective area thereof when the image system lens assembly is at the long focal length end and in an optically effective area thereof when the image system lens assembly is at the short focal length end.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric. The image-side surface of the third lens element E3 has at least one inflection point in an optically effective area thereof when the image system lens assembly is at the long focal length end and in an optically effective area thereof when the image system lens assembly is at the short focal length end.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point in an optically effective area thereof when the image system lens assembly is at the long focal length end and in an optically effective area thereof when the image system lens assembly is at the short focal length end. The image-side surface of the fourth lens element E4 has at least one inflection point in an optically effective area thereof when the image system lens assembly is at the long focal length end and in an optically effective area thereof when the image system lens assembly is at the short focal length end.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point in an optically effective area thereof when the image system lens assembly is at the long focal length end and in an optically effective area thereof when the image system lens assembly is at the short focal length end. The image-side surface of the fifth lens element E5 has at least one inflection point in an optically effective area thereof when the image system lens assembly is at the long focal length end and in an optically effective area thereof when the image system lens assembly is at the short focal length end.

The filter E6 is made of glass material and located between the stop S2 and the image surface IMG, and will not affect the focal length of the image system lens assembly. The image sensor IS is disposed on or near the image surface IMG.

In this embodiment, one of various focusing states of the image system lens assembly is provided, and the focusing state of the image system lens assembly is a state where the image system lens assembly focuses on an imaged object located at infinity. The detailed optical data of the 3rd embodiment are shown in Table 3A and Table 3B, and the aspheric surface data are shown in Table 3C below. It should be understood that only two of various zooming states (i.e., the short focal length end and the long focal length end) are disclosed in this embodiment, but the present disclosure is not limited to the disclosed states. The focal length of the image system lens assembly in this embodiment can be adjusted through the zooming process to other focal length states between the shortest focal length (corresponding to the short focal length end) and the longest focal length (corresponding to the long focal length end). It should be understood that only one of various focusing states is disclosed in this embodiment, but the present disclosure is not limited to the disclosed state, and the image system lens assembly of this embodiment can further have other focusing states corresponding to different object distances. In this embodiment, an axial distance between the second lens element E2 and the aperture stop ST is D1, an axial distance between the third lens element E3 and the fourth lens element E4 is D2, and an axial distance between the stop S2 and the filter E6 is D3.

TABLE 3A

3rd Embodiment

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.328 | | | | |
| 2 | Lens 1 | 5.4726 | (ASP) | 1.360 | Plastic | 1.545 | 56.1 | 16.13 |
| 3 | | 13.2280 | (ASP) | 0.261 | | | | |
| 4 | Lens 2 | 6.9720 | (ASP) | 0.600 | Plastic | 1.614 | 25.6 | −14.72 |
| 5 | | 3.8078 | (ASP) | D1 | | | | |
| 6 | Ape. Stop | Plano | | −0.185 | | | | |
| 7 | Lens 3 | 5.9521 | (ASP) | 2.470 | Glass | 1.693 | 53.2 | 6.74 |
| 8 | | −18.0815 | (ASP) | D2 | | | | |
| 9 | Lens 4 | −5.6644 | (ASP) | 1.000 | Plastic | 1.686 | 18.4 | 566.50 |
| 10 | | −5.9841 | (ASP) | 0.051 | | | | |
| 11 | Lens 5 | −13.6111 | (ASP) | 1.207 | Plastic | 1.534 | 56.0 | −9.09 |
| 12 | | 7.7798 | (ASP) | 0.153 | | | | |
| 13 | Stop | Plano | | D3 | | | | |
| 14 | Filter | Plano | | 0.300 | Glass | 1.517 | 64.2 | — |
| 15 | | Plano | | 0.600 | | | | |
| 16 | Image | Plano | | — | | | | |

Note:
Reference wavelength is 587.6 nm (d-line).
An effective radius of the stop S1 (Surface 1) is 3.380 mm.
An effective radius of the stop S2 (Surface 13) is 2.020 mm.

The definitions of these parameters shown in Table 3B are the same as those stated in the 1st embodiment with corresponding values for the 3rd embodiment, so an explanation in this regard will not be provided again.

Moreover, these parameters can be calculated from Table 3A and Table 3C as the following values and satisfy the following conditions:

TABLE 3B

|  | Short Focal Length End | Long Focal Length End |  |  | Values of Conditional Expressions |  |
|---|---|---|---|---|---|---|
| f [mm] | 10.60 | 15.86 | fG1 [mm] | 206.71 | \|fG2/fG1\| | 0.03 |
| Fno | 2.84 | 4.32 | fG2 [mm] | 6.74 | \|fG3/fG1\| | 0.04 |
| HFOV [deg.] | 13.7 | 8.9 | fG3 [mm] | −8.61 | fG3/fG2 | −1.28 |
| D1 [mm] | 5.022 | 1.129 | (Vi/Ni)min | 10.90 | fL/fS | 1.50 |
| D2 [mm] | 2.705 | 0.481 | Nmax | 1.693 | \|fS/fG1\| | 0.05 |
| D3 [mm] | 1.062 | 7.179 | V3/V2 | 2.08 | fS/fG2 | 1.57 |
| — | — | — | (TG12S − TG12L)/fG2 | 0.58 | fS/fG3 | −1.23 |
| — | — | — | (TG23S − TG23L)/TG3 | 0.98 | \|f3/f1\| + \|f3/f2\| + \|f3/f4\| + \|f3/f5\| | 1.63 |
| — | — | — | fG3/(BLS − BLL) | 1.41 | \|f3/f1 + f3/f2\| | 0.04 |
| — | — | — | (CT1 + CT2)/T12 | 7.51 | \|f3/f12\| | 0.03 |
| — | — | — | \|TLL/TLS − 1\| | 0.00 | \|f45/f3\| | 1.28 |
| — | — | — | TG1/TG2 | 0.90 | \|f45/f12\| | 0.04 |
| — | — | — | TG2/TG3 | 1.09 | Y11L/ImgHL | 0.89 |
| — | — | — | TLS/fS | 1.57 | Y11S/ImgHS | 1.34 |
| — | — | — | TLL/ImgHL | 6.59 | Y11L/Y52L | 1.41 |
| — | — | — | TLS/ImgHS | 6.59 | Y11S/Y52S | 1.67 |
| — | — | — | R3/R4 | 1.83 | — | — |

In the 3rd embodiment, the equation of the aspheric surface profiles of the aforementioned lens elements is the same as the equation of the 1st embodiment, so an explanation in this regard will not be provided again.

TABLE 3C

| Aspheric Coefficients | | | | | |
|---|---|---|---|---|---|
| Surface # | 2 | 3 | 4 | 5 | 7 |
| k= | −4.77577E+00 | −3.58505E+00 | 3.41160E+00 | −1.28846E−01 | 4.18904E−01 |
| A4= | 1.16524E−03 | 1.14034E−02 | 2.33373E−02 | 1.38006E−02 | 2.22691E−04 |
| A6= | −6.97864E−04 | −6.78852E−03 | −9.01733E−03 | −3.65302E−03 | 3.55610E−05 |
| A8= | 9.74582E−05 | 1.20416E−03 | 1.67786E−03 | 2.83652E−04 | −6.99107E−06 |
| A10= | −2.48869E−05 | −1.13669E−04 | −2.41445E−04 | 5.77154E−05 | 2.50050E−07 |
| A12= | 3.42547E−06 | 5.27997E−06 | 3.45804E−05 | −2.11394E−05 | — |
| A14= | −2.19563E−07 | −3.04526E−08 | −4.22709E−06 | 2.44140E−06 | — |
| A16= | 5.33303E−09 | −7.51335E−09 | 3.06914E−07 | −1.07309E−07 | — |
| A18= | — | 2.30977E−10 | −9.36972E−09 | — | — |

| Surface # | 8 | 9 | 10 | 11 | 12 |
|---|---|---|---|---|---|
| k= | −2.73938E+01 | 0.00000E+00 | 0.00000E+00 | 0.00000E+00 | −1.77034E+01 |
| A4= | 1.18643E−03 | 1.50881E−02 | 2.59670E−02 | 7.28252E−03 | −5.86206E−03 |
| A6= | 7.45689E−05 | −1.04853E−03 | −1.29291E−02 | −1.52632E−02 | 9.65457E−04 |
| A8= | −6.26383E−07 | 2.73880E−04 | 1.13149E−02 | 1.43161E−02 | −3.47746E−04 |
| A10= | −9.66805E−07 | −7.18655E−05 | −5.67633E−03 | −7.31252E−03 | 1.50767E−04 |
| A12= | — | 6.37670E−06 | 1.53243E−03 | 2.00107E−03 | −4.81118E−05 |
| A14= | — | 1.12529E−07 | −1.61495E−04 | −2.15209E−04 | 9.86387E−06 |
| A16= | — | — | — | 7.15225E−07 | −8.86177E−07 |

4th Embodiment

Figure 10:
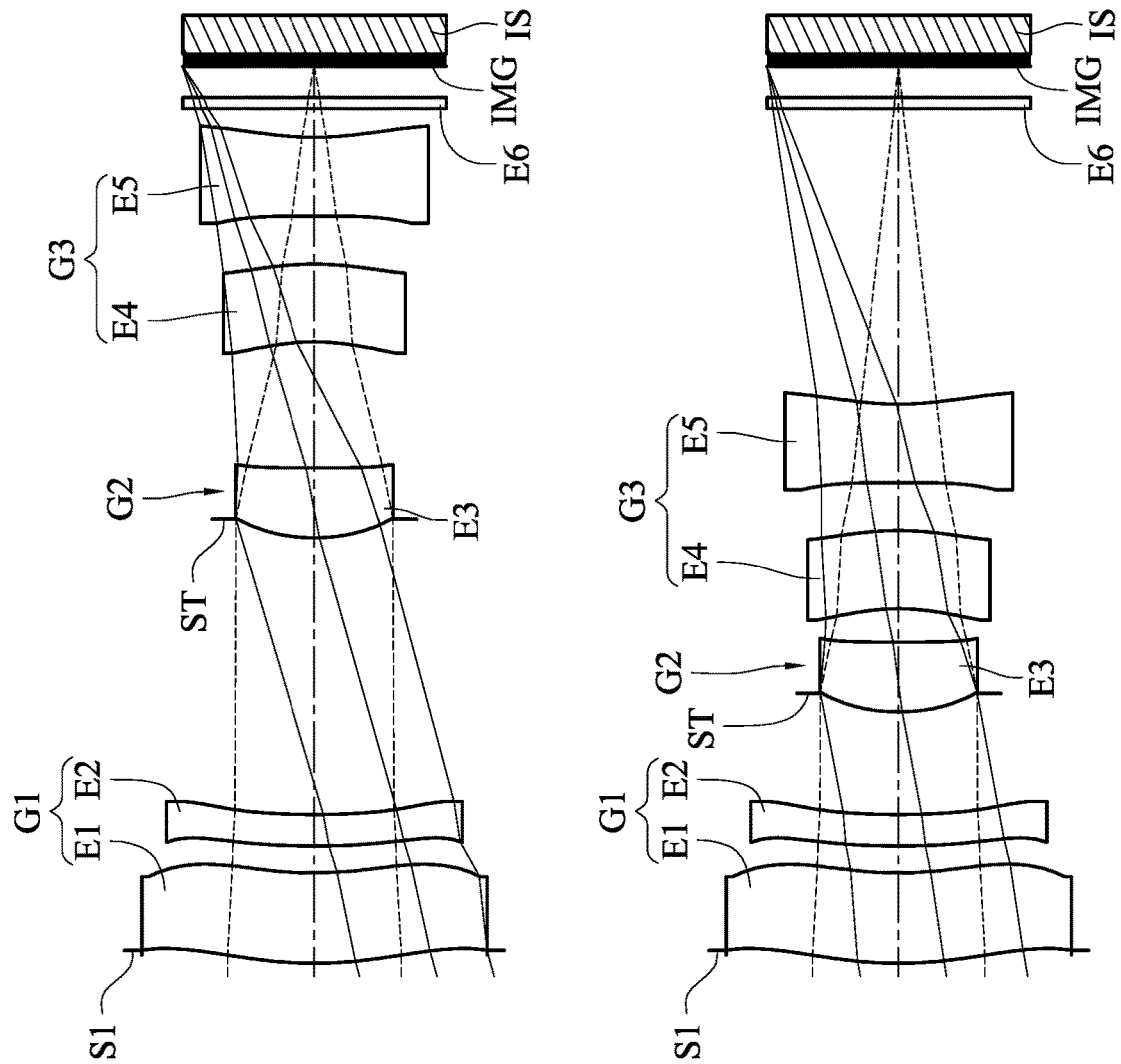
FIG. 10 is a schematic view of an image capturing unit respectively at the short focal length end and the long focal length end according to the 4th embodiment of the present disclosure.
Figure 11:
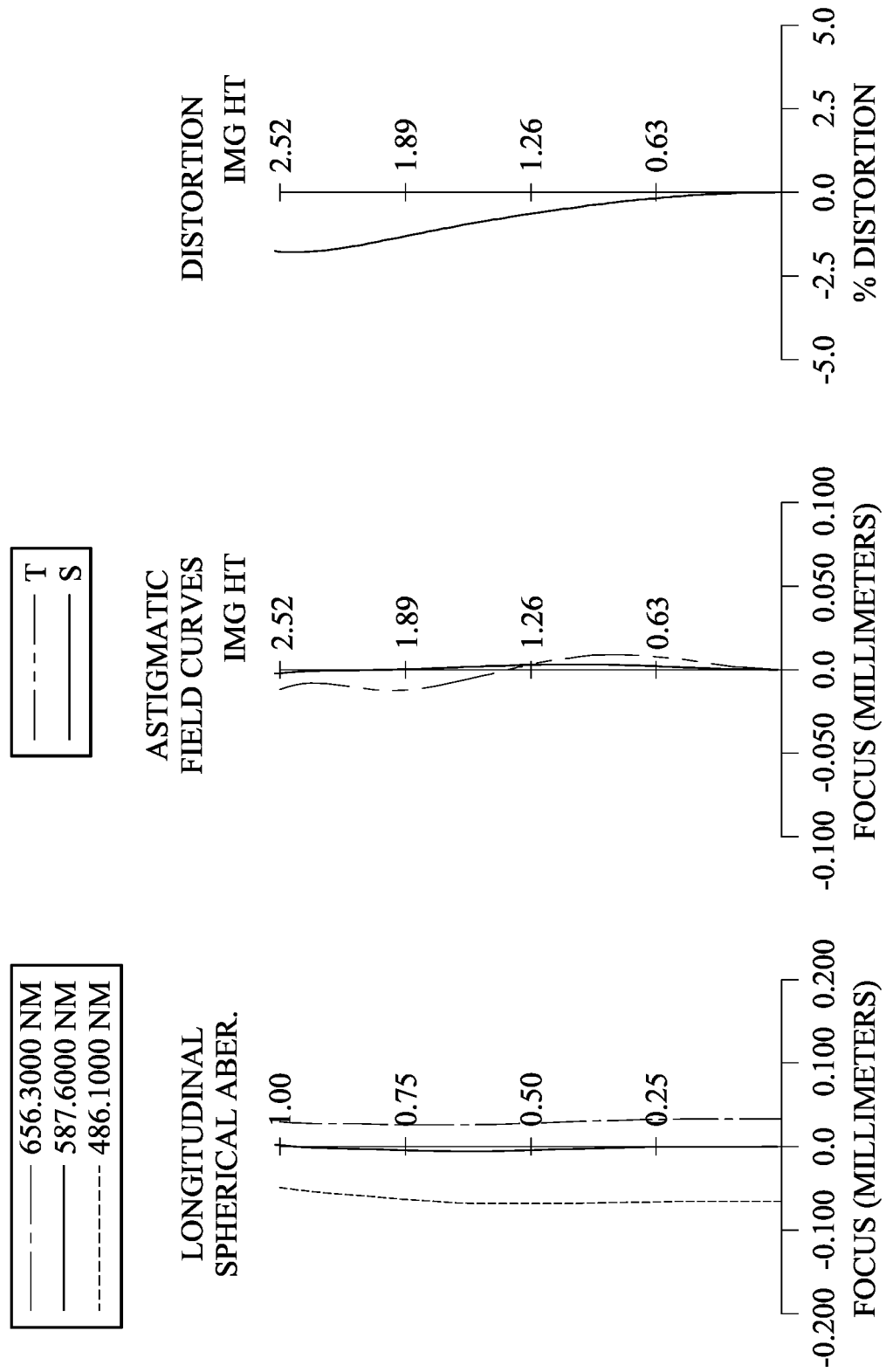
FIG. 11 shows spherical aberration curves, astigmatic field curves and a distortion curve of the image capturing unit at the short focal length end according to the 4th embodiment.
Figure 12:
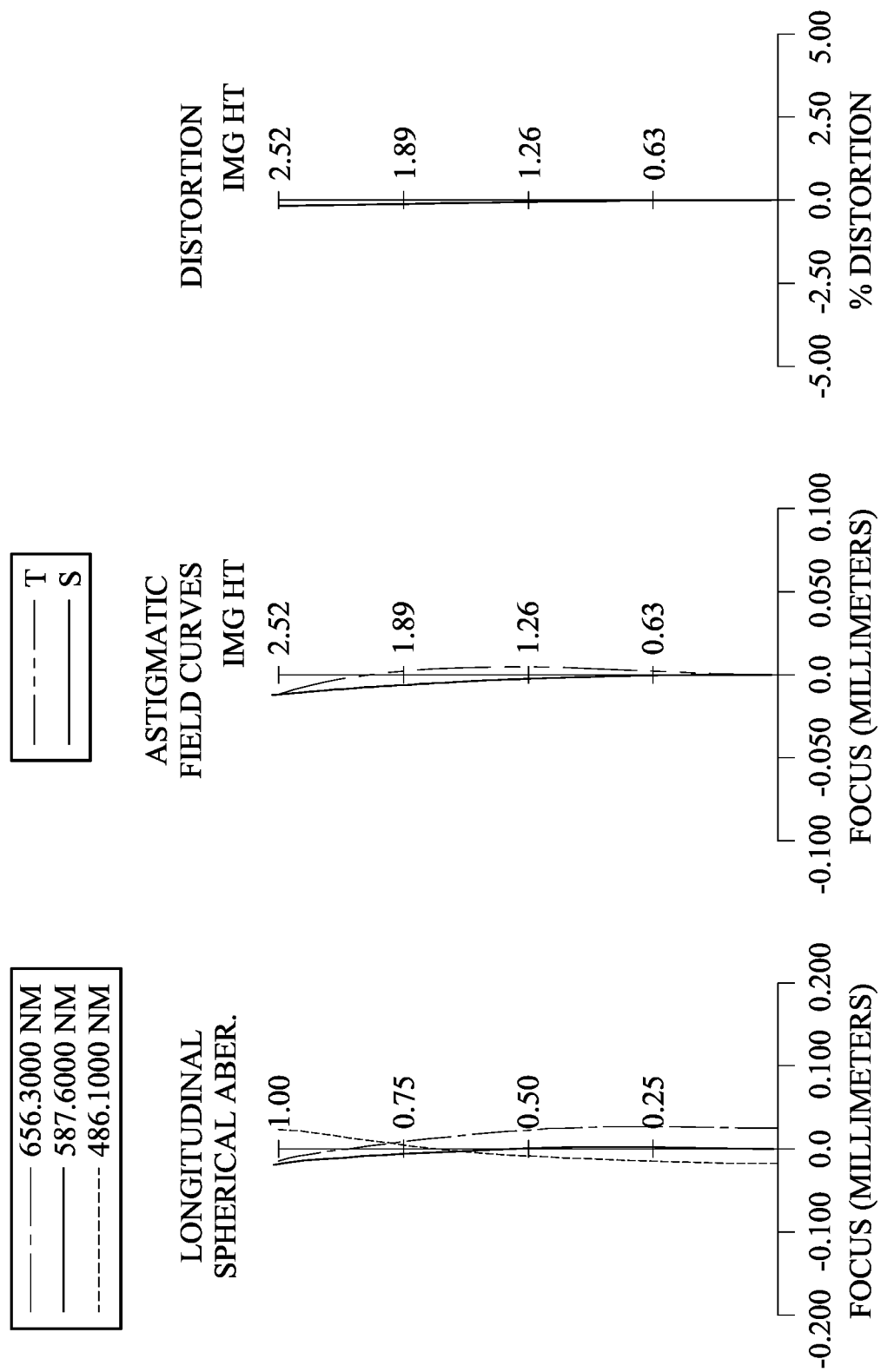
FIG. 12 shows spherical aberration curves, astigmatic field curves and a distortion curve of the image capturing unit at the long focal length end according to the 4th embodiment.

FIG. 10 is a schematic view of an image capturing unit respectively at the short focal length end and the long focal length end according to the 4th embodiment of the present disclosure. FIG. 11 shows, in order from left to right, spherical aberration curves, astigmatic field curves and a distortion curve of the image capturing unit at the short focal length end according to the 4th embodiment. FIG. 12 shows, in order from left to right, spherical aberration curves, astigmatic field curves and a distortion curve of the image capturing unit at the long focal length end according to the 4th embodiment. The upper part of FIG. 10 shows the image system lens assembly at the short focal length end, and the lower part of FIG. 10 shows the image system lens assembly at the long focal length end. In FIG. 10, the image capturing unit 4 includes the image system lens assembly (its reference numeral is omitted) of the present disclosure and an image sensor IS. The image system lens assembly includes, in order from an object side to an image side along an optical path, a stop S1, a first lens element E1, a second lens element E2, an aperture stop ST, a third lens element E3, a fourth lens element E4, a fifth lens element E5, a filter E6 and an image surface IMG. Further, the image system lens assembly includes, in order from the object side to the image side along the optical path, a first lens group G1, a second lens group G2 and a third lens group G3. The first lens group G1 includes the first lens element E1 and the second lens element E2, the second lens group G2 includes the third lens element E3, and the third lens group G3 includes the fourth lens element E4 and the fifth lens element E5. Moreover, the first lens group G1 has positive refractive power, the second lens group G2 has positive refractive power, and the third lens group G3 has negative refractive power. The image system lens assembly includes five lens elements (E1, E2, E3, E4, and E5) with no additional lens element disposed between each of the adjacent five lens elements.

The focal length of the image system lens assembly is variable by changing axial distances between any adjacent two of the three lens groups (G1, G2, and G3) in a zooming process. As shown in FIG. 10, the second lens group G2 is moved relative to the first lens group G1 along an optical axis in the zooming process, and the third lens group G3 is moved relative to the first lens group G1 along the optical axis in the zooming process. Furthermore, through the zooming process, the image system lens assembly has a short focal length end as shown in the upper part of FIG. 10 and a long focal length end as shown in the lower part of FIG. 10. In addition, when the image system lens assembly zooms in from the short focal length end to the long focal length end during the zooming process, the second lens group G2 is moved along the optical axis toward the object side relative to the first lens group G1, and the third lens group G3 is moved along the optical axis toward the object side relative to the first lens group G1. On the other hand, the third lens group G3 is moved relative to the image surface IMG along the optical axis in the zooming process. In addition, when the image system lens assembly zooms in from the short focal length end to the long focal length end during the zooming process, the third lens group G3 is moved along the optical axis toward the object side relative to the image surface IMG. It is noted that there is no relative motion between lens elements of any of the three lens groups in the zooming process.

The first lens element E1 with negative refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has at least one inflection point in an optically effective area thereof when the image system lens assembly is at the long focal length end and in an optically effective area thereof when the image system lens assembly is at the short focal length end. The image-side surface of the first lens element E1 has at least one inflection point in an optically effective area thereof when the image system lens assembly is at the long focal length end and in an optically effective area thereof when the image system lens assembly is at the short focal length end.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point in an optically effective area thereof when the image system lens assembly is at the long focal length end and in an optically effective area thereof when the image system lens assembly is at the short focal length end.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point in an optically effective area thereof when the image system lens assembly is at the long focal length end and in an optically effective area thereof when the image system lens assembly is at the short focal length end. The image-side surface of the fourth lens element E4 has at least one inflection point in an optically effective area thereof when the image system lens assembly is at the long focal length end and in an optically effective area thereof when the image system lens assembly is at the short focal length end.

The fifth lens element E5 with negative refractive power has an object-side surface being planar in a paraxial region thereof and an image-side surface being concave in a paraxial region thereof. The fifth lens element E5 is made of plastic material and has the object-side surface and the image-side surface being both aspheric. The image-side surface of the fifth lens element E5 has at least one inflection point in an optically effective area thereof when the image system lens assembly is at the long focal length end and in an optically effective area thereof when the image system lens assembly is at the short focal length end.

The filter E6 is made of glass material and located between the fifth lens element E5 and the image surface IMG, and will not affect the focal length of the image system lens assembly. The image sensor IS is disposed on or near the image surface IMG.

In this embodiment, one of various focusing states of the image system lens assembly is provided, and the focusing state of the image system lens assembly is a state where the image system lens assembly focuses on an imaged object located at infinity. The detailed optical data of the 4th embodiment are shown in Table 4A and Table 4B, and the aspheric surface data are shown in Table 4C below. It should be understood that only two of various zooming states (i.e., the short focal length end and the long focal length end) are disclosed in this embodiment, but the present disclosure is not limited to the disclosed states. The focal length of the image system lens assembly in this embodiment can be adjusted through the zooming process to other focal length states between the shortest focal length (corresponding to the short focal length end) and the longest focal length (corresponding to the long focal length end). It should be understood that only one of various focusing states is disclosed in this embodiment, but the present disclosure is not limited to the disclosed state, and the image system lens assembly of this embodiment can further have other focusing states corresponding to different object distances. In this embodiment, an axial distance between the second lens element E2 and the aperture stop ST is D1, an axial distance between the third lens element E3 and the fourth lens element E4 is D2, and an axial distance between the fifth lens element E5 and the filter E6 is D3.

TABLE 4A

4th Embodiment

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.245 | | | | |
| 2 | Lens 1 | 7.5550 | (ASP) | 1.729 | Plastic | 1.545 | 56.1 | −745.27 |
| 3 | | 6.8183 | (ASP) | 0.526 | | | | |
| 4 | Lens 2 | 15.6872 | (ASP) | 0.600 | Plastic | 1.614 | 25.6 | 364.63 |
| 5 | | 16.6233 | (ASP) | D1 | | | | |
| 6 | Ape. Stop | Plano | | −0.359 | | | | |
| 7 | Lens 3 | 3.3809 | (ASP) | 1.339 | Plastic | 1.544 | 56.0 | 6.31 |
| 8 | | 200.4008 | (ASP) | D2 | | | | |
| 9 | Lens 4 | −4.4079 | (ASP) | 1.500 | Plastic | 1.705 | 14.0 | −42.43 |
| 10 | | −5.8972 | (ASP) | 0.918 | | | | |
| 11 | Lens 5 | ∞ | (ASP) | 1.500 | Plastic | 1.544 | 56.0 | −9.93 |
| 12 | | 5.4030 | (ASP) | D3 | | | | |
| 13 | Filter | Plano | | 0.210 | Glass | 1.517 | 64.2 | — |
| 14 | | Plano | | 0.600 | | | | |
| 15 | Image | Plano | | — | | | | |

Note:
Reference wavelength is 587.6 nm (d-line).
An effective radius of the stop S1 (Surface 1) is 3.300 mm.

The definitions of these parameters shown in Table 4B are the same as those stated in the 1st embodiment with corresponding values for the 4th embodiment, so an explanation in this regard will not be provided again.

Moreover, these parameters can be calculated from Table 4A and Table 4C as the following values and satisfy the following conditions:

TABLE 4B

| | Short Focal Length End | Long Focal Length End | Values of Conditional Expressions | | | |
|---|---|---|---|---|---|---|
| f [mm] | 9.52 | 14.52 | fG1 [mm] | 859.97 | |fG2/fG1| | 0.01 |
| Fno | 2.86 | 4.40 | fG2 [mm] | 6.31 | |fG3/fG1| | 0.01 |
| HFOV [deg.] | 15.1 | 9.9 | fG3 [mm] | −7.00 | fG3/fG2 | −1.11 |
| D1 [mm] | 5.651 | 2.315 | (Vi/Ni)min | 8.24 | fL/fS | 1.52 |
| D2 [mm] | 2.404 | 0.635 | Nmax | 1.705 | |fS/fG1| | 0.01 |
| D3 [mm] | 0.551 | 5.656 | V3/V2 | 2.19 | fS/fG2 | 1.51 |
| — | — | — | (TG12S − TG12L)/fG2 | 0.53 | fS/fG3 | −1.36 |
| — | — | — | (TG23S − TG23L)/TG3 | 0.45 | |f3/f1| + |f3/f2| + |f3/f4| + |f3/f5| | 0.81 |
| — | — | — | fG3/(BLS − BLL) | 1.37 | |f3/f1 + f3/f2| | 0.01 |
| — | — | — | (CT1 + CT2)/T12 | 4.43 | |f3/f12| | 0.01 |
| — | — | — | |TLL/TLS − 1| | 0.00 | |f45/f3| | 1.11 |
| — | — | — | TG1/TG2 | 2.13 | |f45/f12| | 0.01 |
| — | — | — | TG2/TG3 | 0.34 | Y11L/ImgHL | 0.94 |
| — | — | — | TLS/fS | 1.80 | Y11S/ImgHS | 1.31 |
| — | — | — | TLL/ImgHL | 6.81 | Y11L/Y52L | 1.51 |
| — | — | — | TLS/ImgHS | 6.81 | Y11S/Y52S | 1.51 |
| — | — | — | R3/R4 | 0.94 | — | — |

In the 4th embodiment, the equation of the aspheric surface profiles of the aforementioned lens elements is the same as the equation of the 1st embodiment, so an explanation in this regard will not be provided again.

TABLE 4C

Aspheric Coefficients

| Surface # | 2 | 3 | 4 | 5 | 7 |
|---|---|---|---|---|---|
| k= | −5.47039E+00 | −7.04709E+00 | −5.50468E+00 | 4.42014E+00 | 4.86380E−01 |
| A4= | −1.70916E−03 | −2.49685E−03 | 5.80242E−03 | 6.39873E−03 | 1.69816E−03 |
| A6= | −3.01991E−04 | −2.38218E−03 | −3.52501E−03 | −2.10834E−03 | 1.34105E−04 |
| A8= | 4.16107E−05 | 6.72303E−04 | 1.28626E−03 | 9.86225E−04 | 3.71819E−04 |
| A10= | −5.85951E−06 | −1.09749E−04 | −2.83551E−04 | −2.65194E−04 | −1.41589E−04 |
| A12= | 6.75657E−07 | 1.04102E−05 | 3.35745E−05 | 3.31617E−05 | 3.74711E−05 |
| A14= | −4.56855E−08 | −5.47784E−07 | −2.34099E−06 | −2.01827E−06 | −2.70180E−06 |

TABLE 4C-continued

Aspheric Coefficients

| A16= | 1.23129E−09 | 1.41790E−08 | 9.67360E−08 | 5.03902E−08 | — |
|---|---|---|---|---|---|
| A18= | — | −1.20891E−10 | −1.76914E−09 | — | — |

| Surface # | 8 | 9 | 10 | 11 | 12 |
|---|---|---|---|---|---|
| k= | 0.00000E+00 | 0.00000E+00 | 0.00000E+00 | 0.00000E+00 | −1.14345E+01 |
| A4= | 9.00309E−03 | 1.30820E−02 | 7.50102E−03 | −1.73148E−02 | −9.08696E−03 |
| A6= | 2.82213E−04 | −5.20374E−04 | 1.29378E−03 | 3.44253E−03 | 1.64979E−03 |
| A8= | 1.36311E−03 | 6.26379E−04 | −3.26277E−04 | −6.10845E−04 | −6.21169E−05 |
| A10= | −8.05943E−04 | −5.99953E−04 | 5.13069E−05 | −5.35728E−05 | −1.73188E−04 |
| A12= | 2.81941E−04 | 2.23634E−04 | −2.65206E−05 | 4.26081E−05 | 6.71610E−05 |
| A14= | −3.11754E−05 | −2.66222E−05 | 8.16579E−06 | −8.25974E−06 | −1.03954E−05 |
| A16= | — | — | — | 1.04350E−06 | 6.17749E−07 |

5th Embodiment

Figure 13:
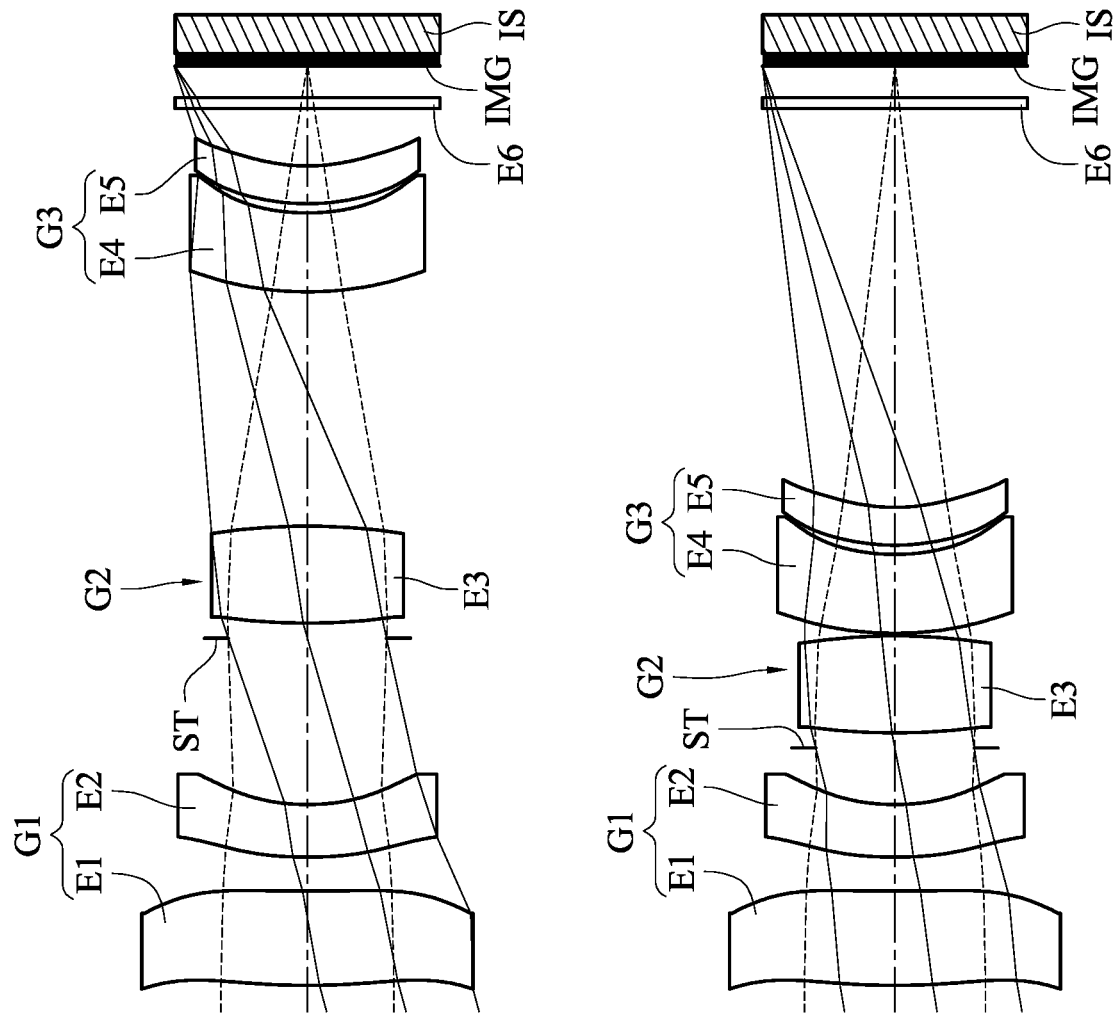
FIG. 13 is a schematic view of an image capturing unit respectively at the short focal length end and the long focal length end according to the 5th embodiment of the present disclosure.
Figure 14:
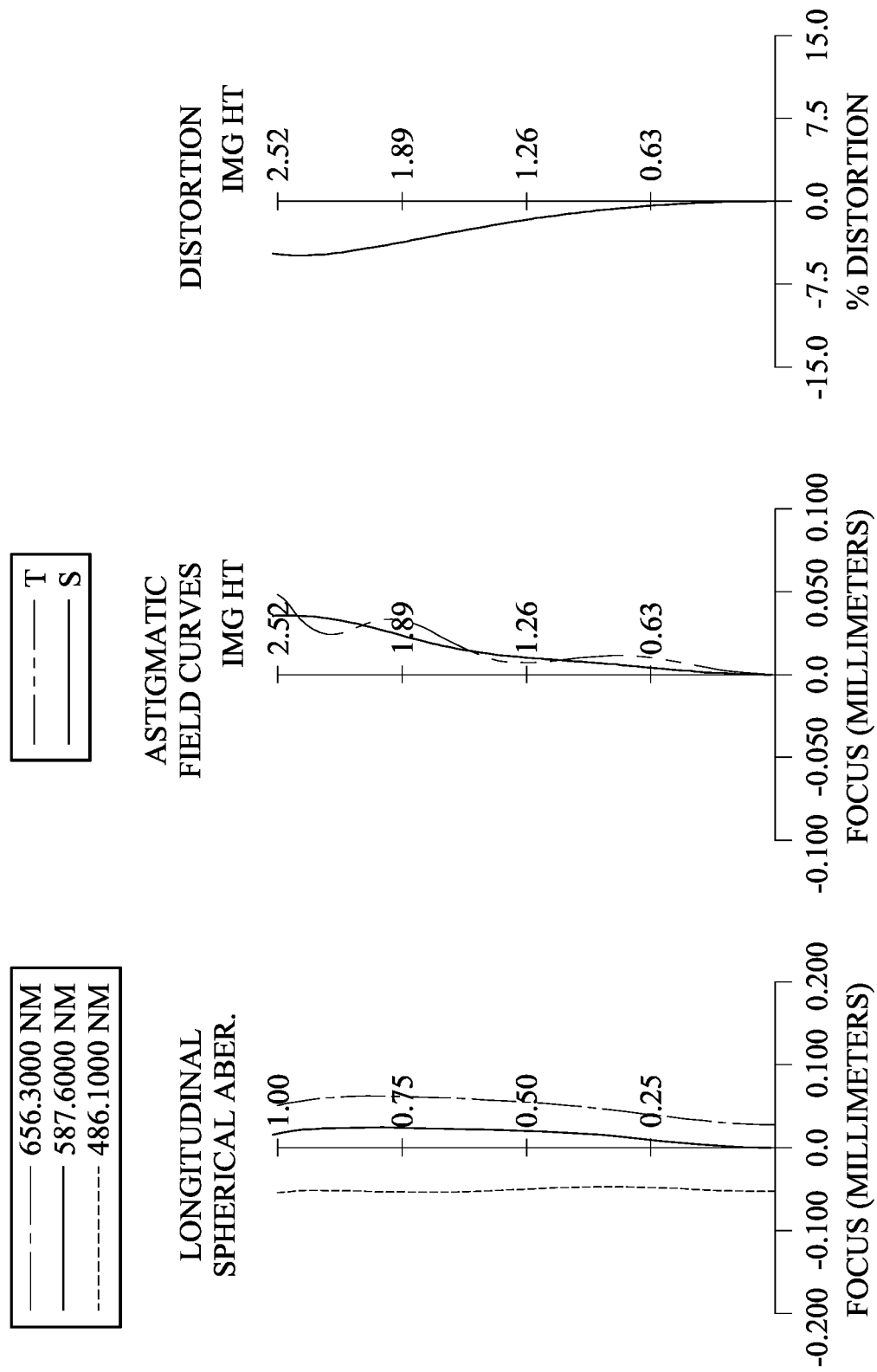
FIG. 14 shows spherical aberration curves, astigmatic field curves and a distortion curve of the image capturing unit at the short focal length end according to the 5th embodiment.
Figure 15:
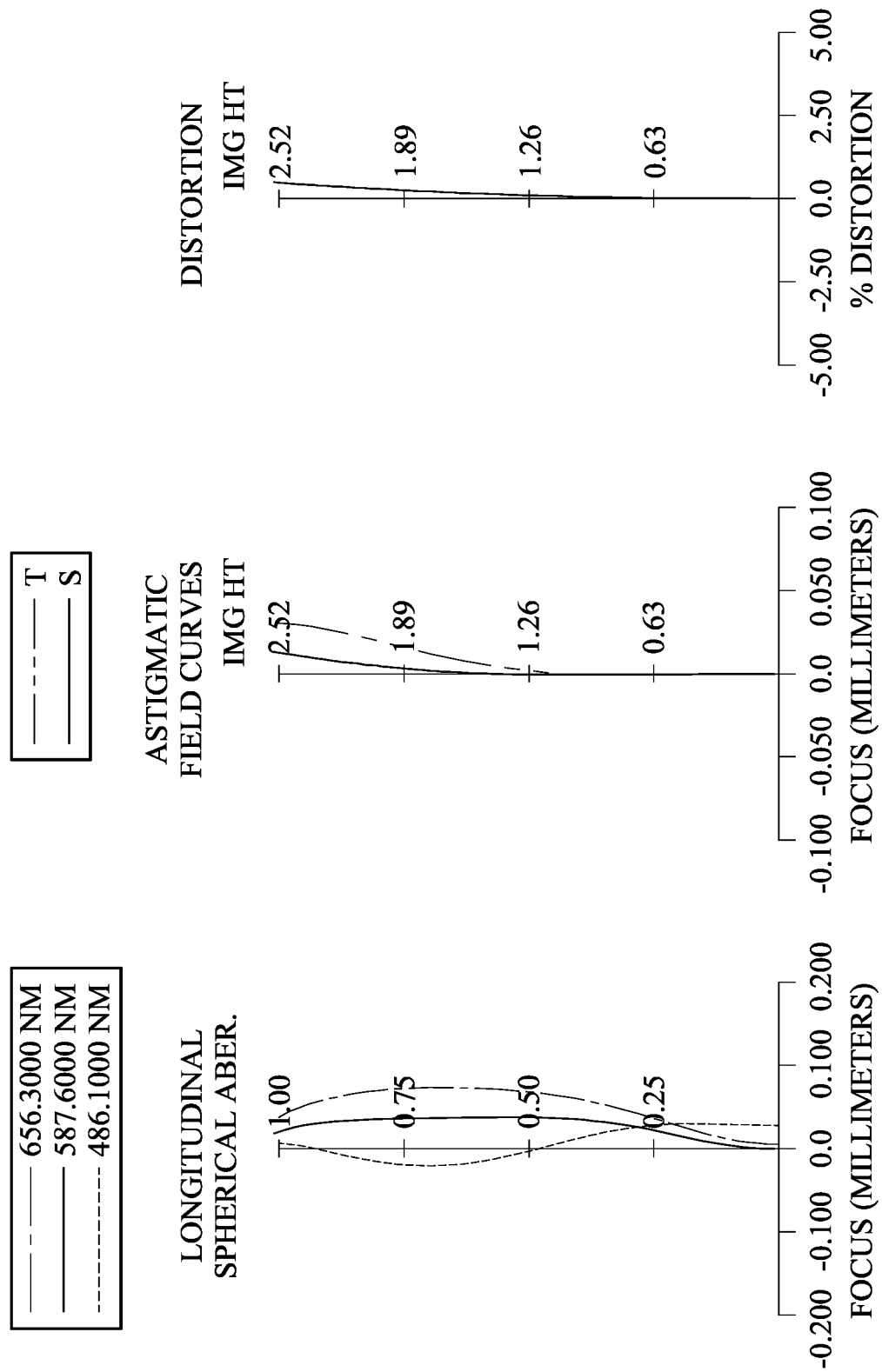
FIG. 15 shows spherical aberration curves, astigmatic field curves and a distortion curve of the image capturing unit at the long focal length end according to the 5th embodiment.

FIG. 13 is a schematic view of an image capturing unit respectively at the short focal length end and the long focal length end according to the 5th embodiment of the present disclosure. FIG. 14 shows, in order from left to right, spherical aberration curves, astigmatic field curves and a distortion curve of the image capturing unit at the short focal length end according to the 5th embodiment. FIG. 15 shows, in order from left to right, spherical aberration curves, astigmatic field curves and a distortion curve of the image capturing unit at the long focal length end according to the 5th embodiment. The upper part of FIG. 13 shows the image system lens assembly at the short focal length end, and the lower part of FIG. 13 shows the image system lens assembly at the long focal length end. In FIG. 13, the image capturing unit 5 includes the image system lens assembly (its reference numeral is omitted) of the present disclosure and an image sensor IS. The image system lens assembly includes, in order from an object side to an image side along an optical path, a first lens element E1, a second lens element E2, an aperture stop ST, a third lens element E3, a fourth lens element E4, a fifth lens element E5, a filter E6 and an image surface IMG. Further, the image system lens assembly includes, in order from the object side to the image side along the optical path, a first lens group G1, a second lens group G2 and a third lens group G3. The first lens group G1 includes the first lens element E1 and the second lens element E2, the second lens group G2 includes the third lens element E3, and the third lens group G3 includes the fourth lens element E4 and the fifth lens element E5. Moreover, the first lens group G1 has negative refractive power, the second lens group G2 has positive refractive power, and the third lens group G3 has negative refractive power. The image system lens assembly includes five lens elements (E1, E2, E3, E4, and E5) with no additional lens element disposed between each of the adjacent five lens elements.

The focal length of the image system lens assembly is variable by changing axial distances between any adjacent two of the three lens groups (G1, G2, and G3) in a zooming process. As shown in FIG. 13, the second lens group G2 is moved relative to the first lens group G1 along an optical axis in the zooming process, and the third lens group G3 is moved relative to the first lens group G1 along the optical axis in the zooming process. Furthermore, through the zooming process, the image system lens assembly has a short focal length end as shown in the upper part of FIG. 13 and a long focal length end as shown in the lower part of FIG. 13. In addition, when the image system lens assembly zooms in from the short focal length end to the long focal length end during the zooming process, the second lens group G2 is moved along the optical axis toward the object side relative to the first lens group G1, and the third lens group G3 is moved along the optical axis toward the object side relative to the first lens group G1. On the other hand, the third lens group G3 is moved relative to the image surface IMG along the optical axis in the zooming process. In addition, when the image system lens assembly zooms in from the short focal length end to the long focal length end during the zooming process, the third lens group G3 is moved along the optical axis toward the object side relative to the image surface IMG. It is noted that there is no relative motion between lens elements of any of the three lens groups in the zooming process.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has at least one inflection point in an optically effective area thereof when the image system lens assembly is at the long focal length end and in an optically effective area thereof when the image system lens assembly is at the short focal length end. The image-side surface of the first lens element E1 has at least one inflection point in an optically effective area thereof when the image system lens assembly is at the long focal length end and in an optically effective area thereof when the image system lens assembly is at the short focal length end.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point in an optically effective area thereof when the image system lens assembly is at the long focal length end and in an optically effective area thereof when the image system lens assembly is at the short focal length end.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric.

The filter E6 is made of glass material and located between the fifth lens element E5 and the image surface IMG, and will not affect the focal length of the image system lens assembly. The image sensor IS is disposed on or near the image surface IMG.

In this embodiment, one of various focusing states of the image system lens assembly is provided, and the focusing state of the image system lens assembly is a state where the image system lens assembly focuses on an imaged object located at infinity. The detailed optical data of the 5th embodiment are shown in Table 5A and Table 5B, and the aspheric surface data are shown in Table 5C below. It should be understood that only two of various zooming states (i.e., the short focal length end and the long focal length end) are disclosed in this embodiment, but the present disclosure is not limited to the disclosed states. The focal length of the image system lens assembly in this embodiment can be adjusted through the zooming process to other focal length states between the shortest focal length (corresponding to the short focal length end) and the longest focal length (corresponding to the long focal length end). It should be understood that only one of various focusing states is disclosed in this embodiment, but the present disclosure is not limited to the disclosed state, and the image system lens assembly of this embodiment can further have other focusing states corresponding to different object distances. In this embodiment, an axial distance between the second lens element E2 and the aperture stop ST is D1, an axial distance between the third lens element E3 and the fourth lens element E4 is D2, and an axial distance between the fifth lens element E5 and the filter E6 is D3.

TABLE 5A

5th Embodiment

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.7693 (ASP) | 1.800 | Plastic | 1.545 | 56.1 | 22.16 |
| 2 | | −211.4165 (ASP) | 0.643 | | | | |
| 3 | Lens 2 | 8.9657 (ASP) | 1.000 | Plastic | 1.614 | 25.6 | −14.26 |
| 4 | | 4.2422 (ASP) | D1 | | | | |
| 5 | Ape. Stop | Plano | 0.286 | | | | |
| 6 | Lens 3 | 11.9174 (SPH) | 1.849 | Glass | 1.804 | 46.5 | 7.67 |
| 7 | | −11.9174 (SPH) | D2 | | | | |
| 8 | Lens 4 | 6.4529 (ASP) | 1.500 | Plastic | 1.669 | 19.5 | −15.52 |
| 9 | | 3.6090 (ASP) | 0.176 | | | | |
| 10 | Lens 5 | 3.6029 (ASP) | 0.720 | Plastic | 1.534 | 56.0 | 508.78 |
| 11 | | 3.3972 (ASP) | D3 | | | | |
| 12 | Filter | Plano | 0.210 | Glass | 1.517 | 64.2 | — |
| 13 | | Plano | 0.600 | | | | |
| 14 | Image | Plano | — | | | | |

Note:
Reference wavelength is 587.6 nm (d-line).

The definitions of these parameters shown in Table 5B are the same as those stated in the 1st embodiment with corresponding values for the 5th embodiment, so an explanation in this regard will not be provided again.

Moreover, these parameters can be calculated from Table 5A and Table 5C as the following values and satisfy the following conditions:

TABLE 5B

| | Short Focal Length End | Long Focal Length End | | Values of Conditional Expressions | | | |
|---|---|---|---|---|---|---|---|
| f[mm] | 9.70 | 14.49 | fG1 [mm] | −64.77 | |fG2/fG1| | | 0.12 |
| Fno | 2.95 | 4.23 | fG2 [mm] | 7.67 | |fG3/fG1| | | 0.23 |
| HFOV [deg.] | 15.2 | 9.8 | fG3 [mm] | −14.84 | fG3/fG2 | | −1.93 |
| D1 [mm] | 3.167 | 1.075 | (Vi/Ni)min | 11.65 | fL/fS | | 1.49 |
| D2 [mm] | 4.458 | 0.050 | Nmax | 1.804 | |fS/fG1| | | 0.15 |
| D3 [mm] | 1.090 | 7.590 | V3/V2 | 1.82 | fS/fG2 | | 1.26 |
| — | — | — | (TG12S − TG12L)/fG2 | 0.27 | fS/fG3 | | −0.65 |
| — | — | — | (TG23S − TG23L)/TG3 | 1.84 | |f3/f1| + |f3/f2| + |f3/f4| + |f3/f5| | | 1.39 |
| — | — | — | fG3/(BLS − BLL) | 2.28 | |f3/f1 + f3/f2| | | 0.19 |
| — | — | — | (CT1 + CT2)/T12 | 4.35 | |f3/f12| | | 0.12 |
| — | — | — | |TLL/TLS-1| | 0.00 | |f45/f3| | | 1.93 |
| — | — | — | TG1/TG2 | 1.86 | |f45/f12| | | 0.23 |
| — | — | — | TG2/TG3 | 0.77 | Y11L/ImgHL | | 0.91 |
| — | — | — | TLS/fS | 1.80 | Y11S/ImgHS | | 1.25 |
| — | — | — | TLL/ImgHL | 6.94 | Y11L/Y52L | | 1.50 |
| — | — | — | TLS/ImgHS | 6.94 | Y11S/Y52S | | 1.49 |
| — | — | — | R3/R4 | 2.11 | — | | — |

In the 5th embodiment, the equation of the aspheric surface profiles of the aforementioned lens elements is the same as the equation of the 1st embodiment, so an explanation in this regard will not be provided again.

TABLE 5C

Aspheric Coefficients

| Surface # | 1 | 2 | 3 | 4 |
|---|---|---|---|---|
| k= | −1.22103E+01 | 9.90000E+01 | 2.20286E+00 | −4.96738E−01 |
| A4= | −1.38731E−03 | 8.86289E−03 | 2.19075E−02 | 1.62054E−02 |
| A6= | −2.43603E−04 | −4.05660E−03 | −7.98207E−03 | −5.91768E−03 |
| A8= | −1.14746E−04 | 9.22432E−05 | 1.65412E−03 | 2.08999E−03 |
| A10= | 3.11121E−05 | 1.46939E−04 | −4.22224E−04 | −1.03485E−03 |
| A12= | −4.11870E−06 | −3.24398E−05 | 9.84309E−05 | 3.51566E−04 |
| A14= | 3.13554E−07 | 3.31848E−06 | −1.31362E−05 | −6.29155E−05 |
| A16= | −1.01313E−08 | −1.73265E−07 | 7.67382E−07 | 4.45440E−06 |
| A18= | — | 3.69590E−09 | −9.90561E−09 | — |

| Surface # | 8 | 9 | 10 | 11 |
|---|---|---|---|---|
| k= | −2.50913E+01 | −1.42380E+01 | 7.78432E−01 | −6.34345E+00 |
| A4= | 1.05561E−02 | 7.71608E−03 | −5.28126E−02 | −3.31361E−03 |
| A6= | −1.80418E−03 | 1.50160E−02 | 4.38757E−02 | 1.01490E−02 |
| A8= | 5.16608E−04 | −6.95114E−03 | −2.22421E−02 | −9.02586E−03 |
| A10= | −1.22930E−04 | 1.75543E−03 | 7.14817E−03 | 4.11129E−03 |
| A12= | 1.28798E−05 | −2.48891E−04 | −1.42374E−03 | −1.07841E−03 |
| A14= | −4.66719E−07 | 1.42197E−05 | 1.63351E−04 | 1.57944E−04 |
| A16= | — | — | −8.43027E−06 | −9.74716E−06 |

6th Embodiment

Figure 16:
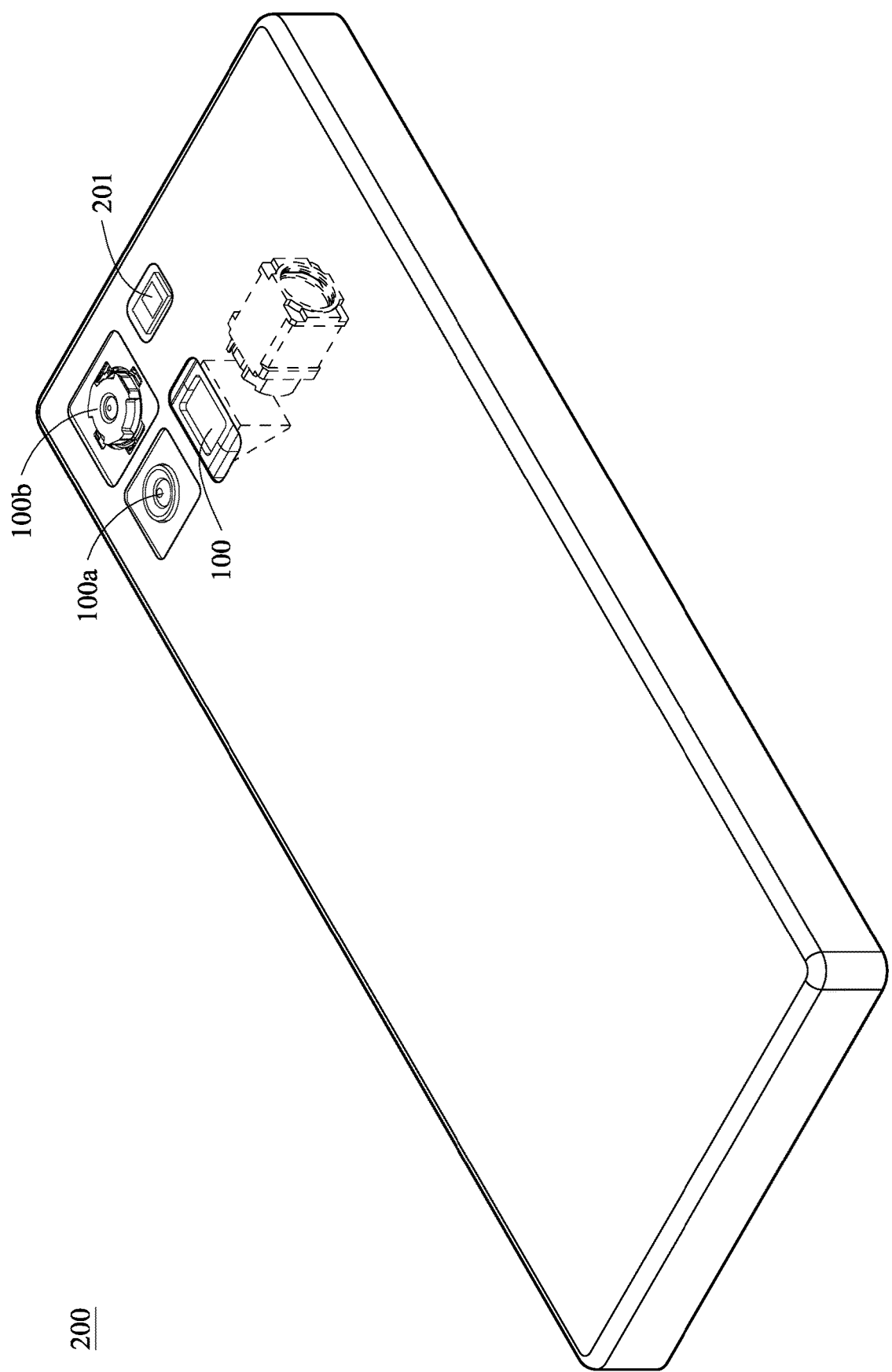
FIG. 16 is one perspective view of an electronic device according to the 6th embodiment of the present disclosure.
Figure 17:
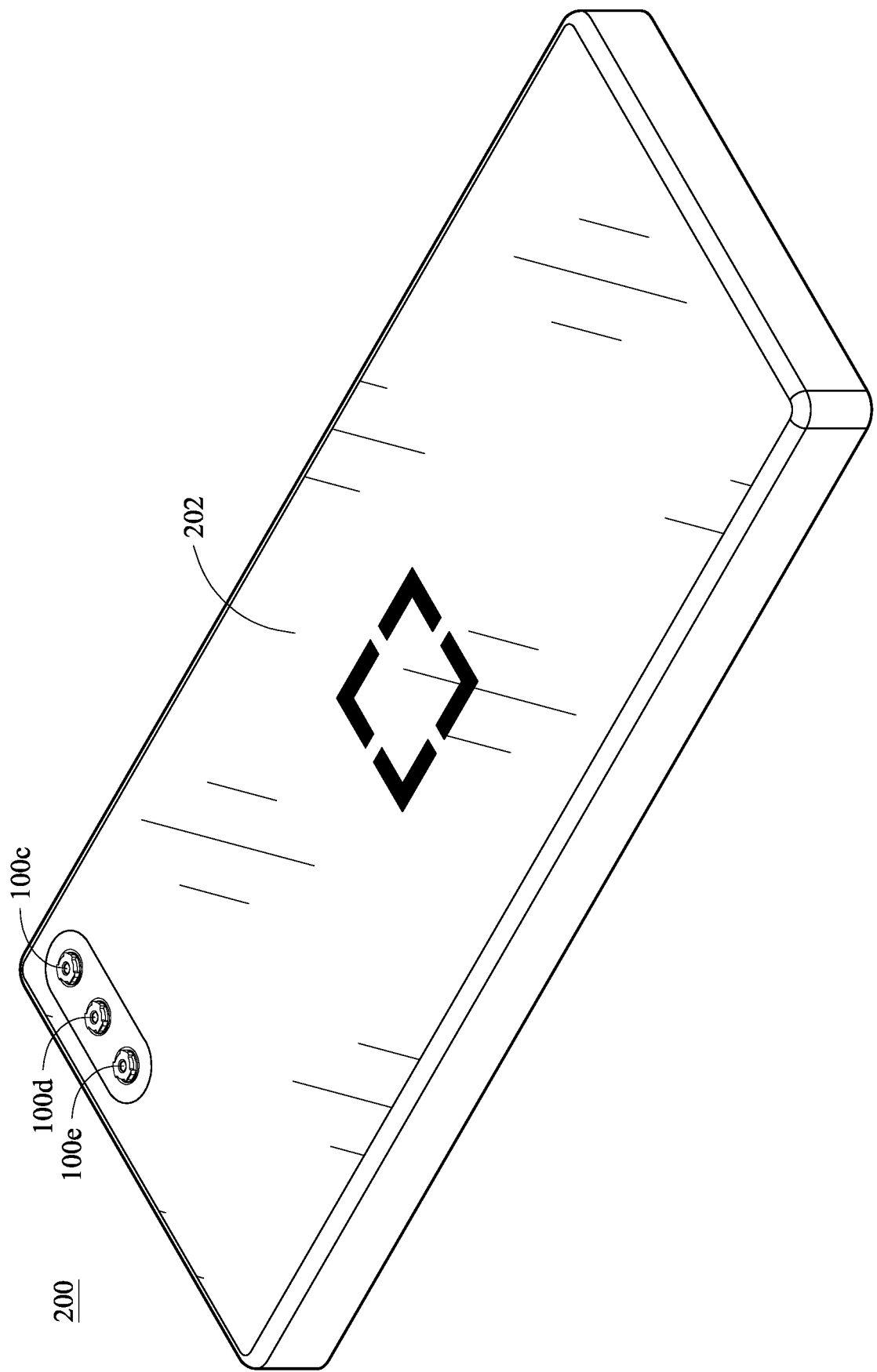
FIG. 17 is another perspective view of the electronic device in FIG. 16.
Figure 18:
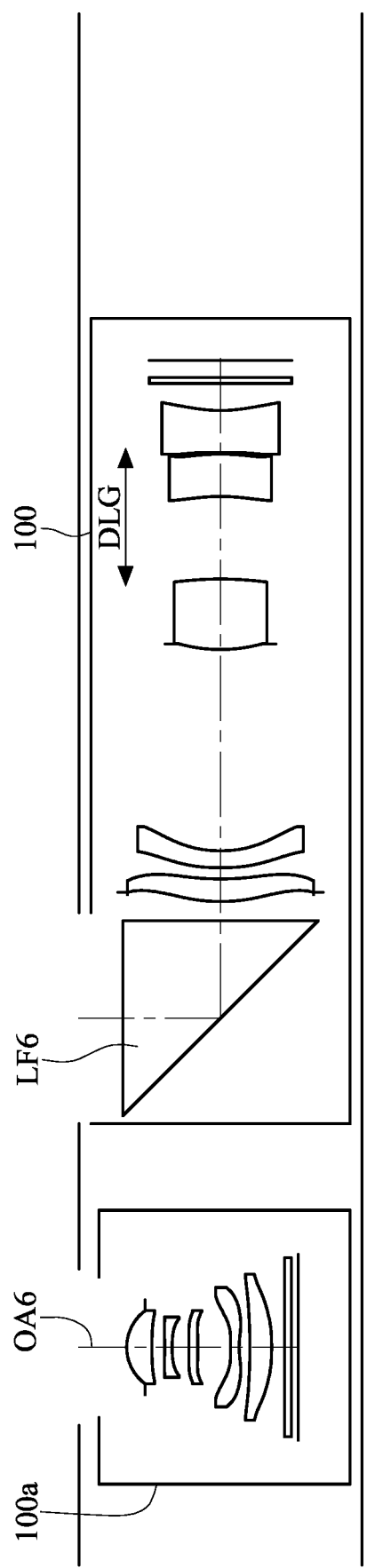
FIG. 18 is a cross-sectional view of two image capturing units of the electronic device in FIG. 16.

FIG. 16 is one perspective view of an electronic device according to the 6th embodiment of the present disclosure. FIG. 17 is another perspective view of the electronic device in FIG. 16. FIG. 18 is a cross-sectional view of two image capturing units of the electronic device in FIG. 16.

In this embodiment, an electronic device 200 is a smartphone including an image capturing unit 100, an image capturing unit 100a, an image capturing unit 100b, an image capturing unit 100c, an image capturing unit 100d, an image capturing unit 100e, a flash module 201, a display unit 202, a focus assist module, an image signal processor and an image software processor.

In this embodiment, the image capturing unit 100 is a camera module including a lens unit, a driving device, an image sensor and an image stabilizer. The lens unit includes the image system lens assembly disclosed in the 1st embodiment, a barrel and a holder member. However, the lens unit may alternatively be provided with the image system lens assembly disclosed in other embodiments, and the present disclosure is not limited thereto. In addition, the image capturing unit 100 is a telephoto image capturing unit configured with a light-folding element LF6, and the light-folding element LF6 is disposed on the object side of the first lens element. Therefore, it is favorable for adjusting light travelling direction and folding optical axis, so that the total track length of the image capturing unit 100 and the thickness of the electronic device 200 are not restricted by each other. The imaging light converges in the lens unit of the image capturing unit 100 to generate an image with the driving device utilized for image zooming or focusing on the image sensor, and the generated image is then digitally transmitted to other electronic component for further processing. In this embodiment, the light-folding element LF6 is a prism, but the present disclosure is not limited thereto. In other embodiments, the light-folding element can be a mirror.

The driving device can have zooming functionality or auto focusing functionality, and different driving configurations can be obtained through the usages of screws, voice coil motors (VCM) such as spring type or ball type, micro electro-mechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the image system lens assembly to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by electronic image stabilization (EIS) with image processing software, thereby improving image quality while in motion or low-light conditions.

The image capturing units 100, 100a, 100b are disposed on the same side of the electronic device 200, and the image capturing units 100c, 100d, 100e and the display unit 202 are disposed on the opposite side of the electronic device 200. Each of the image capturing units 100a, 100b, 100c, 100d, 100e can include the image system lens assembly of the present disclosure and have a configuration similar to that of the image capturing unit 100, so the details in this regard will not be provided again. The image capturing unit 100a includes an optical lens assembly and an image sensor (their reference numerals are omitted). As shown in FIG. 18, the optical lens assembly of the image capturing unit 100a has an optical axis OA6, and a movement direction DLG of lens groups of the image capturing unit 100 is perpendicular to the optical axis OA6; furthermore, the movement direction DLG of lens groups of the image capturing unit 100 is also perpendicular to an optical axis of the image capturing unit 100b. Therefore, it is favorable for adjusting space arrangement so as to reduce the restriction of the electronic device.

The image capturing unit 100 is a telephoto image capturing unit configured with a light-folding element, the image capturing unit 100a is a telephoto image capturing unit, and the image capturing unit 100b is a wide angle image capturing unit. Half of a maximum field of view of the image capturing unit 100a is between 15 degrees and 30 degrees inclusive of both values, and half of a maximum field of view of the image capturing unit 100b is between 30 degrees and 60 degrees inclusive of both values. The image capturing units 100, 100a, 100b have different fields of view, such that the electronic device 200 can have a larger zoom ratio for more applications. The abovementioned electronic device 200 has the three image capturing units 100, 100a, 100b on the same side, but the present disclosure is not limited thereto. In other configurations, the electronic device may have at least two image capturing units disposed on the same side or have at least three image capturing units disposed on the same side.

The image capturing unit 100c is a wide angle image capturing unit, the image capturing unit 100d is an ultra-wide-angle image capturing unit, and the image capturing unit 100e is a ToF (time of flight) image capturing unit, wherein the image capturing unit 100e can determine depth information of the imaged object. The image capturing units 100c, 100d, 100e and the display unit 202 are disposed on the same side of the electronic device 200, such that the image capturing units 100c, 100d, 100e can be front-facing cameras of the electronic device 200 for taking selfies, but the present disclosure is not limited thereto.

The electronic device 200 includes multiple image capturing units 100, 100a, 100b, 100c, 100d, 100e, but the present disclosure is not limited to the number and arrangement of image capturing units.

When a user captures images of an object, the light rays converge in the image capturing units 100, 100a or 100b to generate an image(s), and the flash module 201 is activated for light supplement. The focus assist module detects the object distance of the imaged object to achieve fast auto focusing. The image signal processor is configured to optimize the captured image to improve image quality. The light beam emitted from the focus assist module can be either conventional infrared or laser. In addition, the light rays may converge in the image capturing units 100c, 100d or 100e to generate an image(s). The display unit 202 can be a touch screen, and the user is able to interact with the display unit 202 and the image software processor having multiple functions to capture images and complete image processing. Alternatively, the user may capture images via a physical button. The image processed by the image software processor can be displayed on the display unit 202.

7th Embodiment

Figure 19:
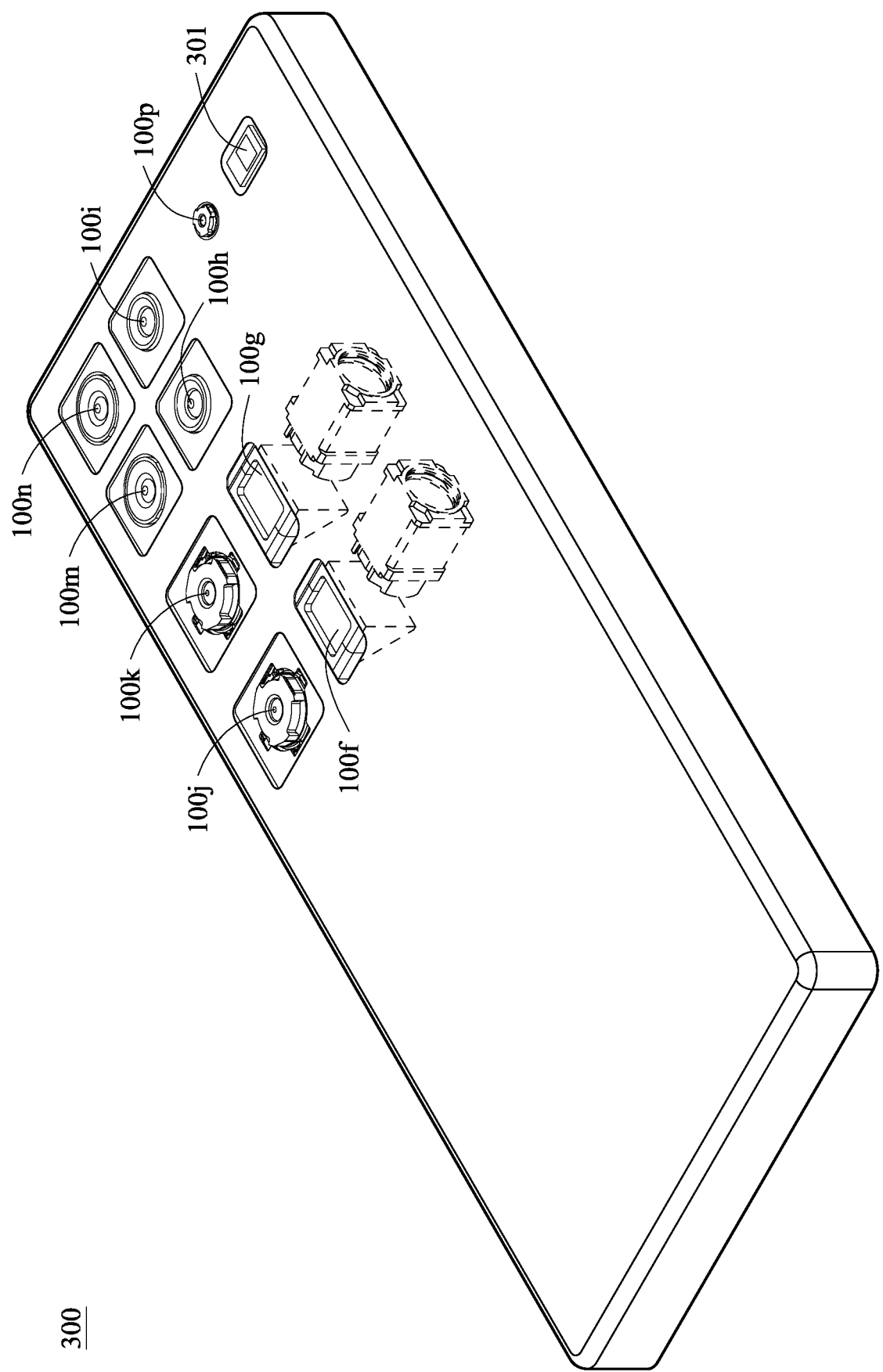
FIG. 19 is a perspective view of an electronic device according to the 7th embodiment of the present disclosure.

FIG. 19 is a perspective view of an electronic device according to the 7th embodiment of the present disclosure.

In this embodiment, an electronic device 300 is a smartphone including an image capturing unit 100f, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 301, a focus assist module, an image signal processor, a display unit and an image software processor (not shown). The image capturing units 100f, 100g, 100h, 100i, 100j, 100k, 100m, 100n, 100p are disposed on the same side of the electronic device 300, and the display unit is disposed on the opposite side of the electronic device 300. Each of the image capturing units 100f, 100g, 100h, 100i, 100j, 100k, 100m, 100n, 100p can include the image system lens assembly of the present disclosure and can have a configuration similar to that of the image capturing unit 100 as disclosed in the 6th embodiment, so the details in this regard will not be provided again.

The image capturing units 100f, 100g are telephoto image capturing units configured with light-folding element(s), the image capturing units 100h, 100i are telephoto image capturing units, the image capturing units 100j, 100k are wide angle image capturing units, the image capturing units 100m, 100n are ultra-wide-angle image capturing units, and the image capturing unit 100p is a ToF image capturing unit. The image capturing units 100f, 100g with light-folding element(s) may respectively have a configuration, for example, similar to that as shown in FIG. 22, FIG. 23 or FIG. 24, and a description in this regard will not be provided again. In this embodiment, the image capturing units 100f, 100g, 100h, 100i, 100j, 100k, 100m, 100n, 100p have different fields of view, such that the electronic device 300 has various magnification ratios so as to meet the requirement of optical zoom functionality. The electronic device 300 includes multiple image capturing units 100f, 100g, 100h, 100i, 100j, 100k, 100m, 100n, 100p, but the present disclosure is not limited to the number and arrangement of image capturing units. When a user captures images of an object, light rays converge in the image capturing unit 100f, 100g, 100h, 100i, 100j, 100k, 100m, 100n, or 100p to generate images, and the flash module 301 is activated for light supplement. Further, the subsequent processes are performed in a manner similar to the abovementioned embodiment, so the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the image system lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-5C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image system lens assembly comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;

wherein a zooming process is performed by changing axial distances between any adjacent two of the three lens groups so as to change a focal length of the image system lens assembly, the image system lens assembly has a long focal length end and a short focal length end, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end, the second lens group is moved relative to the first lens group along an optical axis in the zooming process, and the third lens group is moved relative to the first lens group along the optical axis in the zooming process;

wherein the object-side surface of first lens element is convex in a paraxial region thereof, and the third lens element has positive refractive power;

wherein an Abbe number of one of the five lens elements is Vi, a refractive index of the one of the five lens elements is Ni, a minimum value of Vi/Ni is (Vi/Ni) min, half of a maximum field of view of the image system lens assembly at the short focal length end is HFOVS, a maximum distance between an optically effective area of the object-side surface of the first lens element and the optical axis when the image system lens assembly is at the long focal length end is Y11L, a maximum distance between an optically effective area of the object-side surface of the first lens element and the optical axis when the image system lens assembly is at the short focal length end is Y11S, a maximum distance between an optically effective area of the image-side surface of the fifth lens element and the optical axis when the image system lens assembly is at the long focal length end is Y52L, a maximum distance between an optically effective area of the image-side surface of the fifth lens element and the optical axis when the image system lens assembly is at the short focal length end is Y52S, a focal length of the first lens element is f1, a focal length of the second lens element is f2, a focal length of the third lens element is f3, and the following conditions are satisfied:

6.0<(Vi/Ni)min<12.3;

5.0 degrees<HFOVS<25.0 degrees;

0.50<Y11L/Y52L<2.0;

0.50<Y11S/Y52S<2.0; and

|f3/f1+f3/f2|<0.60.

2. The image system lens assembly of claim 1, wherein at least one surface of at least one lens element in the first lens group has at least one inflection point in an optically effective area thereof when the image system lens assembly is at the long focal length end and in an optically effective area thereof when the image system lens assembly is at the short focal length end, and the third lens group is moved along the optical axis toward the object side relative to the first lens group when the image system lens assembly zooms in from the short focal length end to the long focal length end.

3. The image system lens assembly of claim 1, wherein half of a maximum field of view of the image system lens assembly at the long focal length end is HFOVL, half of the maximum field of view of the image system lens assembly at the short focal length end is HFOVS, and the following conditions are satisfied:

3.0 degrees<HFOVL<12.0 degrees; and 7.0 degrees<HFOVS<20.0 degrees.

4. The image system lens assembly of claim 1, wherein the focal length of the first lens element is f1, the focal length of the second lens element is f2, the focal length of the third lens element is f3, and the following condition is satisfied:

|f3/f1+f3/f2|<0.40.

5. The image system lens assembly of claim 1, wherein an axial distance between a most image-side surface of the second lens group and a most object-side surface of the third lens group when the image system lens assembly is at the long focal length end is TG23L, an axial distance between the most image-side surface of the second lens group and the most object-side surface of the third lens group when the image system lens assembly is at the short focal length end is TG23S, an axial distance between the most object-side surface and a most image-side surface of the third lens group is TG3, and the following condition is satisfied:

0.30<(TG23S−TG23L)/TG3<3.0.

6. The image system lens assembly of claim 1, wherein a focal length of the second lens group is fG2, a focal length of the third lens group is fG3, and the following condition is satisfied:

−2.7<fG3/fG2<−0.75.

7. The image system lens assembly of claim 1, wherein a focal length of the image system lens assembly at the short focal length end is fS, a focal length of the first lens group is fG1, a focal length of the second lens group is fG2, a focal length of the third lens group is fG3, and the following conditions are satisfied:

|fS/fG1|<0.40;

1.1<fS/fG2<2.0; and

−2.0<fS/fG3<−0.50.

8. The image system lens assembly of claim 1, wherein a maximum value among refractive indices of the five lens elements is Nmax, an Abbe number of the second lens element is V2, an Abbe number of the third lens element is V3, and the following conditions are satisfied:

1.65<Nmax<2.00; and 1.2<V3/V2<2.4.

9. The image system lens assembly of claim 1, wherein the object-side surface of the second lens element is convex in a paraxial region thereof, the image-side surface of the second lens element is concave in a paraxial region thereof, and the image-side surface of the fifth lens element is concave in a paraxial region thereof.

10. An image capturing unit comprising:
the image system lens assembly of claim 1; and
an image sensor disposed on an image surface of the image system lens assembly.

11. An electronic device comprising at least two image capturing units located on a same side of the electronic device, and the at least two image capturing units comprising:
a first image capturing unit comprising the image system lens assembly of claim 1 and an image sensor disposed on an image surface of the image system lens assembly; and
a second image capturing unit comprising an optical lens assembly and an image sensor disposed on an image surface of the optical lens assembly;
wherein half of a maximum field of view of the second image capturing unit is between 30 degrees and 60 degrees, inclusive of both values.

12. An image system lens assembly comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;
wherein a zooming process is performed by changing axial distances between any adjacent two of the three lens groups so as to change a focal length of the image system lens assembly, the image system lens assembly has a long focal length end and a short focal length end, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end, and the second lens group is moved relative to the first lens group along an optical axis in the zooming process;
wherein the third lens group has negative refractive power;
wherein the object-side surface of the first lens element is convex in a paraxial region thereof, and the third lens element has positive refractive power;
wherein an Abbe number of one of the five lens elements is Vi, a refractive index of the one of the five lens elements is Ni, a minimum value of Vi/Ni is (Vi/Ni)min, half of a maximum field of view of the image system lens assembly at the short focal length end is HFOVS, a maximum distance between an optically effective area of the object-side surface of the first lens element and the optical axis when the image system lens assembly is at the long focal length end is Y11L, a maximum distance between an optically effective area of the object-side surface of the first lens element and the optical axis when the image system lens assembly is at the short focal length end is Y11S, a maximum distance between an optically effective area of the image-side surface of the fifth lens element and the optical axis when the image system lens assembly is at the long focal length end is Y52L, a maximum distance between an optically effective area of the image-side surface of the fifth lens element and the optical axis when the image system lens assembly is at the short focal length end is Y52S, a focal length of the third lens element is f3, a composite focal length of the fourth lens element and the fifth lens element is f45, and the following conditions are satisfied:

$6.0<(Vi/Ni)min<12.3;$ $3.0 \text{ degrees}<HFOVS<30.0 \text{ degrees};$ $0.50<Y11L/Y52L<2.0;$ $0.50<Y11S/Y52S<2.0;$ and $|f45/f3|<4.0.$ 13. The image system lens assembly of claim 12, wherein the maximum distance between the optically effective area of the object-side surface of the first lens element and the optical axis when the image system lens assembly is at the long focal length end is Y11L, the maximum distance between the optically effective area of the object-side surface of the first lens element and the optical axis when the image system lens assembly is at the short focal length end is Y11S, the maximum distance between the optically effective area of the image-side surface of the fifth lens element and the optical axis when the image system lens assembly is at the long focal length end is Y52L, the maximum distance between the optically effective area of the image-side surface of the fifth lens element and the optical axis when the image system lens assembly is at the short focal length end is Y52S, the focal length of the third lens element is f3, the composite focal length of the fourth lens element and the fifth lens element is f45, and the following conditions are satisfied:

$0.55<Y11L/Y52L<1.8;$ $0.55<Y11S/Y52S<1.8;$ and $0.30<|f45/f3|<3.5.$

14. The image system lens assembly of claim 12, wherein an axial distance between a most object-side surface and a most image-side surface of the first lens group is TG1, an axial distance between a most object-side surface and a most image-side surface of the second lens group is TG2, an axial distance between a most object-side surface and a most image-side surface of the third lens group is TG3, and the following conditions are satisfied:

$0.60<TG1/TG2<2.4;$ and $0.10<TG2/TG3<3.4.$

15. The image system lens assembly of claim 12, wherein an axial distance between the object-side surface of the first lens element and an image surface when the image system lens assembly is at the long focal length end is TLL, an axial distance between the object-side surface of the first lens element and the image surface when the image system lens assembly is at the short focal length end is TLS, a maximum image height of the image system lens assembly at the long focal length end is ImgHL, a maximum image height of the image system lens assembly at the short focal length end is ImgHS, and the following conditions are satisfied:

$5.0<TLL/ImgHL<9.0;$ and $5.0<TLS/ImgHS<9.0.$

16. The image system lens assembly of claim 12, wherein a focal length of the first lens group is fG1, a focal length of the second lens group is fG2, and the following condition is satisfied:

$|fG2/fG1|<0.22.$

17. The image system lens assembly of claim 12, wherein a focal length of the image system lens assembly at the long focal length end is fL, a focal length of the image system lens assembly at the short focal length end is fS, a focal length of the first lens element is f1, a focal length of the second lens element is f2, the focal length of the third lens element is f3, a focal length of the fourth lens element is f4, a focal length of the fifth lens element is f5, and the following conditions are satisfied:

$1.2<fL/fS<4.1;$ and $|f3/f1|+|f3/f2|+|f3/f4|+|f3/f5|<1.8.$

18. The image system lens assembly of claim 12, wherein the third lens group is moved along the optical axis toward the object side relative to an image surface when the image system lens assembly zooms in from the short focal length end to the long focal length end;
  wherein a focal length of the third lens group is fG3, an axial distance between the image-side surface of the fifth lens element and the image surface when the image system lens assembly is at the long focal length end is BLL, an axial distance between the image-side surface of the fifth lens element and the image surface when the image system lens assembly is at the short focal length end is BLS, and the following condition is satisfied:

$0<fG3/(BLS-BLL)<3.2.$

19. The image system lens assembly of claim 12, wherein the focal length of the third lens element is f3, a composite focal length of the first lens element and the second lens element is f12, and the following condition is satisfied:

$|f3/f12|<0.25.$

20. The image system lens assembly of claim 12, wherein the object-side surface of the second lens element is convex in a paraxial region thereof, the image-side surface of the second lens element is concave in a paraxial region thereof, and the object-side surface of the third lens element is convex in a paraxial region thereof;
  wherein a curvature radius of the object-side surface of the second lens element is R3, a curvature radius of the image-side surface of the second lens element is R4, and the following condition is satisfied:

$0.75<R3/R4<2.5.$

21. An image system lens assembly comprising three lens groups, the three lens groups comprising five lens elements, the three lens groups being, in order from an object side to an image side along an optical path, a first lens group, a second lens group and a third lens group, the five lens elements being, in order from the object side to the image side along the optical path, a first lens element, a second lens element, a third lens element, a fourth lens element and a fifth lens element, and each of the five lens elements having an object-side surface facing toward the object side and an image-side surface facing toward the image side;
  wherein a zooming process is performed by changing axial distances between any adjacent two of the three lens groups so as to change a focal length of the image system lens assembly, the image system lens assembly has a long focal length end and a short focal length end, at least one surface of at least one lens element in the first lens group, the second lens group and the third lens group has at least one inflection point in an optically effective area thereof when the image system lens assembly is at the long focal length end and in an optically effective area thereof when the image system lens assembly is at the short focal length end, and the second lens group is moved relative to the first lens group along an optical axis in the zooming process;
  wherein the first lens group comprises the first lens element and the second lens element, the second lens group comprises the third lens element, and the third lens group comprises the fourth lens element and the fifth lens element;
  wherein an Abbe number of one of the five lens elements is Vi, a refractive index of the one of the five lens elements is Ni, a minimum value of Vi/Ni is (Vi/Ni)min, half of a maximum field of view of the image system lens assembly at the short focal length end is HFOVS, a maximum distance between an optically effective area of the object-side surface of the first lens element and the optical axis when the image system lens assembly is at the long focal length end is Y11L, a maximum distance between an optically effective area of the object-side surface of the first lens element and the optical axis when the image system lens assembly is at the short focal length end is Y11S, a maximum distance between an optically effective area of the image-side surface of the fifth lens element and the optical axis when the image system lens assembly is at the long focal length end is Y52L, a maximum distance between an optically effective area of the image-side surface of the fifth lens element and the optical axis when the image system lens assembly is at the short focal length end is Y52S, a composite focal length of the first lens element and the second lens element is f12, a composite focal length of the fourth lens element and the fifth lens element is f45, and the following conditions are satisfied:

$6.0<(Vi/Ni)\text{min}<12.3;$ $3.0 \text{ degrees}<\text{HFOVS}<30.0 \text{ degrees};$ $0.50<Y11L/Y52L<2.0;$ $0.50<Y11S/Y52S<2.0;$ and $|f45/f12|<1.4.$

22. The image system lens assembly of claim 21, wherein the composite focal length of the first lens element and the second lens element is f12, the composite focal length of the fourth lens element and the fifth lens element is f45, and the following condition is satisfied:

$|f45/f12|<1.0.$

23. The image system lens assembly of claim 21, wherein a focal length of the first lens group is fG1, a focal length of the third lens group is fG3, and the following condition is satisfied:

$|fG3/fG1|<1.4.$

24. The image system lens assembly of claim 21, wherein an axial distance between the object-side surface of the first lens element and an image surface when the image system lens assembly is at the short focal length end is TLS, a focal length of the image system lens assembly at the short focal length end is fS, an f-number of the image system lens assembly at the short focal length end is FnoS, and the following conditions are satisfied:

$1.5 < TLS/fS < 2.1$; and $2.2 < FnoS < 3.8$.

25. The image system lens assembly of claim 21, wherein the image system lens assembly performs a focusing process according to an object distance, and the third lens group is moved relative to the first lens group along the optical axis in the focusing process.

26. The image system lens assembly of claim 21, further comprising at least one light-folding element;
    wherein an axial distance between the object-side surface of the first lens element and an image surface when the image system lens assembly is at the long focal length end is TLL, an axial distance between the object-side surface of the first lens element and the image surface when the image system lens assembly is at the short focal length end is TLS, and the following condition is satisfied:

$|TLL/TLS - 1| < 1.0E - 2$.

27. The image system lens assembly of claim 21, wherein at least one lens element in the first lens group, the second lens group and the third lens group is made of plastic material;
    wherein the maximum distance between the optically effective area of the object-side surface of the first lens element and the optical axis when the image system lens assembly is at the long focal length end is Y11L, the maximum distance between the optically effective area of the object-side surface of the first lens element and the optical axis when the image system lens assembly is at the short focal length end is Y11S, a maximum image height of the image system lens assembly at the long focal length end is ImgHL, a maximum image height of the image system lens assembly at the short focal length end is ImgHS, and the following conditions are satisfied:

$0.50 < Y11L/ImgHL < 2.0$; and $0.50 < Y11S/ImgHS < 2.0$.

28. The image system lens assembly of claim 21, wherein the second lens group has positive refractive power, and the second lens group is moved along the optical axis toward the object side relative to the first lens group when the image system lens assembly zooms in from the short focal length end to the long focal length end;
    wherein an axial distance between a most image-side surface of the first lens group and a most object-side surface of the second lens group when the image system lens assembly is at the long focal length end is TG12L, an axial distance between the most image-side surface of the first lens group and the most object-side surface of the second lens group when the image system lens assembly is at the short focal length end is TG12S, a focal length of the second lens group is fG2, and the following condition is satisfied:

$0.22 < (TG12S - TG12L)/fG2 < 1.1$.

29. The image system lens assembly of claim 21, wherein a central thickness of the first lens element is CT1, a central thickness of the second lens element is CT2, an axial distance between the first lens element and the second lens element is T12, and the following condition is satisfied:

$1.6 < (CT1 + CT2)/T12 < 15$.

* * * * *